(12) United States Patent
Berry et al.

(10) Patent No.: US 10,798,937 B2
(45) Date of Patent: Oct. 13, 2020

(54) TREE STANDS, LADDERS, AND ASSOCIATED SYSTEMS AND METHODS

(71) Applicant: HEAVEN'S TRAIL, LLC, Charlotte, NC (US)

(72) Inventors: Christopher Young Berry, Charlotte, NC (US); Raeshon McNeil, Charlotte, NC (US); Jeremy Losaw, Charlotte, NC (US); Thomas James Philpott, Fort Mill, SC (US); Michael Morgan Starkey, Kent, OH (US); Richard Steven Chomik, Doylestown, PA (US); Douglas L. Marriott, South Lebanon, OH (US)

(73) Assignee: HEAVEN'S TRAIL, LLC, Charlotte, NC (US)

( * ) Notice: Subject to any disclaimer, the term of this patent is extended or adjusted under 35 U.S.C. 154(b) by 0 days.

(21) Appl. No.: 15/219,013

(22) Filed: Jul. 25, 2016

(65) Prior Publication Data
US 2017/0020125 A1    Jan. 26, 2017

Related U.S. Application Data

(60) Provisional application No. 62/234,411, filed on Sep. 29, 2015, provisional application No. 62/196,107, filed on Jul. 23, 2015.

(51) Int. Cl.
*A01M 31/02* (2006.01)
(52) U.S. Cl.
CPC .................. *A01M 31/02* (2013.01)

(58) Field of Classification Search
CPC ..... A01M 31/02; A01M 31/004; A01M 31/05
See application file for complete search history.

(56) References Cited

U.S. PATENT DOCUMENTS

| 493,391 | A | * | 3/1893 | Sturtevant | A01M 31/02 182/135 |
| 4,310,070 | A | * | 1/1982 | Mastrogiannis | E06C 1/381 182/134 |

(Continued)

OTHER PUBLICATIONS http://www.tmastands.com, Treestand Manufacturer's Association, Retrieved Jul. 25, 2016.

(Continued)

*Primary Examiner* — Katherine W Mitchell
*Assistant Examiner* — Candace L Bradford
(74) *Attorney, Agent, or Firm* — Womble Bond Dickinson (US) LLP

(57) ABSTRACT

A tree stand system is provided. The tree stand system may include a tree stand. The tree stand may include a frame post, a platform portion engaged with the frame post, and a seat portion engaged with the frame post. Further, the tree stand may include an upper engagement device and a lower engagement device each configured to engage a structure. One of the upper engagement device and the lower engagement device may define a convex edge configured to extend toward the structure to allow the tree stand to roll against the structure to select a horizontal angle that the tree stand faces. The tree stand system may further include one or more of a ladder, a hoisting apparatus, and an accessory. The accessory may include a bow holder accessory or a hunting device accessory.

18 Claims, 55 Drawing Sheets

(56) References Cited

U.S. PATENT DOCUMENTS

| | | | | |
|---|---|---|---|---|
| 4,905,792 A * | 3/1990 | Wilson | A01M 31/02 | 182/116 |
| 4,928,791 A | 5/1990 | Hong | | |
| 5,363,941 A * | 11/1994 | Richard | A01M 31/02 | 108/152 |
| 5,398,577 A * | 3/1995 | Pierce | A01G 23/099 | 144/335 |
| 6,386,321 B1 * | 5/2002 | Muhich | A01M 31/02 | 182/135 |
| 7,434,662 B2 * | 10/2008 | McFall | A01M 31/02 | 182/133 |
| 7,533,761 B2 * | 5/2009 | Forrest | A01M 31/02 | 182/133 |
| 8,556,035 B1 * | 10/2013 | Kendall | E06C 1/381 | 182/156 |
| 9,402,481 B2 * | 8/2016 | Weber, Jr. | A47C 4/021 | |
| 9,516,874 B2 * | 12/2016 | Richey | A01M 31/02 | |
| 9,743,774 B1 * | 8/2017 | Hauser | A47C 9/10 | |
| 2007/0209410 A1 * | 9/2007 | Clum | E05B 73/00 | 70/262 |
| 2009/0272709 A1 * | 11/2009 | Nessner | A01M 31/02 | 212/270 |
| 2009/0321186 A1 * | 12/2009 | Louchart | A01M 31/02 | 182/188 |
| 2010/0300808 A1 * | 12/2010 | Hale | A01M 31/02 | 182/187 |
| 2013/0257121 A1 * | 10/2013 | Otta | B60N 2/3011 | 297/217.1 |
| 2014/0190767 A1 * | 7/2014 | Wheelington | A01M 31/02 | 182/129 |
| 2014/0202796 A1 * | 7/2014 | Sponsler | A01M 31/02 | 182/188 |
| 2014/0304968 A1 * | 10/2014 | LaFleur | A01M 31/02 | 29/428 |
| 2014/0311828 A1 * | 10/2014 | Bassett | A01M 31/02 | 182/124 |
| 2015/0230612 A1 * | 8/2015 | Weber, Jr. | A47C 3/34 | 297/130 |
| 2016/0338341 A1 * | 11/2016 | Thevenet | A01M 31/02 | |
| 2017/0020125 A1 * | 1/2017 | Berry | A01M 31/02 | |
| 2017/0142959 A1 * | 5/2017 | Berkbuegler | A01M 31/02 | |

OTHER PUBLICATIONS http://millenniumstands.com, Millennium Treestands, Retrieved Jul. 25, 2016.

http://www.summitstands.com/treestands, Summit Treestands, Retrieved Jul. 25, 2016.

http://www.basspro.com/Tree-Stands/_/S-12425004000, Bass Pro Shops, Retrieved Jul. 25, 2016.

htlp://www.cabelas.com/category/Hunting-Treestands/104783560. uts, Cabela's World Foremost Outfitter, Retrieved Jul. 25, 2016.

htlps://www.dutton-lainson.com/products.php?cat=20, Dutton-Lainson Company, Retrieved Jul. 25, 2016.

https://www.rammount.com/components, Ram Mounts, Retrieved Jul. 25, 2016.

* cited by examiner

TREE STANDS, LADDERS, AND ASSOCIATED SYSTEMS AND METHODS

CROSS-REFERENCE TO RELATED APPLICATIONS

This application claims the benefit of U.S. Provisional Patent Application Ser. No. 62/234,411 to Berry et al., filed Sep. 29, 2015 and U.S. Provisional Patent Application Ser. No. 62/196,107 to Berry et al., filed Jul. 23, 2015, which are entirely incorporated herein by reference.

TECHNOLOGICAL FIELD

The present disclosure generally relates to installing an apparatus in a tree and, more particularly, to the installation of a tree stand suitable for hunting, observation, and/or the like.

BACKGROUND

Stands that mount to tree trunks are commonly referred to as tree stands. Difficulties have been associated with assembling, installing and using some types of prior tree stands. Accordingly, a need exists for improved tree stands and associated systems and methods.

BRIEF SUMMARY OF THE DISCLOSURE

One aspect of this disclosure is the provision of tree stands, and systems and methods for installing tree stands, and related accessories. In one example, a system for installing a tree stand may include a mounting apparatus and a hoisting apparatus that are cooperatively configured so that they may be used to conveniently and efficiently install a wide variety of differently configured tree stands, or the like. Accordingly, the mounting apparatus may optionally be referred to as a universal mounting apparatus.

The mounting apparatus may include a mount attaching unit fixedly connected to a mount bracket. The mount attaching unit is configured to secure the mount bracket to a structure such as, but not limited to, the trunk of a tree. The mounting apparatus may also include a receiver portion operably connected to the mount bracket. The receiver portion may define at least one receiver locking hole and a receiving channel.

A tree stand may include at least one seat connected to a frame post configured to be operably engaged with the receiver portion. The frame post may define at least one frame post hole configured for being positioned proximate the at least one receiver locking hole when the frame post is operably engaged with the receiver portion. The frame post may include a locking mechanism configured to releasably secure the frame post and the receiver portion to one another. For example, the locking mechanism may include at least one locking tooth for simultaneously protruding into holes of the frame post and the receiver portion in a manner that causes the frame post and the receiver portion to be locked to one another.

The hoisting apparatus may include a hoist attaching unit fixedly connected to a hoist bracket. The hoist attaching unit is configured to secure the hoist bracket to a structure. For example, the hoisting apparatus may be mounted to the same tree trunk as, and above, the mounting apparatus. In one example, the hoisting and mounting apparatuses may be mounted to the tree trunk after climbing sticks, or the like, are mounted to the tree trunk to facilitate ascending the tree trunk for the purpose of mounting the hoisting and mounting apparatuses.

The hoisting apparatus may further include a hoisting mechanism that is connected to the hoisting bracket. The hoisting mechanism may be configured to draw (e.g., pull) the frame post of the tree stand upwardly along the tree trunk and into the receiver portion, so that the tree stand and the mounting apparatus become fixedly connected to one another.

In one aspect, a tree stand system is provided. The tree stand system may include a tree stand. The tree stand may include a frame post, a platform portion engaged with the frame post, a seat portion engaged with the frame post, and an upper engagement device and a lower engagement device each configured to engage a structure. One of the upper engagement device and the lower engagement device may define a convex edge configured to extend toward the structure to allow the tree stand to roll against the structure to select a horizontal angle that the tree stand faces.

In some embodiments, an other one of the upper engagement device and the lower engagement device may define one or more receiving edges configured to at least partially surround the structure and secure the tree stand at the horizontal angle selected. The convex edge and the one or more receiving edges may each define a plurality of teeth. The tree stand may further include an upper tie down mechanism configured to extend around the structure. The upper engagement device and the upper tie down mechanism may each be engaged with the frame post at a same height therealong. The tree stand may further include a lower tie down mechanism engaged with the frame post between the upper tie down mechanism and the platform portion.

In some embodiments, the upper engagement device may be positioned above the platform portion and the lower engagement device may be positioned below the platform portion. The tree stand may further include a lower linkage configured to move the lower engagement device toward or away from the structure. The lower linkage may be further configured to adjust an angle of the lower engagement device with respect to the structure. The lower linkage may include first and second extensible rods that are pivotably engaged with first and second ends of the lower engagement device and independently adjustable.

In some embodiments, at least one of the upper engagement device and the lower engagement device may be engaged with the frame post. The tree stand may further include an accessory mount engaged with the frame post behind the seat portion. The accessory mount may include first and second mounting bars extending substantially parallel to one another. The tree stand system may further include an accessory configured to engage the accessory mount and extend to a position in front of the seat portion. The accessory may be selected from a group consisting of a hunting device accessory and a bow holder accessory.

In some embodiments, the tree stand may further include a second frame post engaged with the platform portion and a second seat portion engaged with the second frame post. A cross-member may extend between the frame post and the second frame post. The upper engagement device may be engaged with the cross-member.

In some embodiments, the tree stand system may further include a ladder and a forward step. The forward step may be disposed between the platform portion and the ladder. The tree stand system may further include a hoisting apparatus configured to engage the structure and lift the tree stand to a desired height therealong. The hoisting apparatus may include a motion input member configured to rotate and coil a flexible tensile member to lift the tree stand. The tree stand system may further include one or more climbing sticks. The climbing sticks may include a central frame and a plurality of steps engaged therewith. Each of the steps may include a first section and a second section. The first section and the second section may be substantially identical and oppositely disposed about the central frame. The first section and the second section may each define a plurality of inner protrusions that cooperatively surround the central frame.

In an additional aspect, a system is provided. The system may include a hoisting apparatus configured to be mounted to a tree trunk or other suitable structure, a mounting apparatus configured to be mounted to the tree trunk or other suitable structure at a position below the hoisting apparatus, and a frame post configured to latch to the mounting apparatus. The hoisting apparatus may be configured to pull the frame post upwardly to the mounting apparatus so that the frame post latches to the mounting apparatus and is at least partially supported by the mounting apparatus.

In some embodiments, the frame post is part of a tree stand. The tree stand may have at least one seat. The seat may include a seat attaching bracket configured to secure the seat to the frame post, a seat bottom frame operably engaged with the seat attaching bracket, a seat back frame operably engaged with the seat attaching bracket, and at least one a seat cover operably engaged with the seat bottom frame and the seat back frame.

In some embodiments, the frame post may be part of a tree stand system. The tree stand system may include at least one seat, a main platform positioned below the seat, a secondary platform positioned below the main platform, and a ladder extending downwardly from proximate the secondary platform. The frame post may at least indirectly and at least partially support each of the at least one seat, the main platform positioned below the seat, the secondary platform positioned below the main platform, and the ladder extending downwardly from proximate the secondary platform.

In some embodiments, the hoisting apparatus may include an attaching unit configured for at least partially mounting the hoisting apparatus to the tree trunk or other suitable structure. The mounting apparatus may include an attaching unit configured for at least partially mounting the mounting apparatus to the tree trunk or other suitable structure. The mounting apparatus may include a receiver portion defining a receiving channel for at least partially receiving the frame post. The frame post may include a locking mechanism configured to latch to the mounting apparatus. The locking mechanism may include at least one locking tooth, at least one biasing element operably engaged with the at least one locking tooth for urging the at least one locking tooth outwardly, and a locking slide operatively associated with the at least one locking tooth for at least allowing inward movement of the at least one locking tooth.

In an additional aspect, a method is provided. The method may include mounting a mounting apparatus to the tree trunk or other suitable structure at a position below the hoisting apparatus. Further, the method may include moving a frame post upwardly along the tree trunk or other suitable structure so that the frame post engages and becomes secured to the mounting apparatus.

In some embodiments, the frame post may be part of a tree stand. The method may further include mounting a hoisting apparatus to the tree trunk or other suitable structure at a position above the mounting apparatus. Moving of the frame post may include the hoisting apparatus at least partially facilitating pulling the frame post upwardly along the tree trunk or other suitable structure.

In an additional aspect, an article for being mounted to a tree trunk is provided. The article may include a frame, an engagement device including an outer side facing away from at least a portion of the frame and configured to engage a tree trunk, and at least one pivotable connection between the frame and the engagement device. The at least one pivotable connection may be configured to allow the engagement device to be pivoted relative to the frame to adjust engagement between the outer side of the engagement device and a tree trunk when the article is mounted to the tree trunk.

In some embodiments, the article may further include at least one translatably adjustable connection between the frame and the engagement device. The at least one translatably adjustable connection may be configured to allow the engagement device to be moved inwardly and outwardly relative to the frame to adjust engagement between the outer side of the engagement device and a tree trunk when the article is mounted to the tree trunk.

In some embodiments, the frame may include first and second frame members that are substantially parallel to one another and may each extend outwardly relative to a portion of the frame. The at least one translatable connection may include first and second rods that are respectively operatively associated with the first and second frame members so that the first rod can be moved along and secured relative to the first frame member independently of the second rod, and the second rod can be moved along and secured relative to the second frame member independently of the first rod. The engagement device may include first and second portions that are spaced apart from one another along a length of the engagement device. The at least one pivotable connection may include a first pivotable connection between the first portion and the first rod, and a second pivotable connection between the second portion and the second rod.

In an additional aspect, an article for being mounted to a tree trunk is provided. The article may include a first frame, an engagement device connected to the first frame and including an outer side facing away from at least a portion of the first frame and configured to engage a tree trunk when the article is mounted to the tree trunk, and a tie down mechanism. The tie down mechanism may include a second frame, a tensile member connected to the second frame and configured to extend at least partially around the tree trunk when the article is mounted to the tree trunk, a mechanical ratchet connected to the second frame and configured to tighten the tensile member around the tree trunk when the article is mounted to the tree trunk, and at least one connection between the first frame and the second frame.

In some embodiments, the at least one connection between the first frame and the second frame may include a linkage connecting the second frame to the engagement device. The linkage may include a bar pivotably connected to at least one frame selected from the group consisting of the first frame and the second frame.

In an additional aspect, a method of mounting an article to a tree trunk is provided. The method may include mounting an upper portion of the article to an upper portion of the tree trunk so that the article is at least partially supported by the tree trunk. Further, the method may then include adjusting orientation of the article relative to the tree trunk while the upper portion of the article is mounted to the upper portion of the tree trunk. The article may include a linkage connecting a lower engagement device of the article to a frame of the article. Adjusting of the orientation of the article may include repositioning the lower engagement device relative to the frame. An outer side of the lower engagement device may be engaged against a lower portion of the tree trunk. Repositioning of the lower engagement device relative to the frame may include reconfiguring the linkage from a first configuration to a second configuration.

In some embodiments, mounting of the upper portion may include engaging an upper engagement device against the upper portion of the tree trunk. Adjusting of the orientation of the article may further include securing the linkage in the second configuration. Moving of the lower engagement device relative to the frame may include one or more of pivoting the lower engagement device relative to the frame, moving the lower engagement device inwardly relative to the frame, and/or moving the lower engagement device outwardly relative to the frame.

In some embodiments, the article may include a tree stand. The article may include a ladder. The article may include a climbing stick.

These and other features, aspects, and advantages of the disclosure will be apparent from the following detailed description together with the accompanying drawings, which are briefly described below.

BRIEF DESCRIPTION OF THE DRAWINGS

Figure 1A:
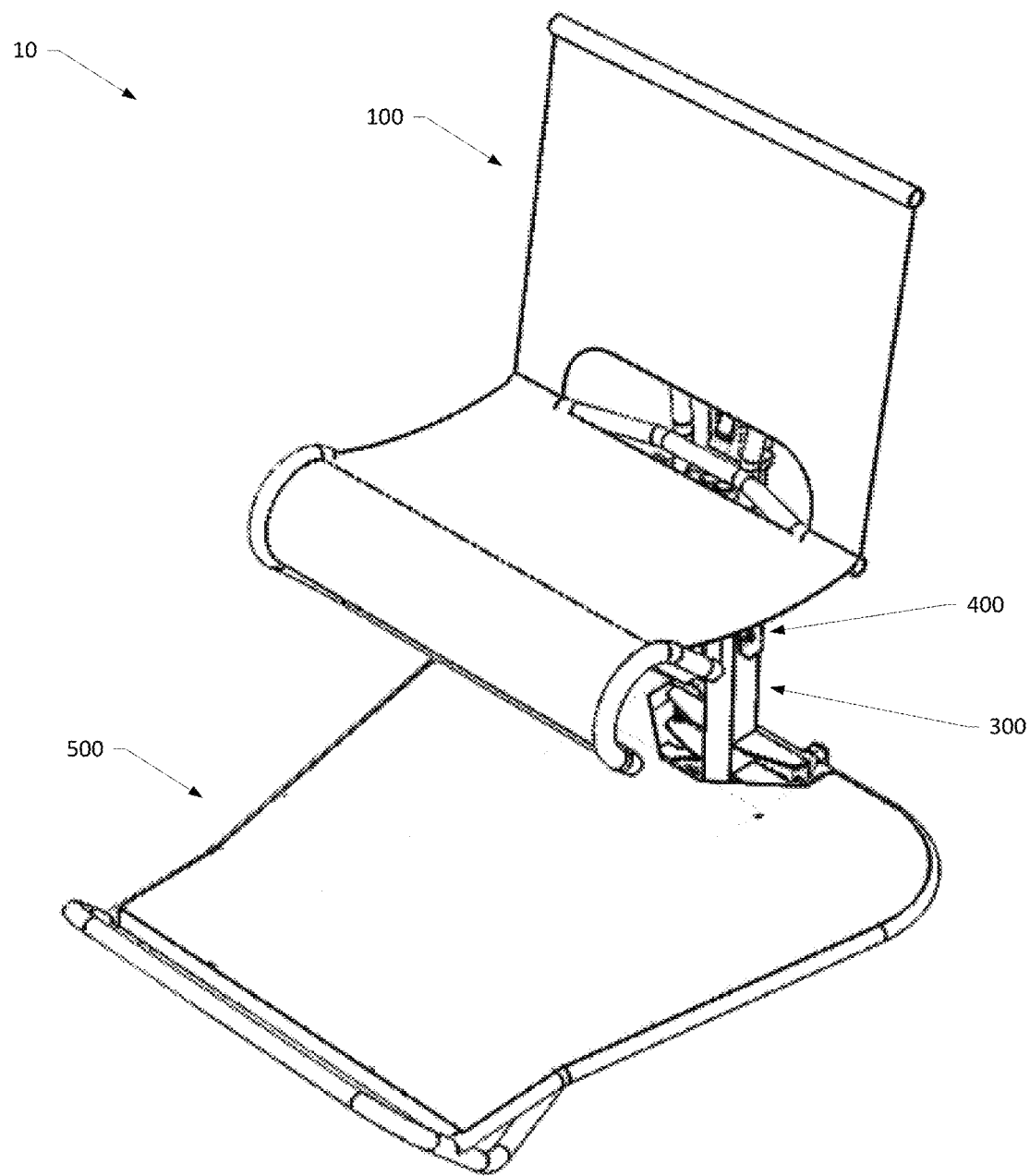
Figure 1B:
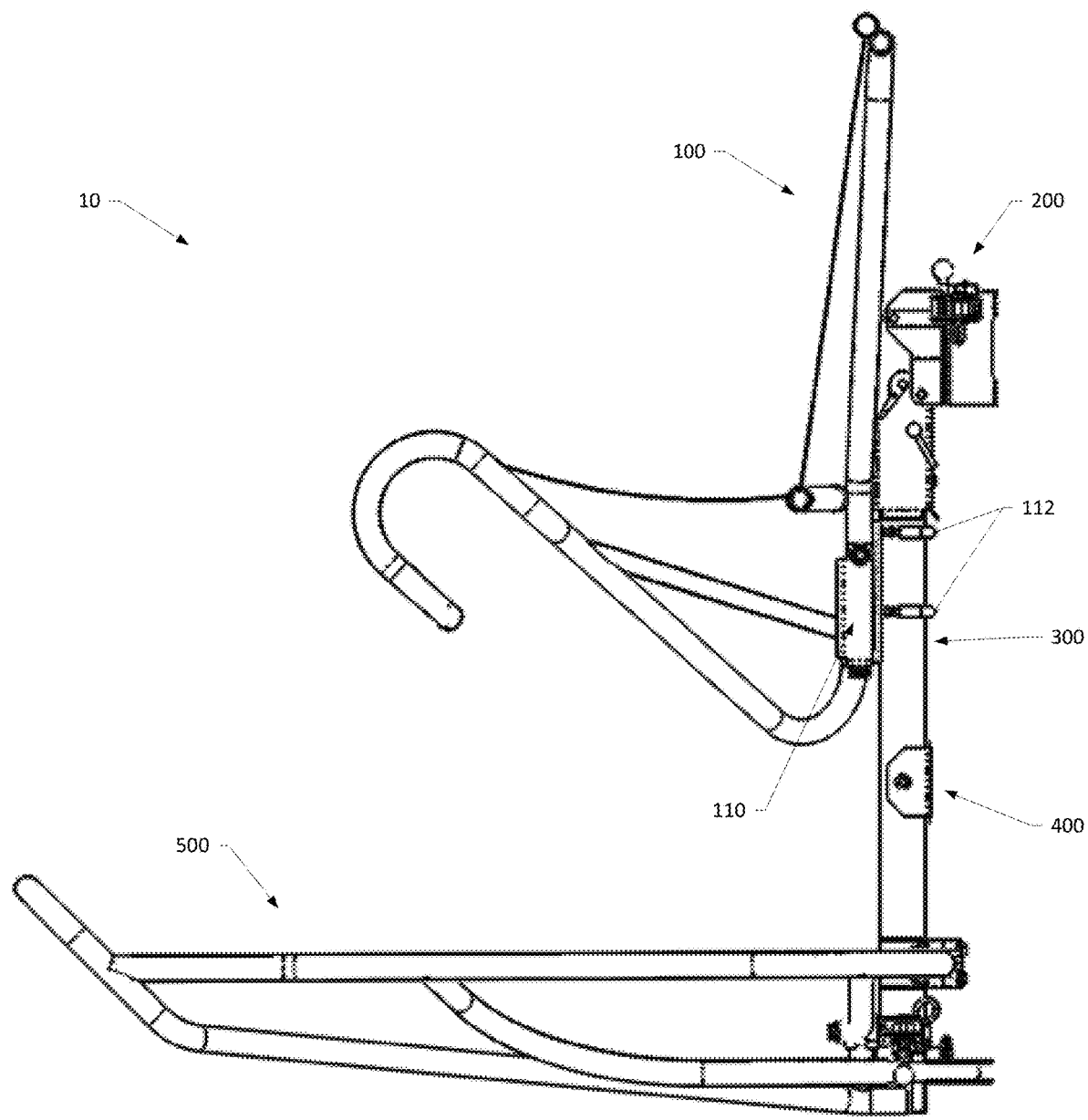
Figure 1C:
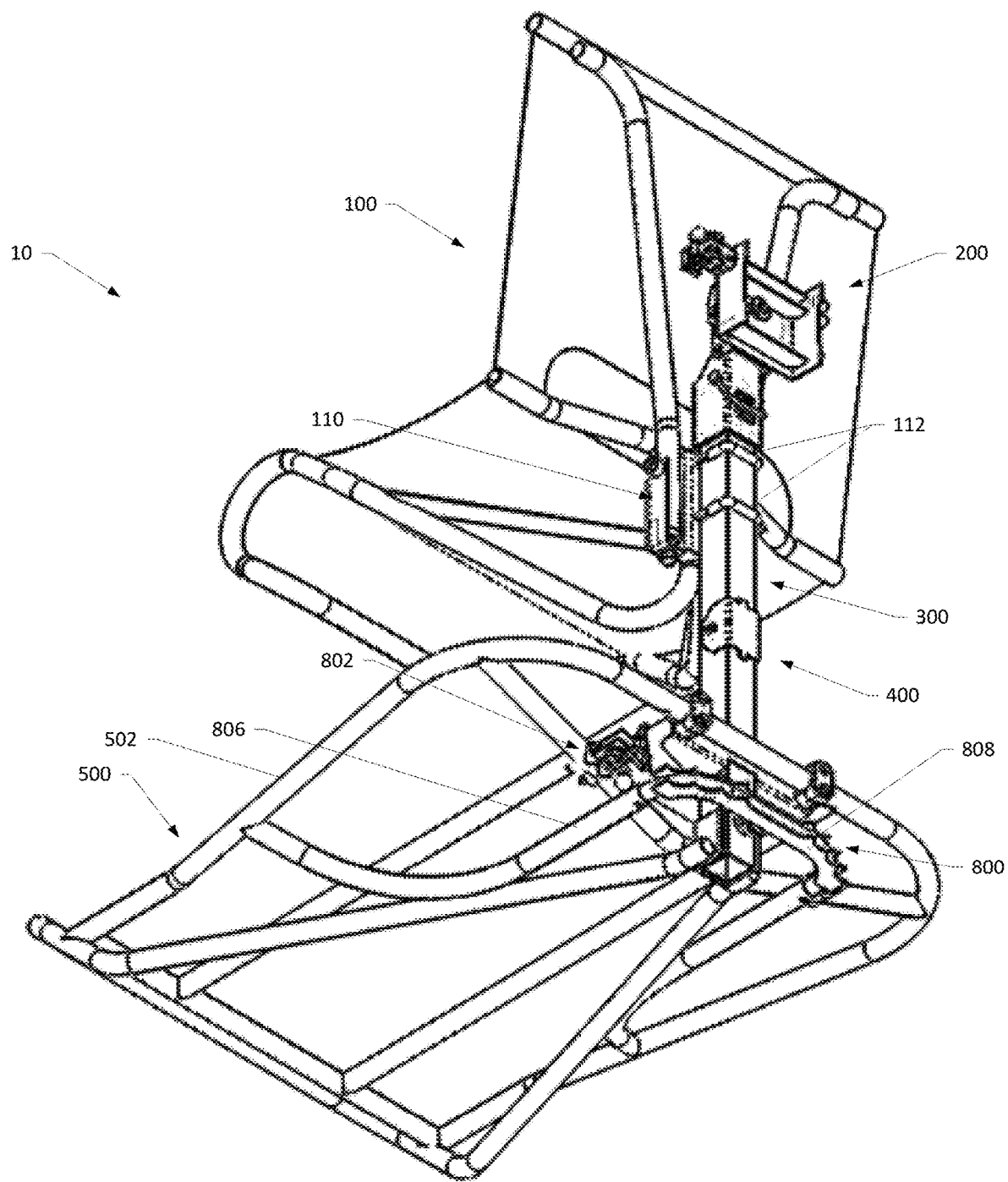
Figure 2A:
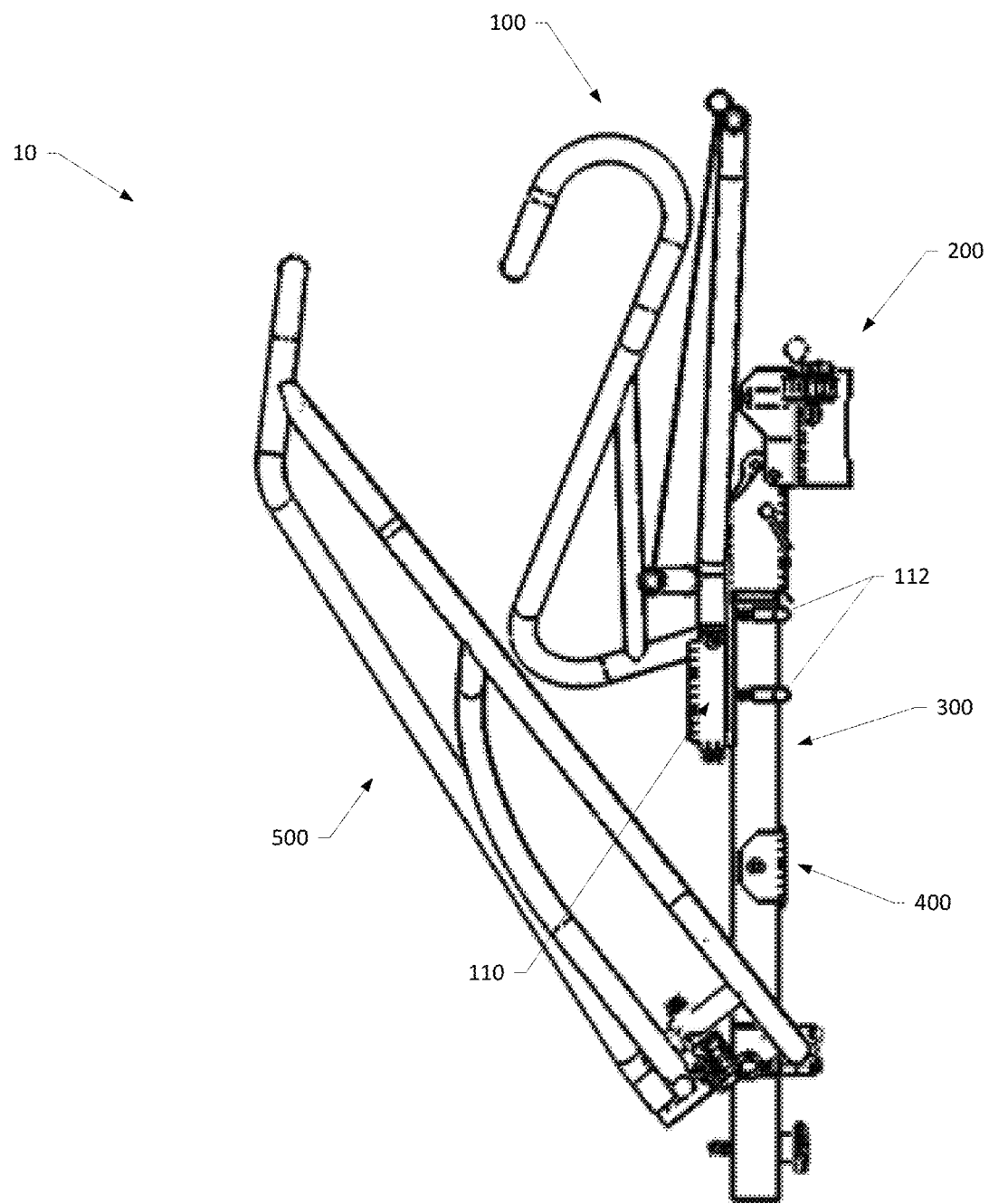
Figure 2B:
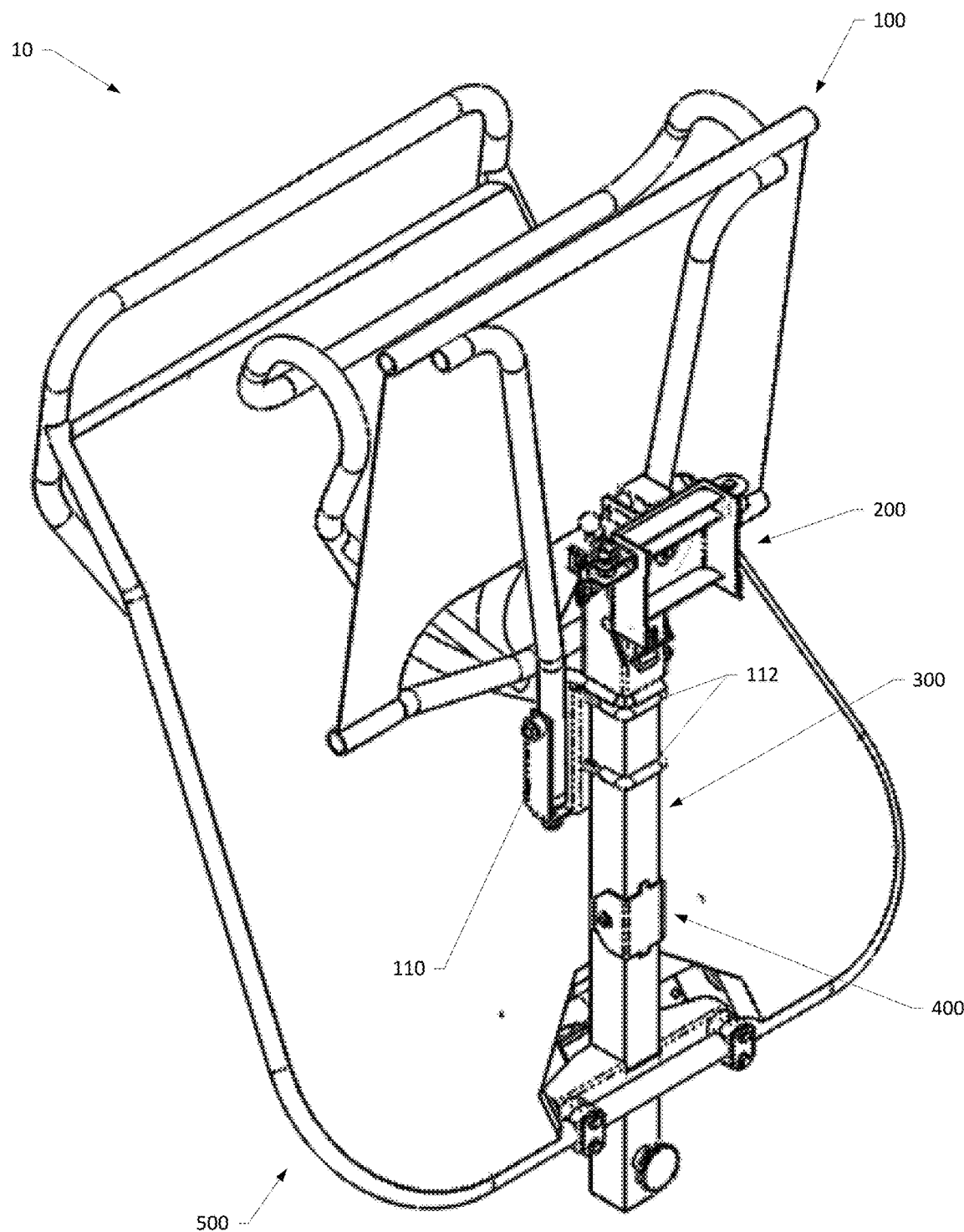
Figure 3:
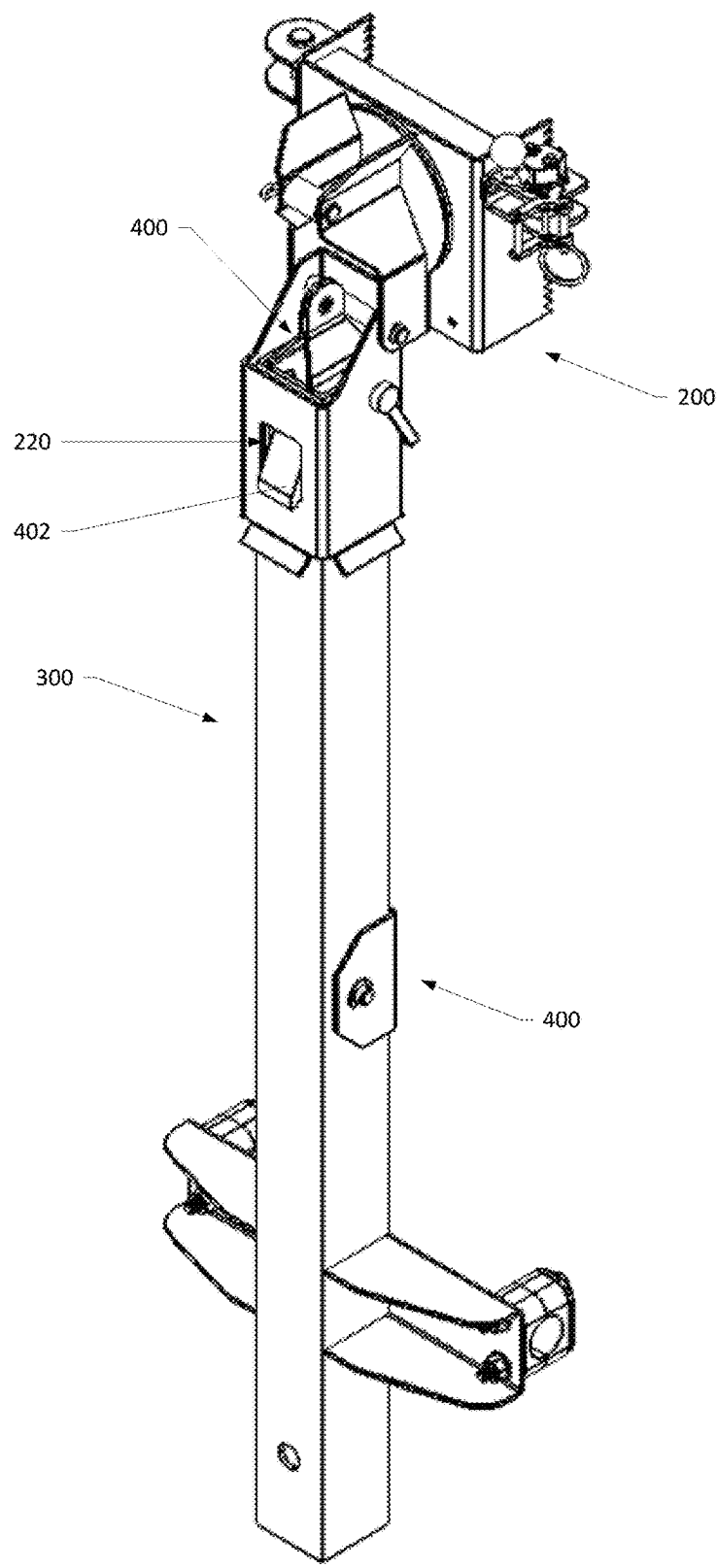
Figure 4A:
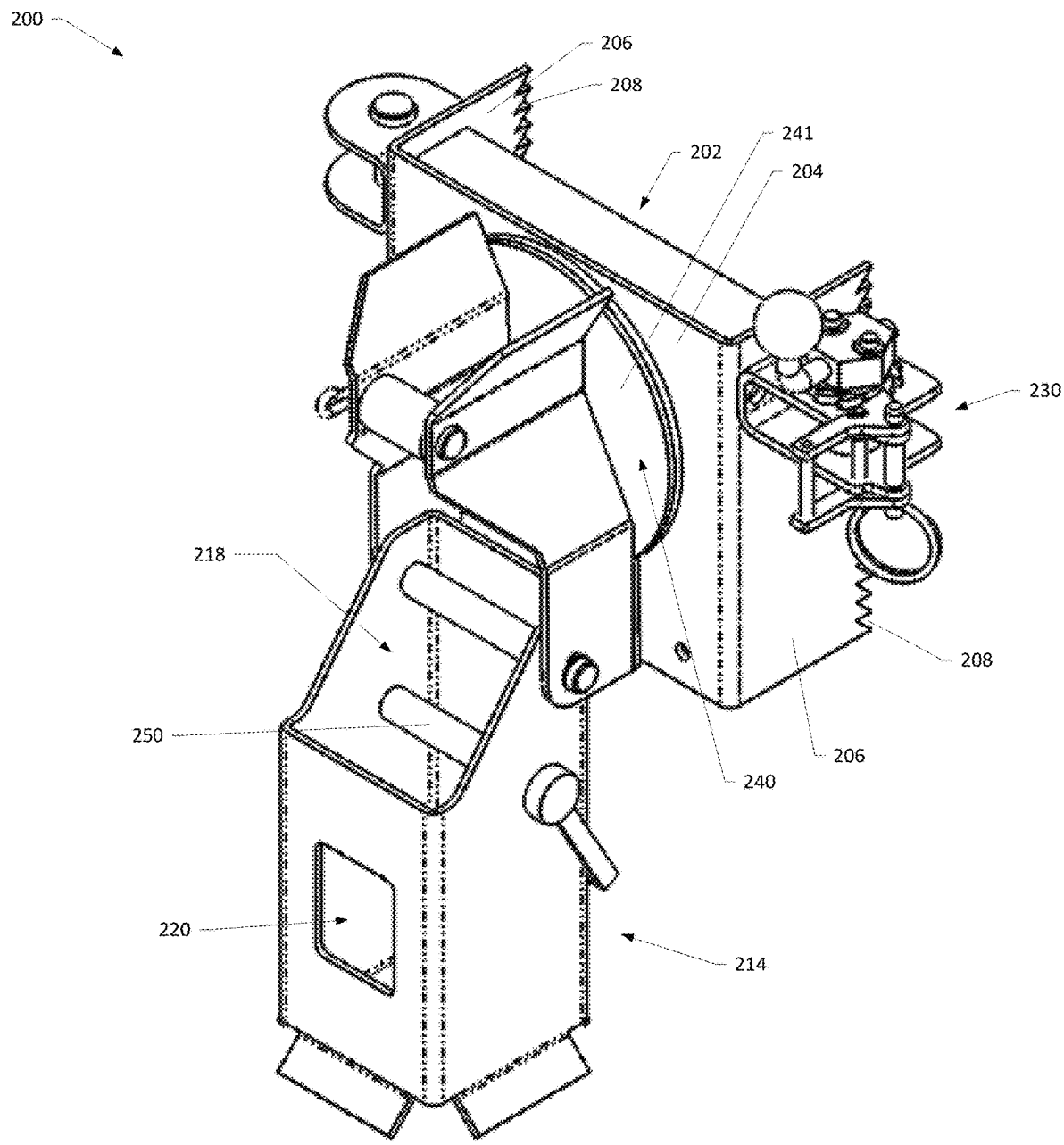
Figure 4B:
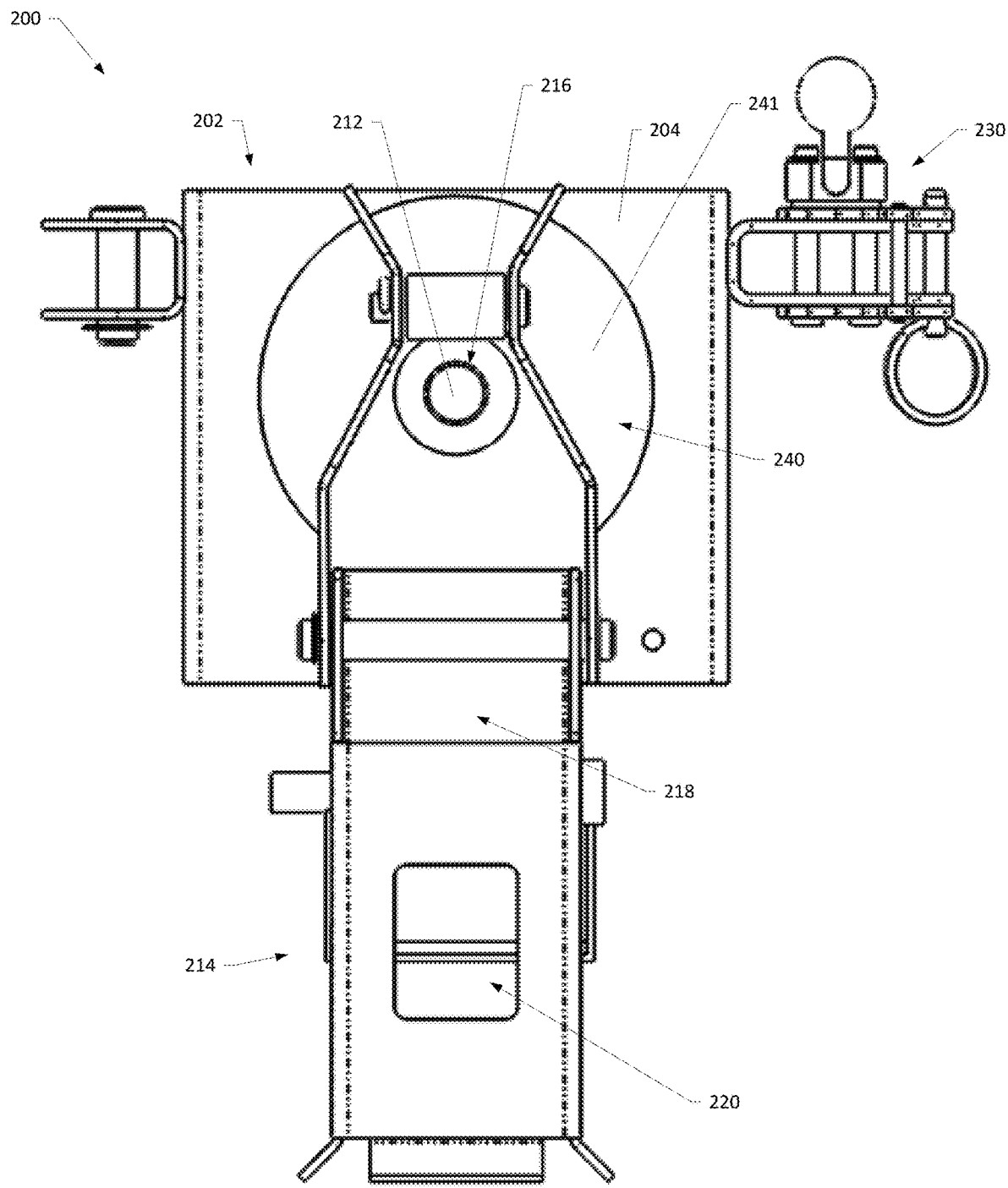
Figure 4C:
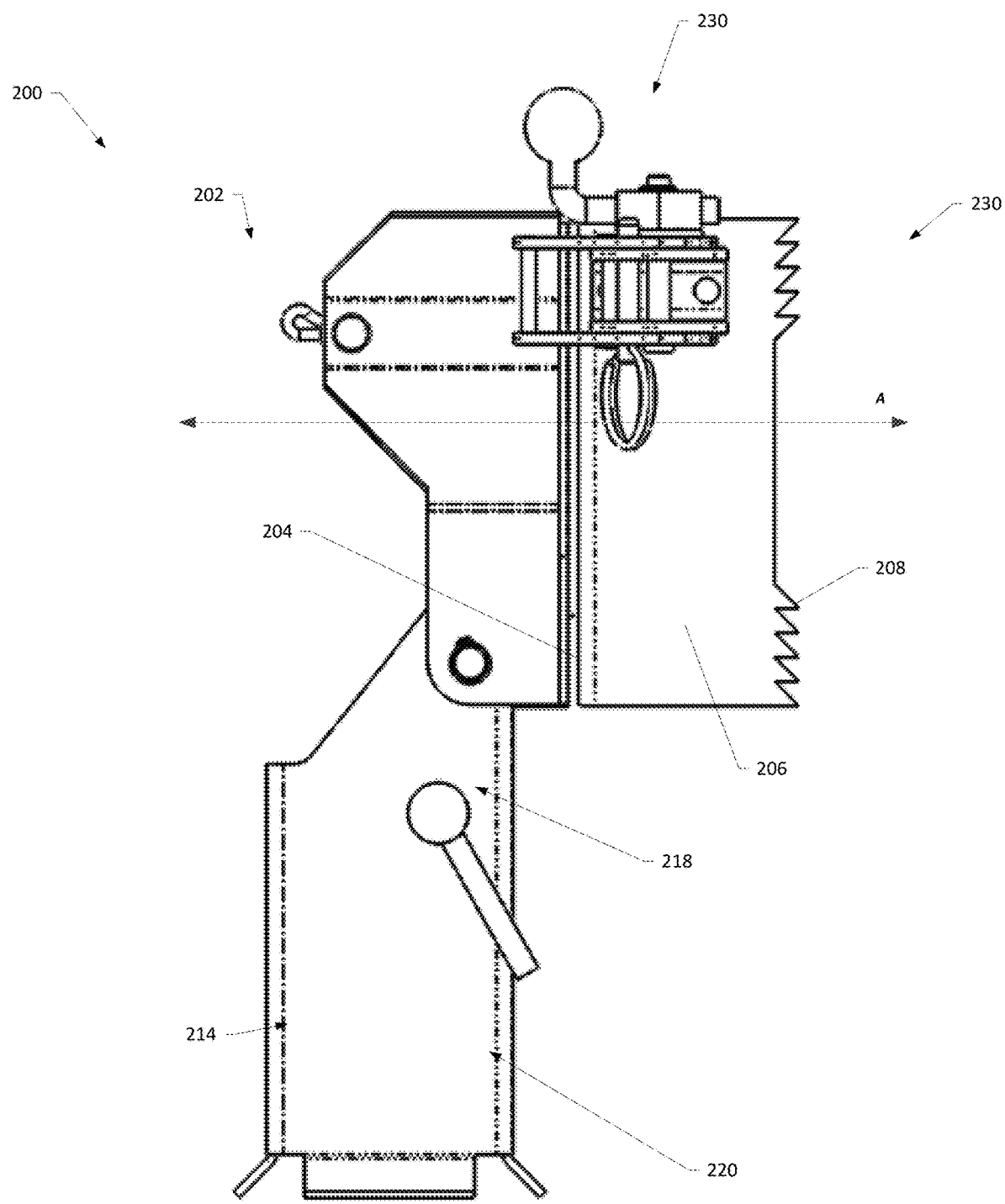
Figure 4D:
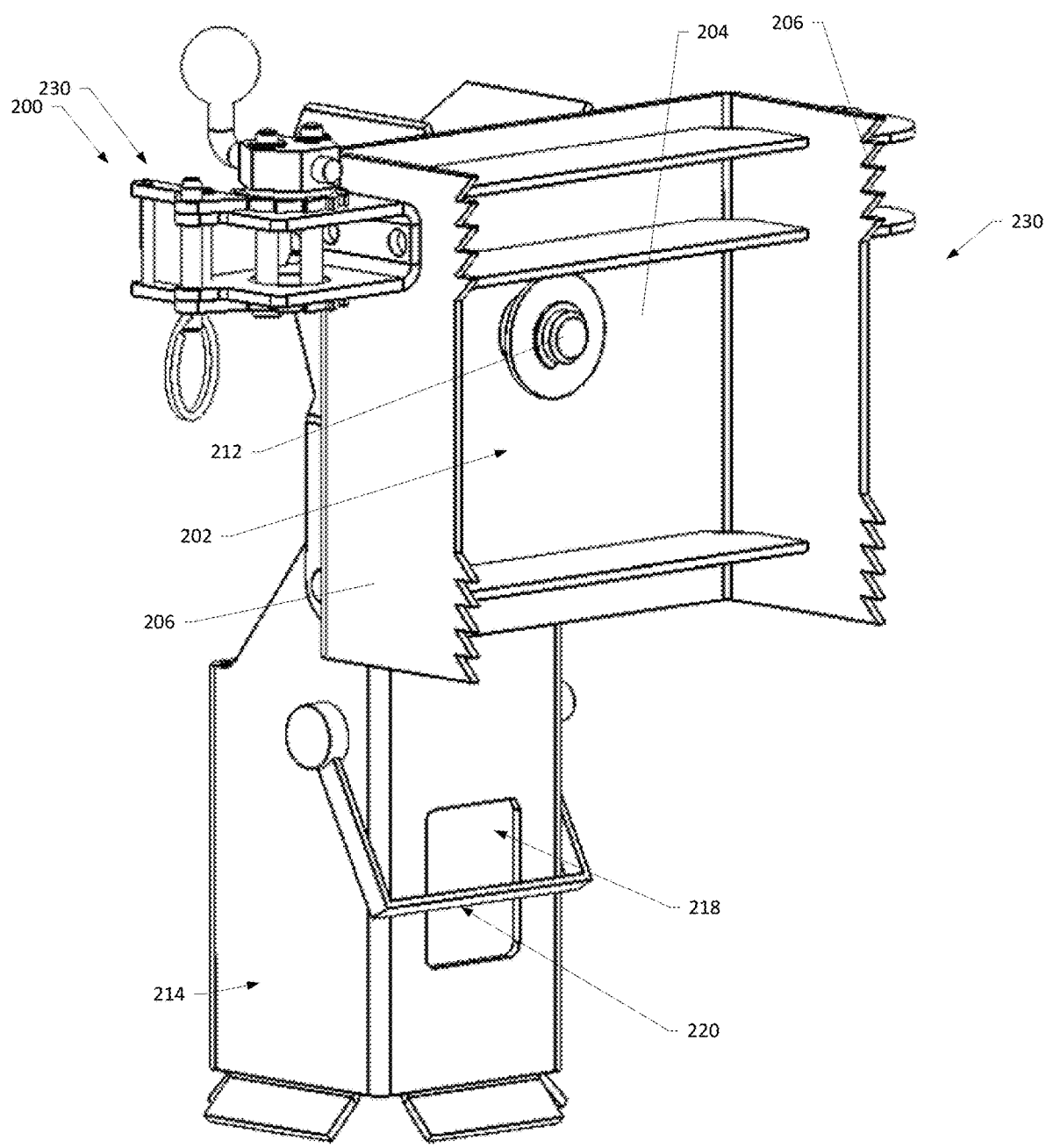
Figure 5:
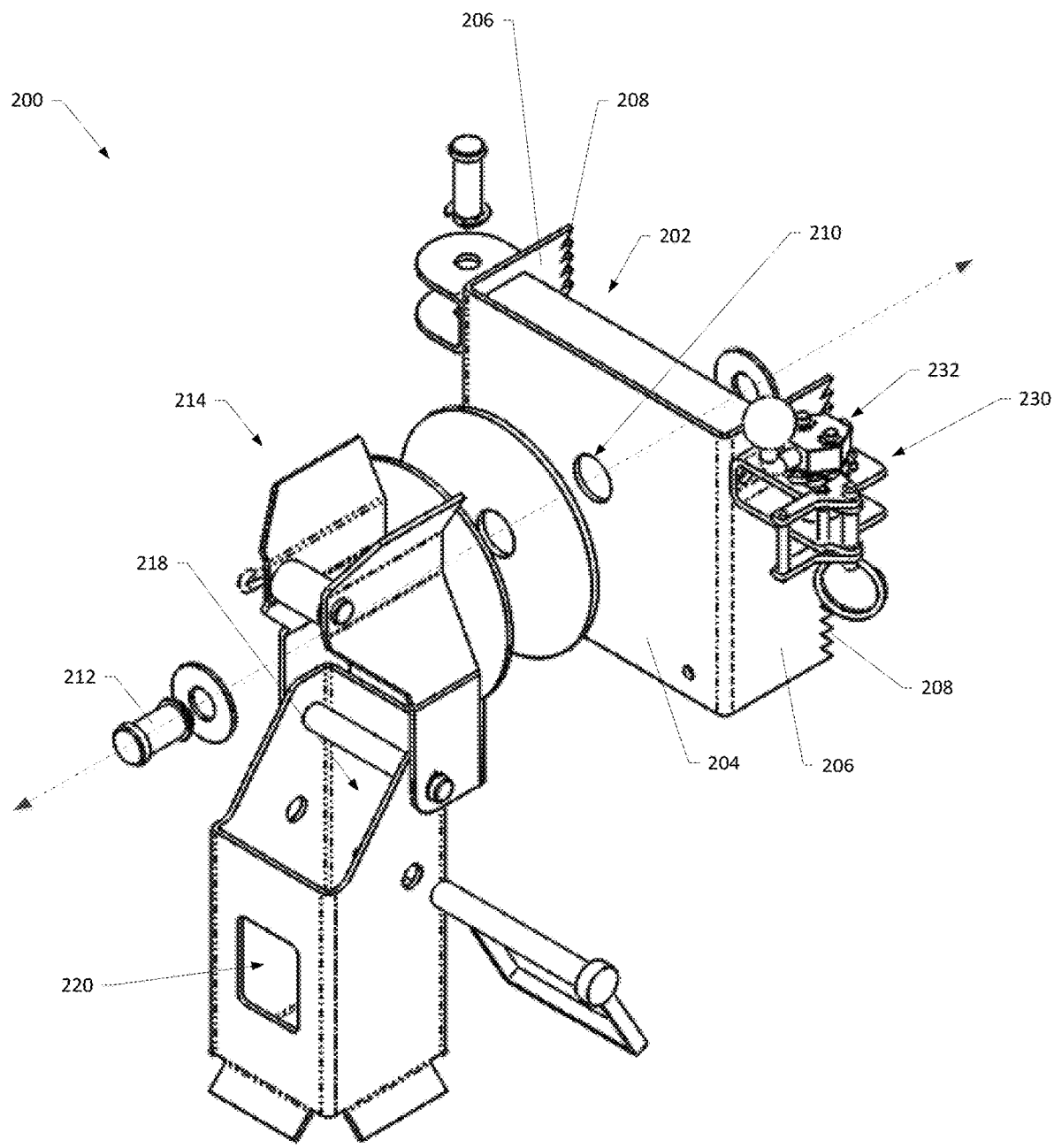
Figure 6:
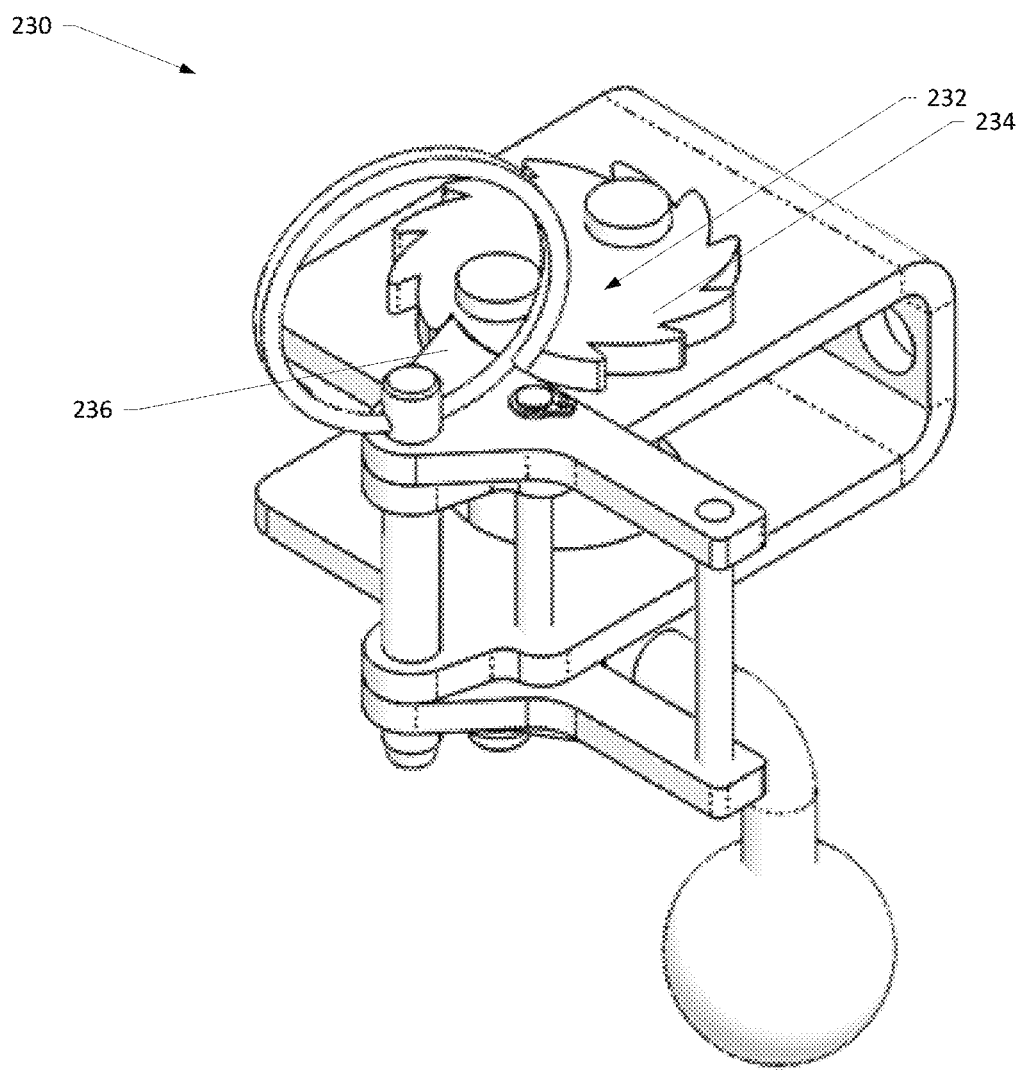
Figure 7:
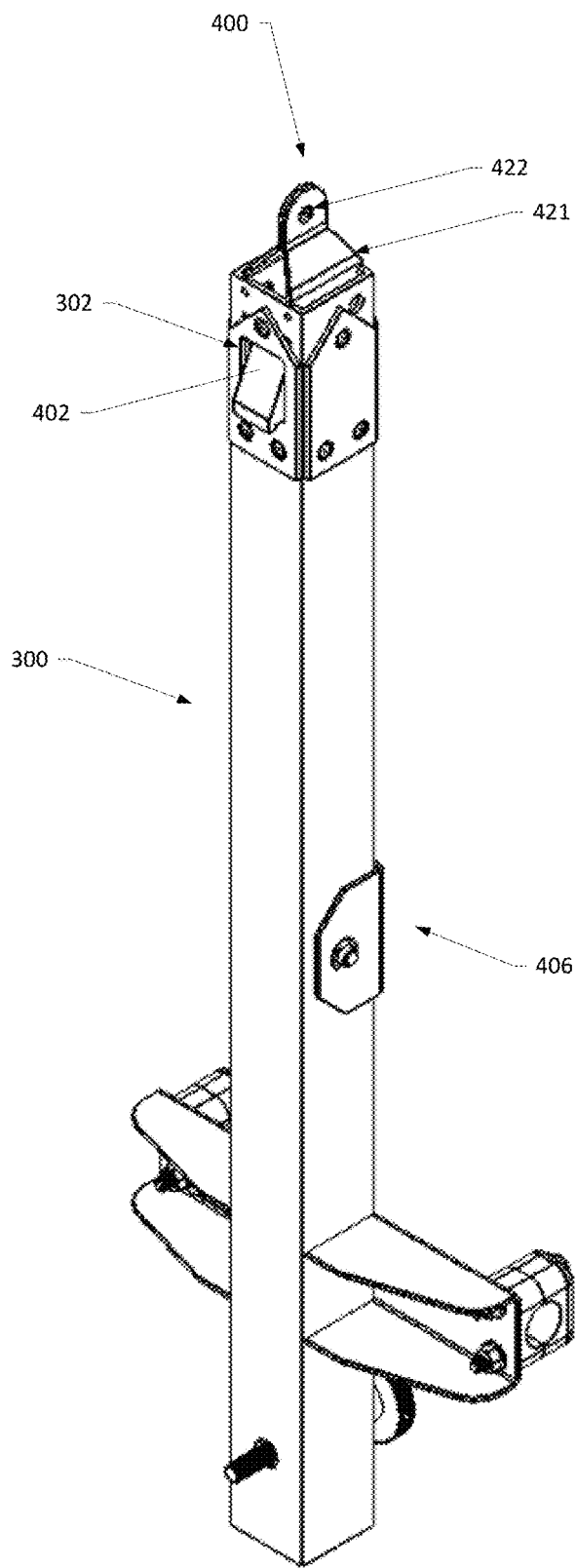
Figure 8:
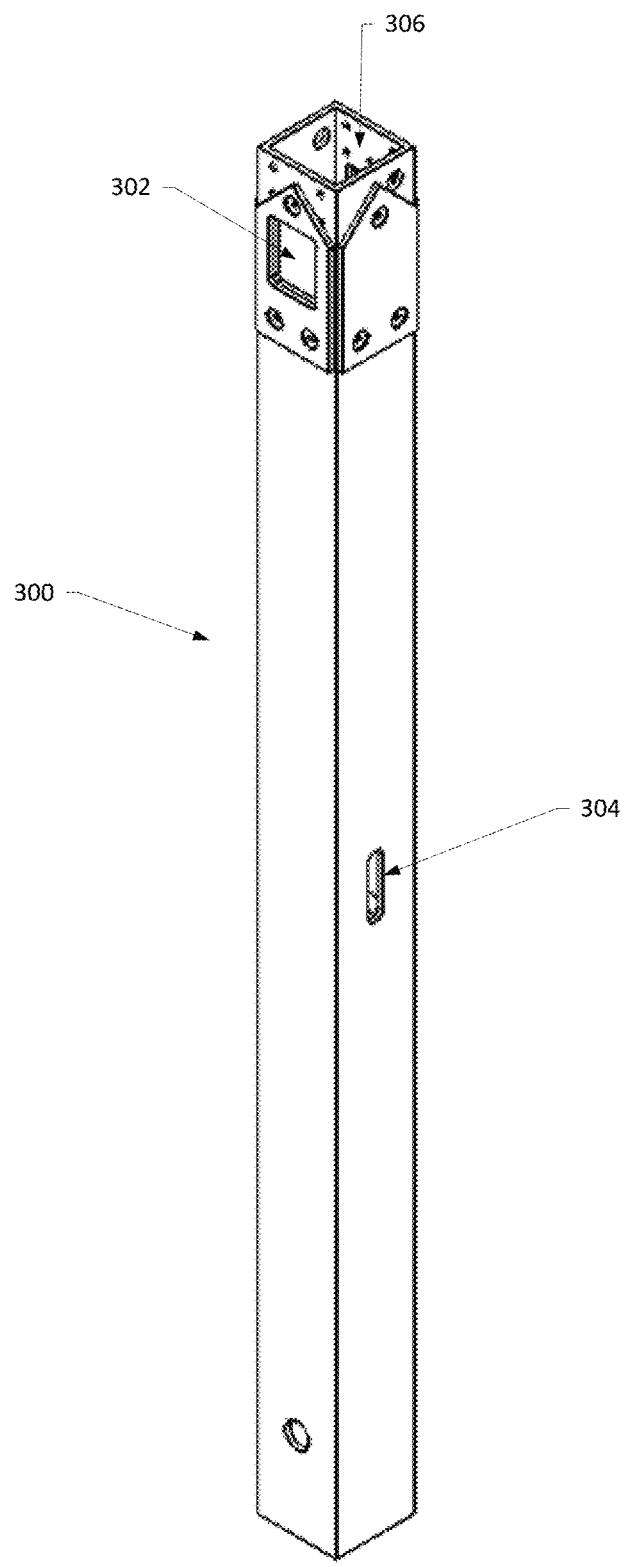
Figure 9:
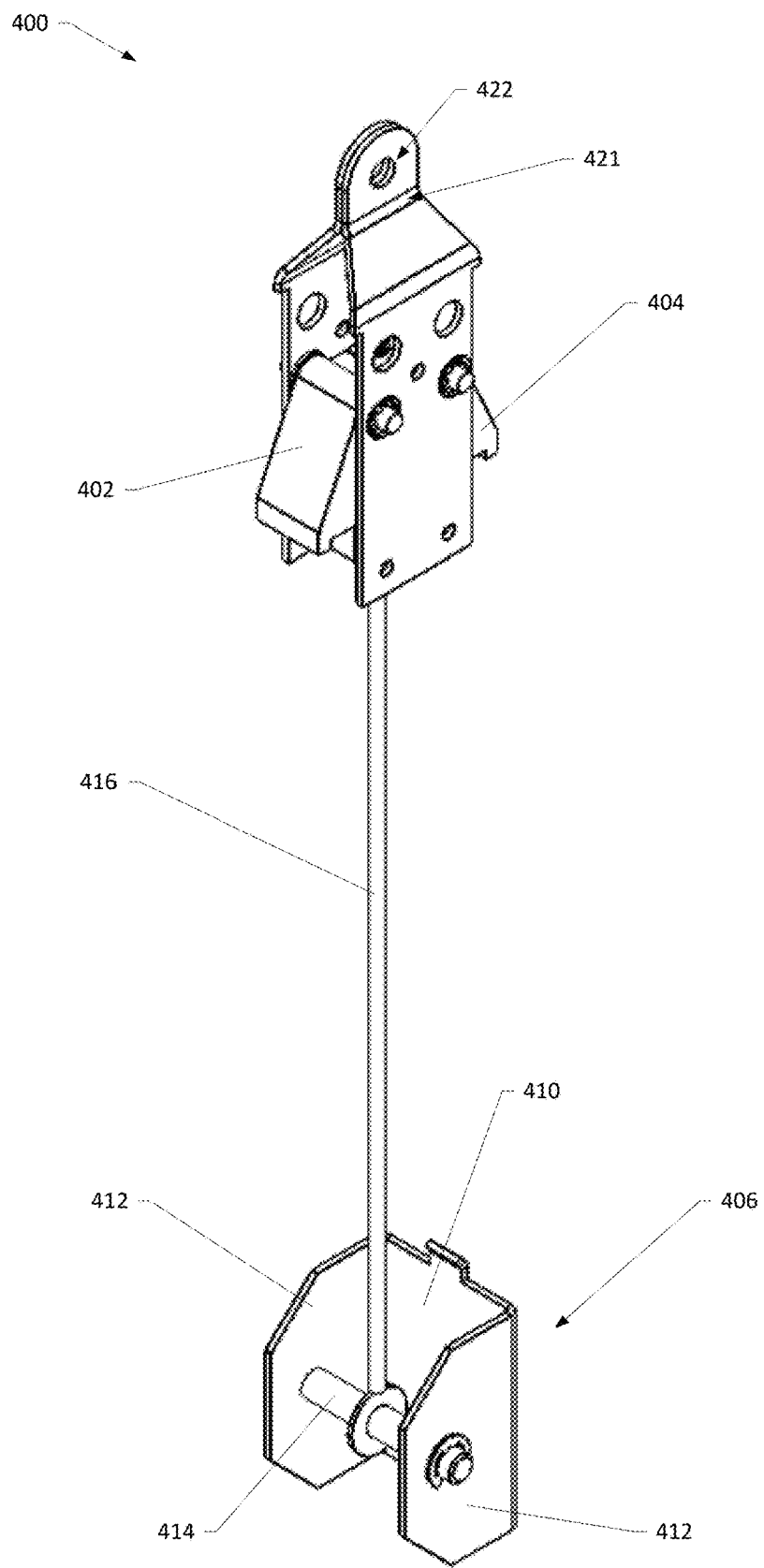
Figure 10A:
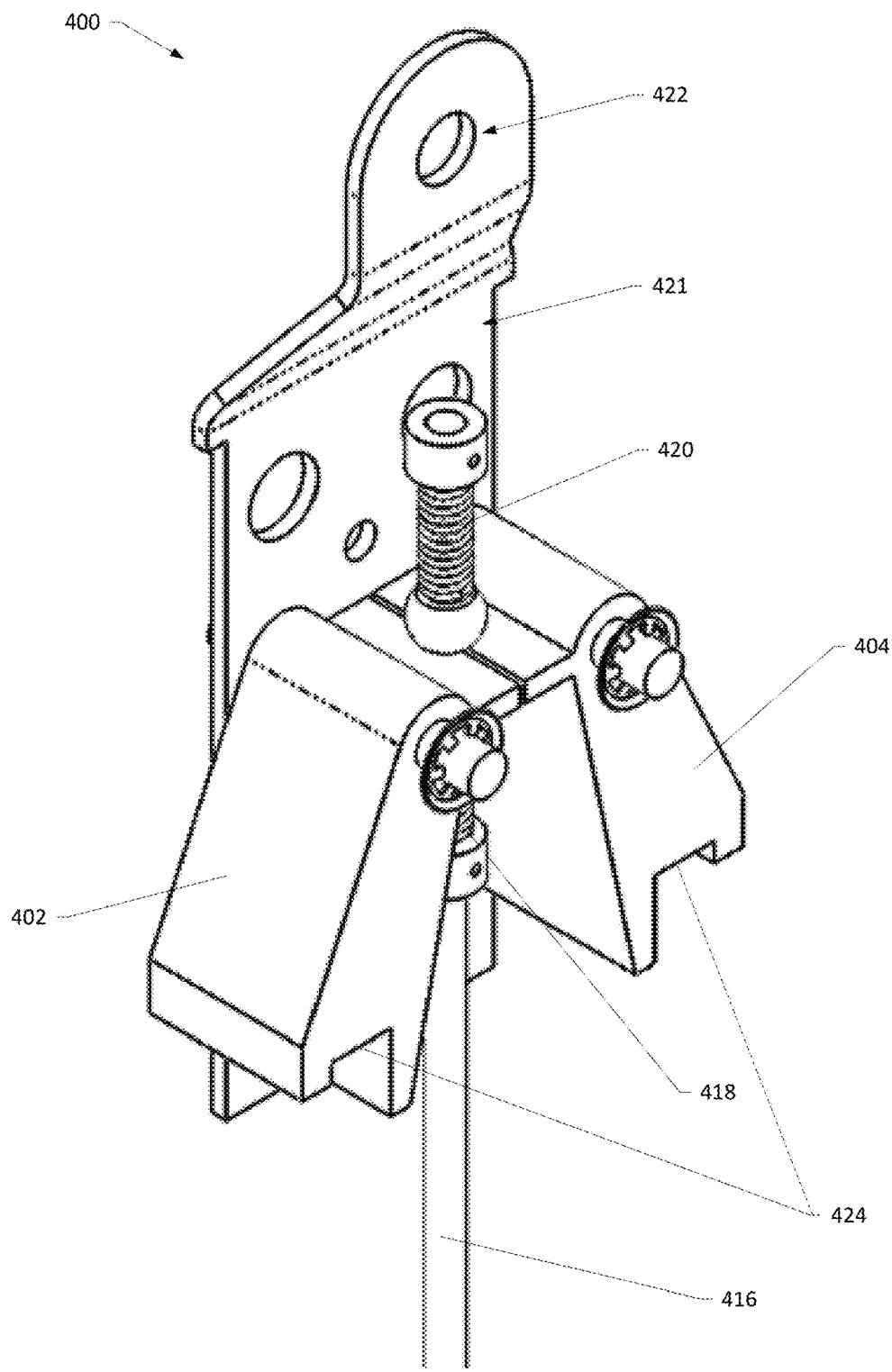
Figure 10B:
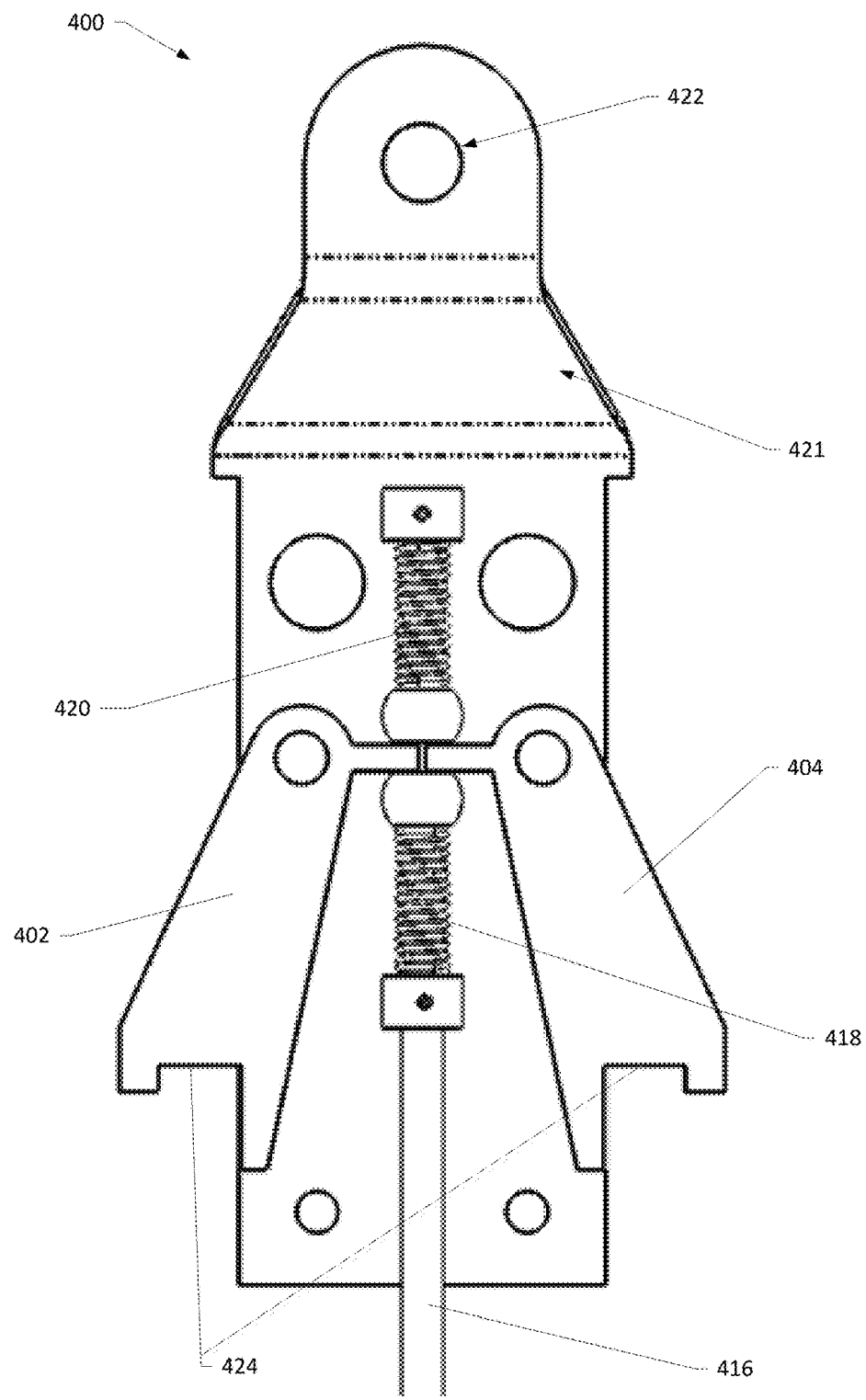
Figure 11:
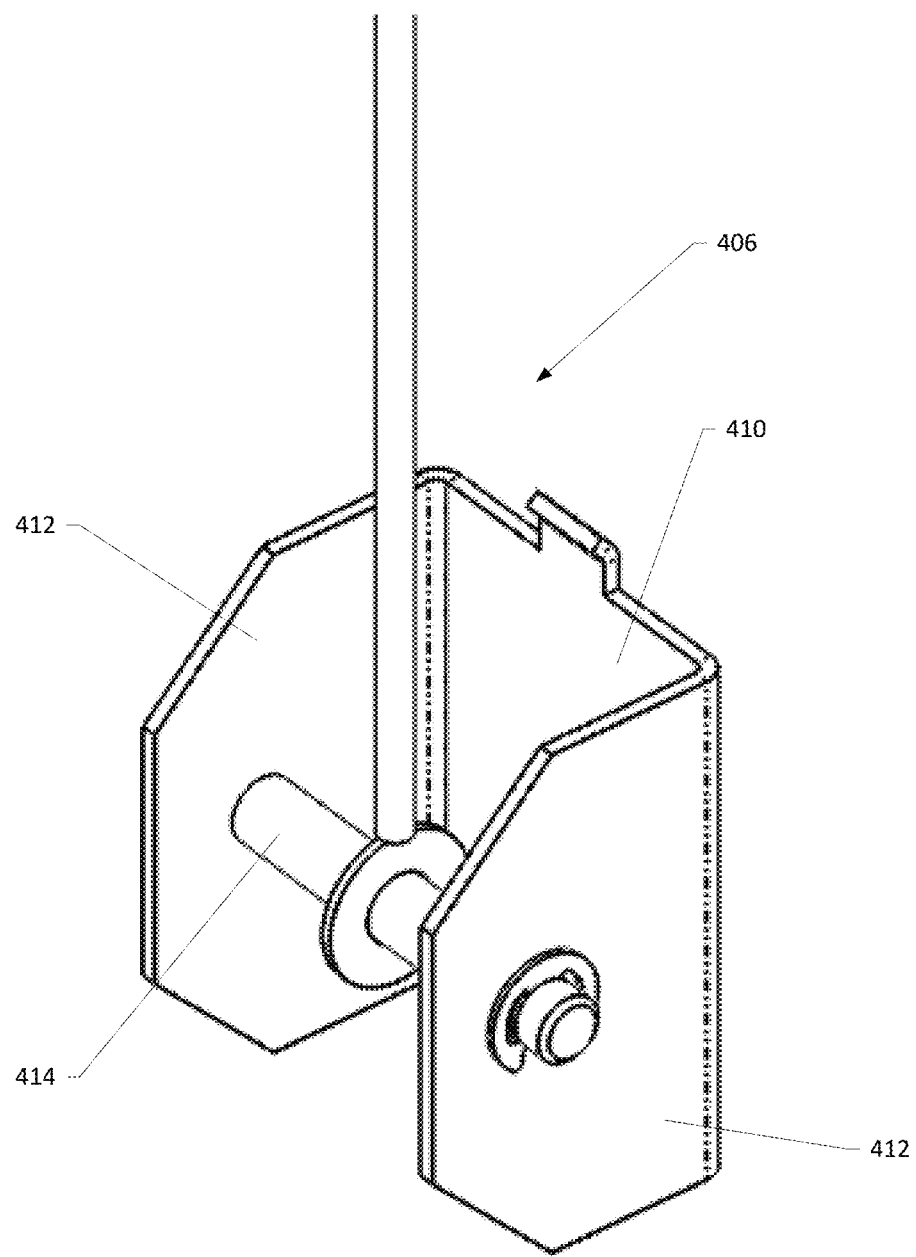
Figure 12A:
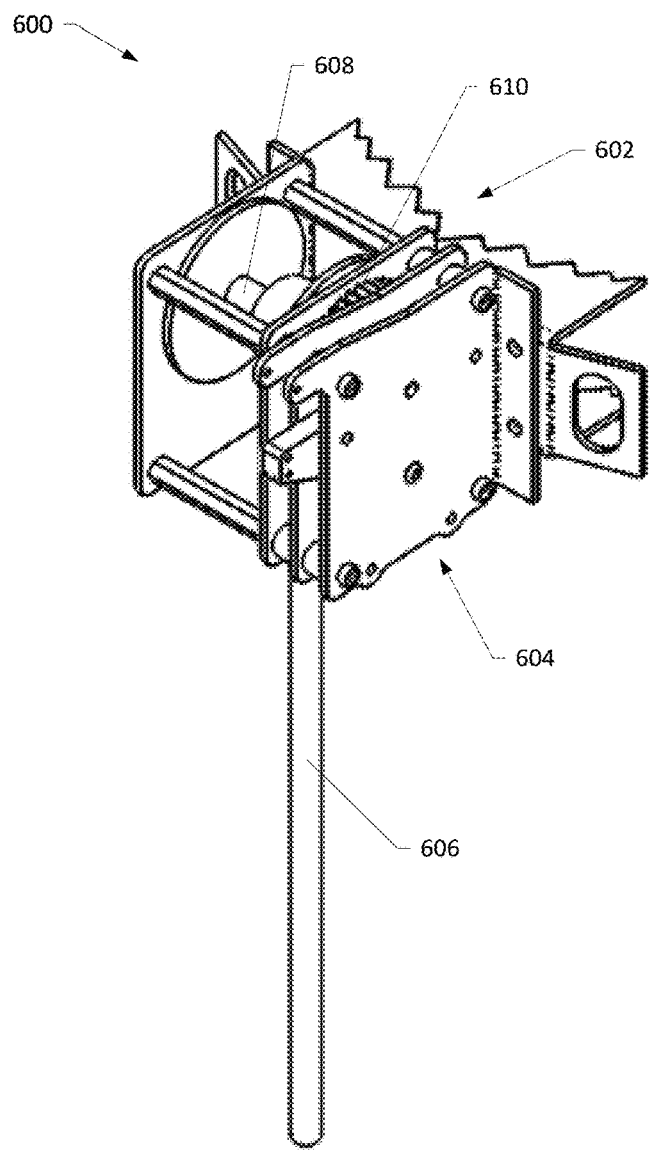
Figure 12B:
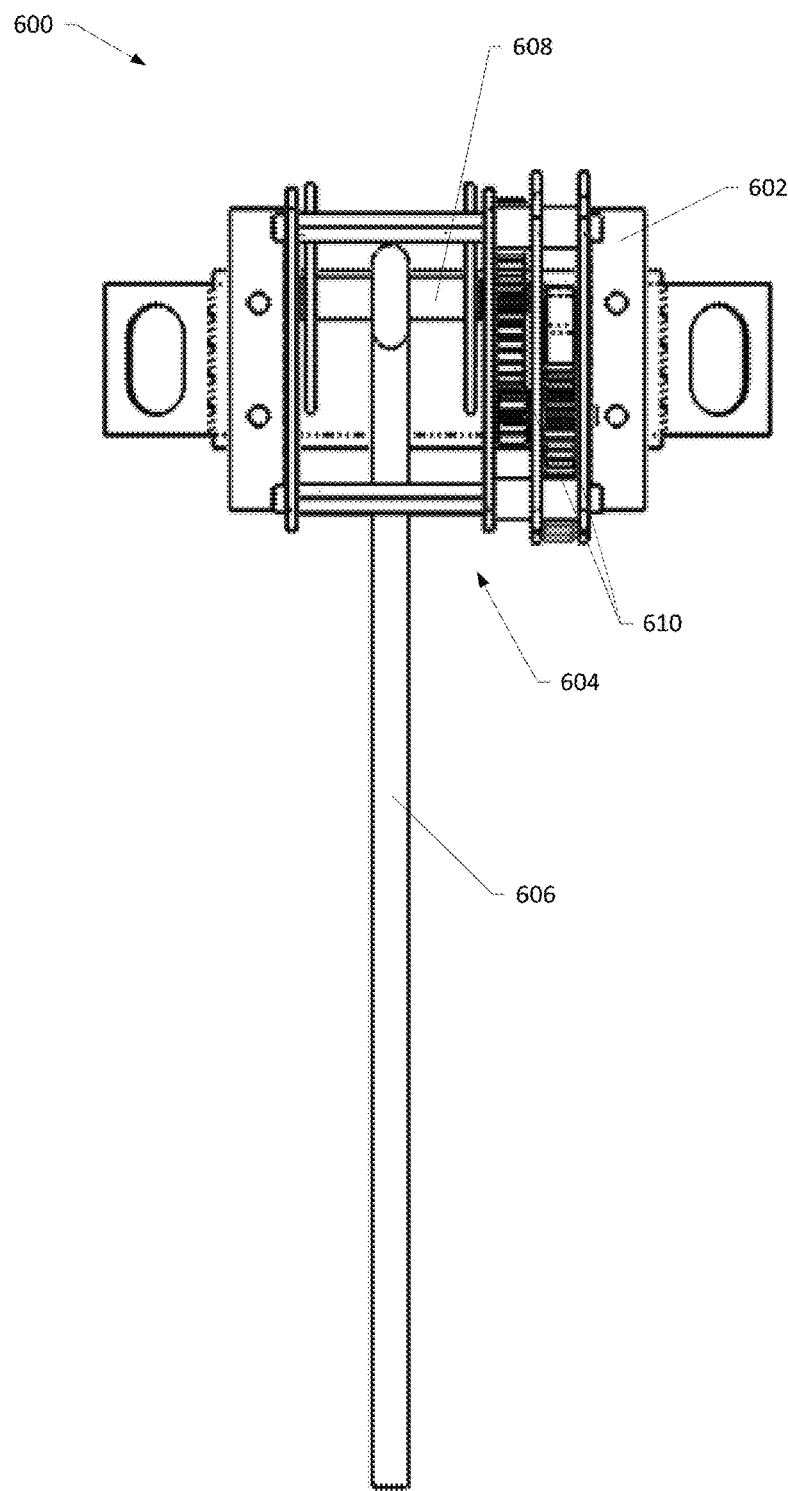
Figure 13A:
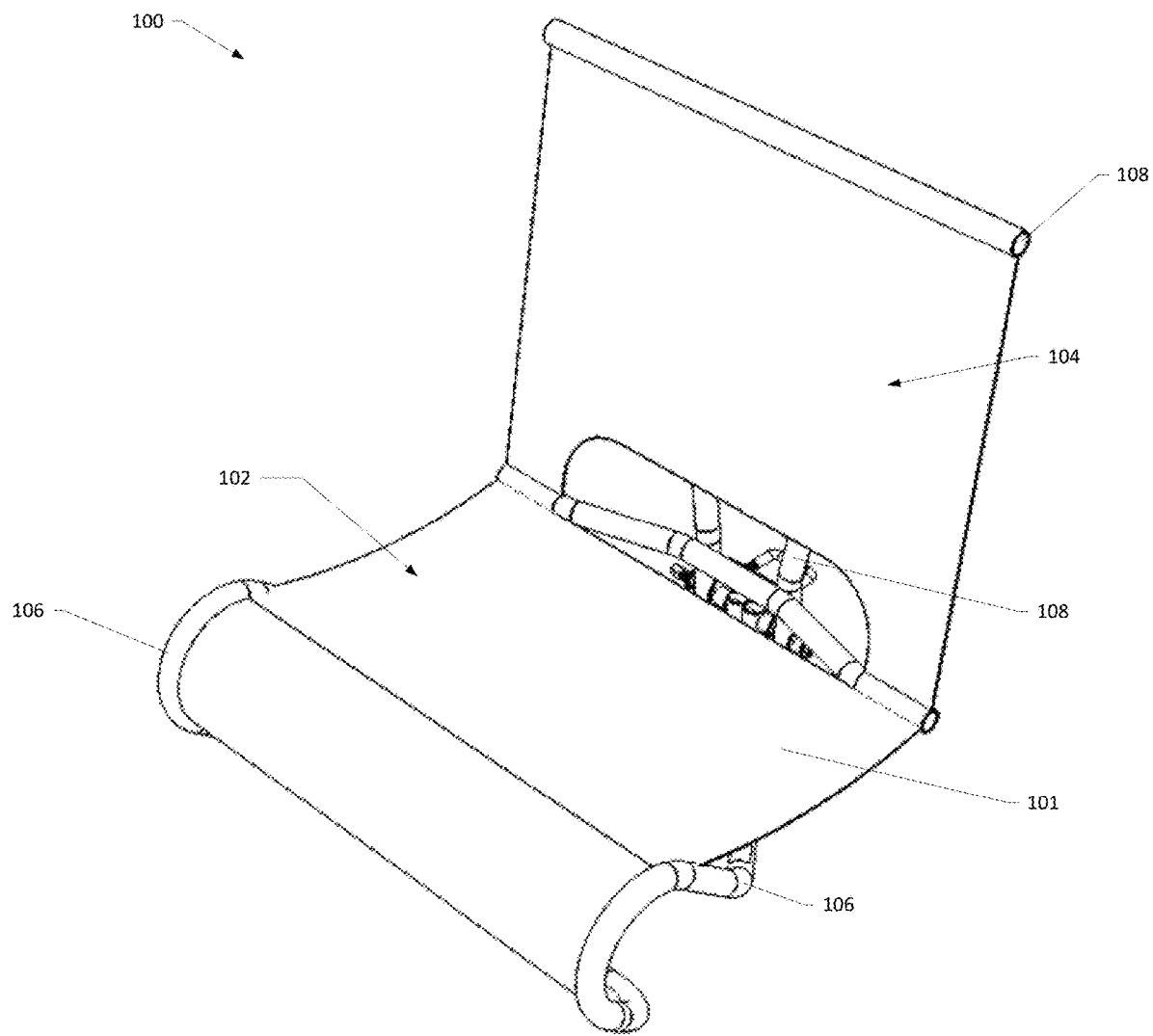
Figure 13B:
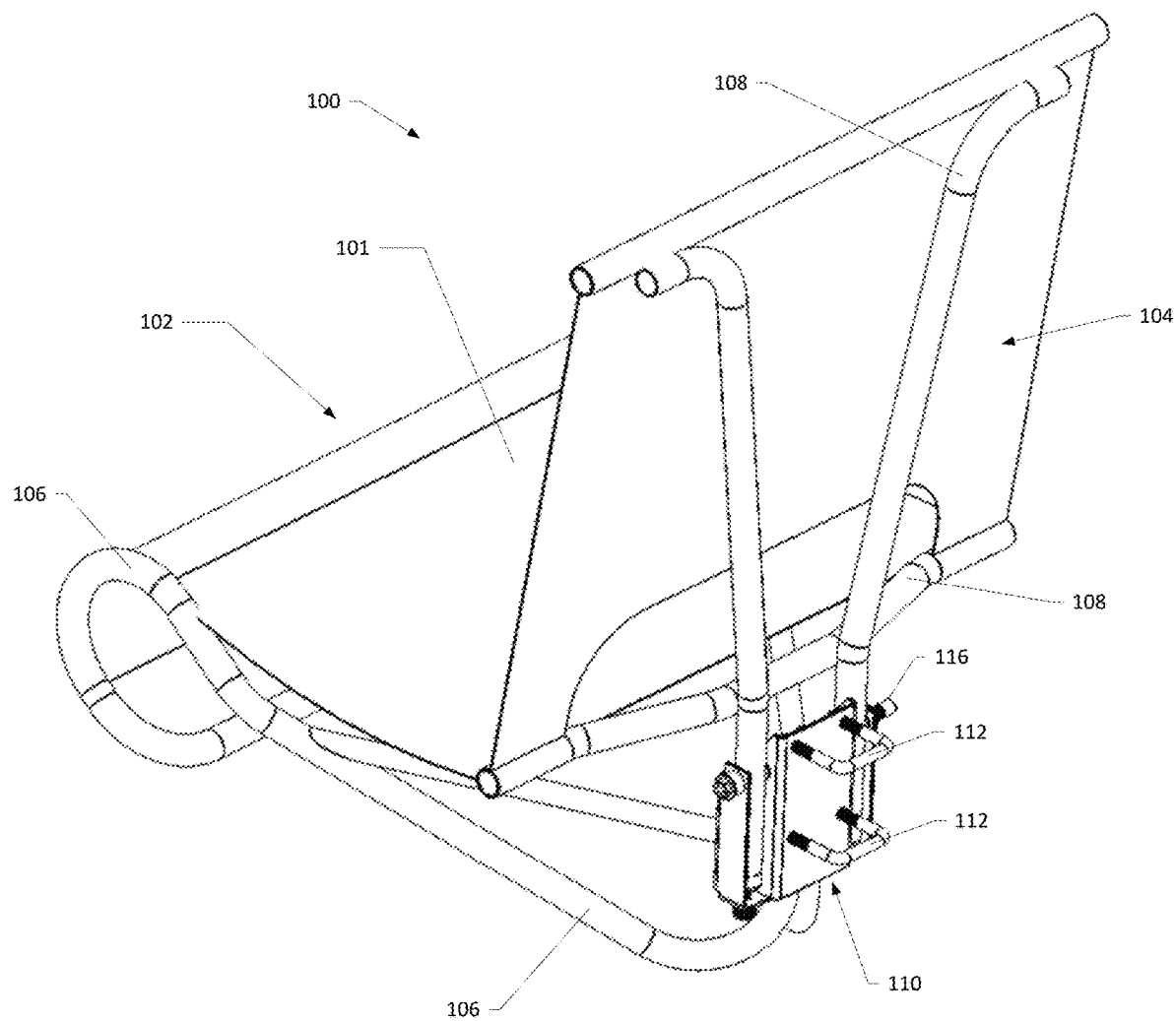
Figure 14:
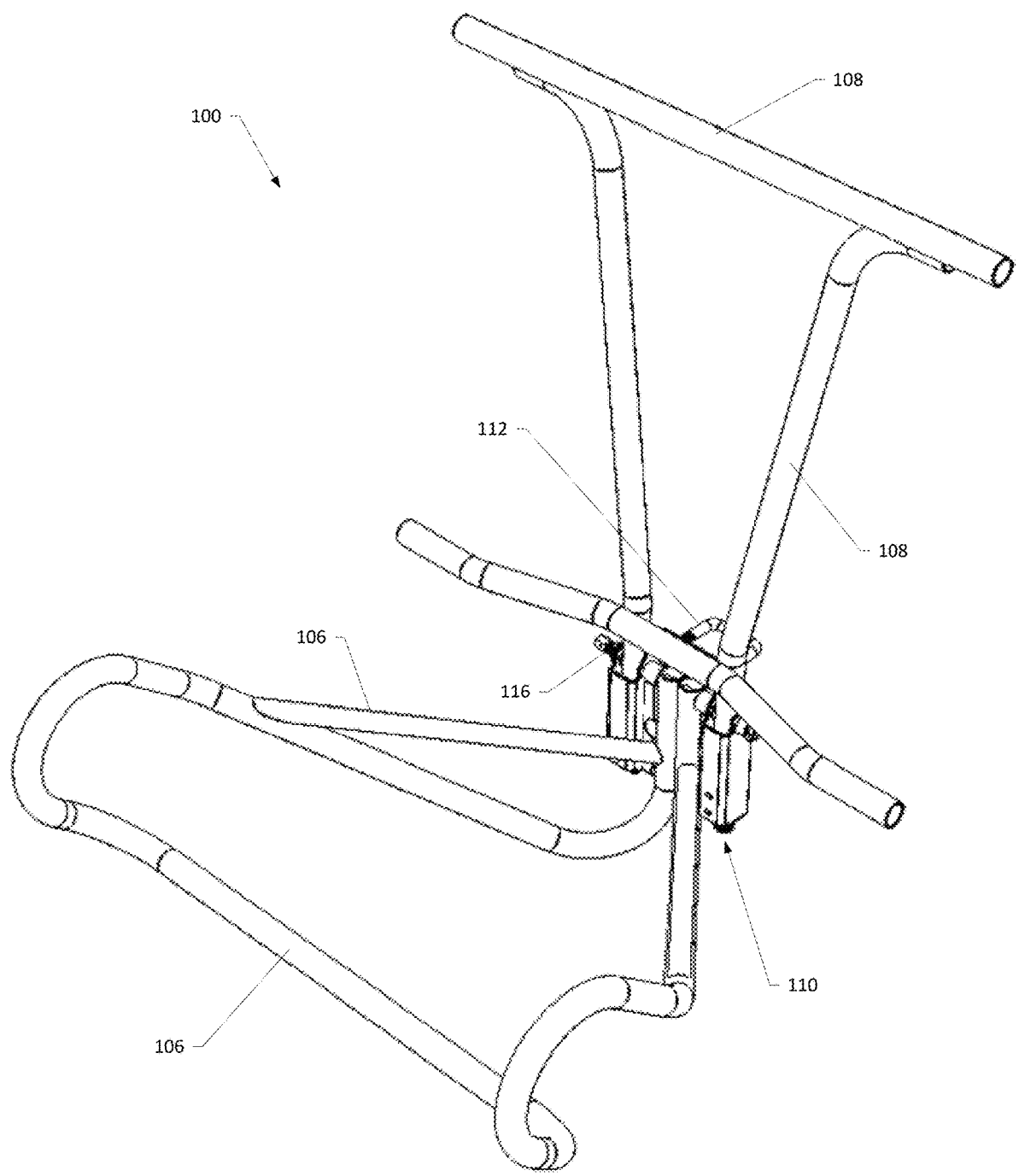
Figure 15A:
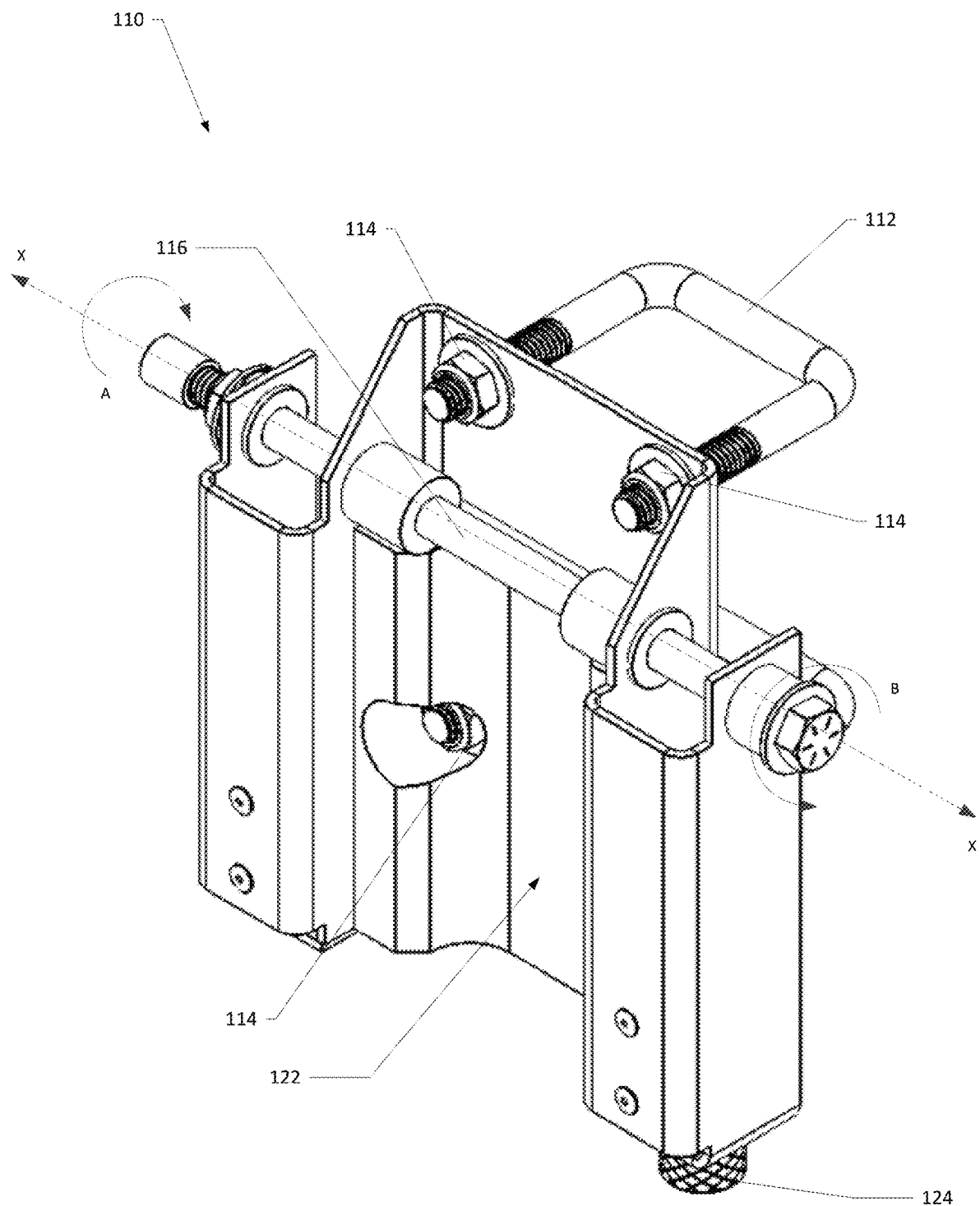
Figure 15B:
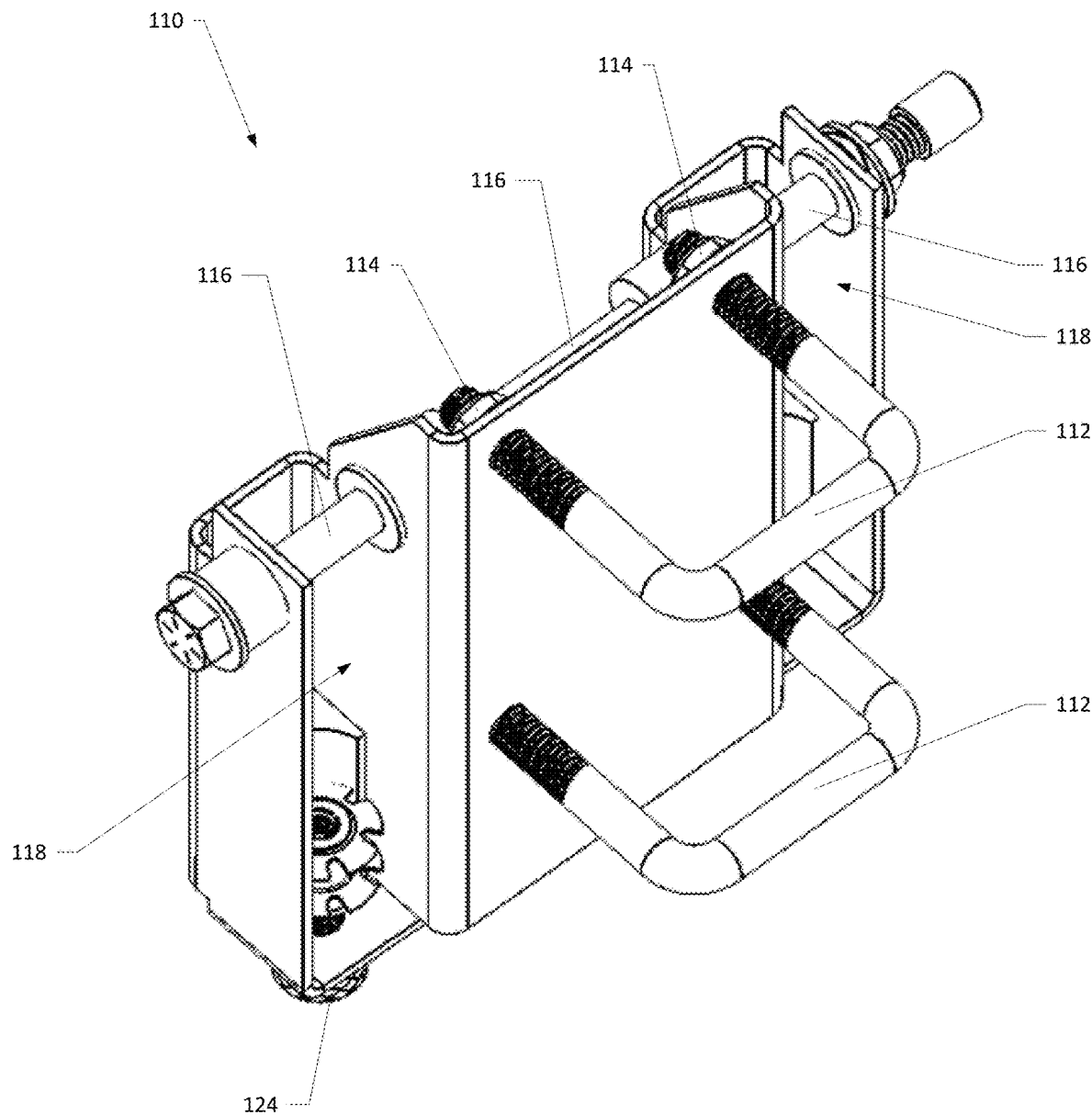
Figure 16:
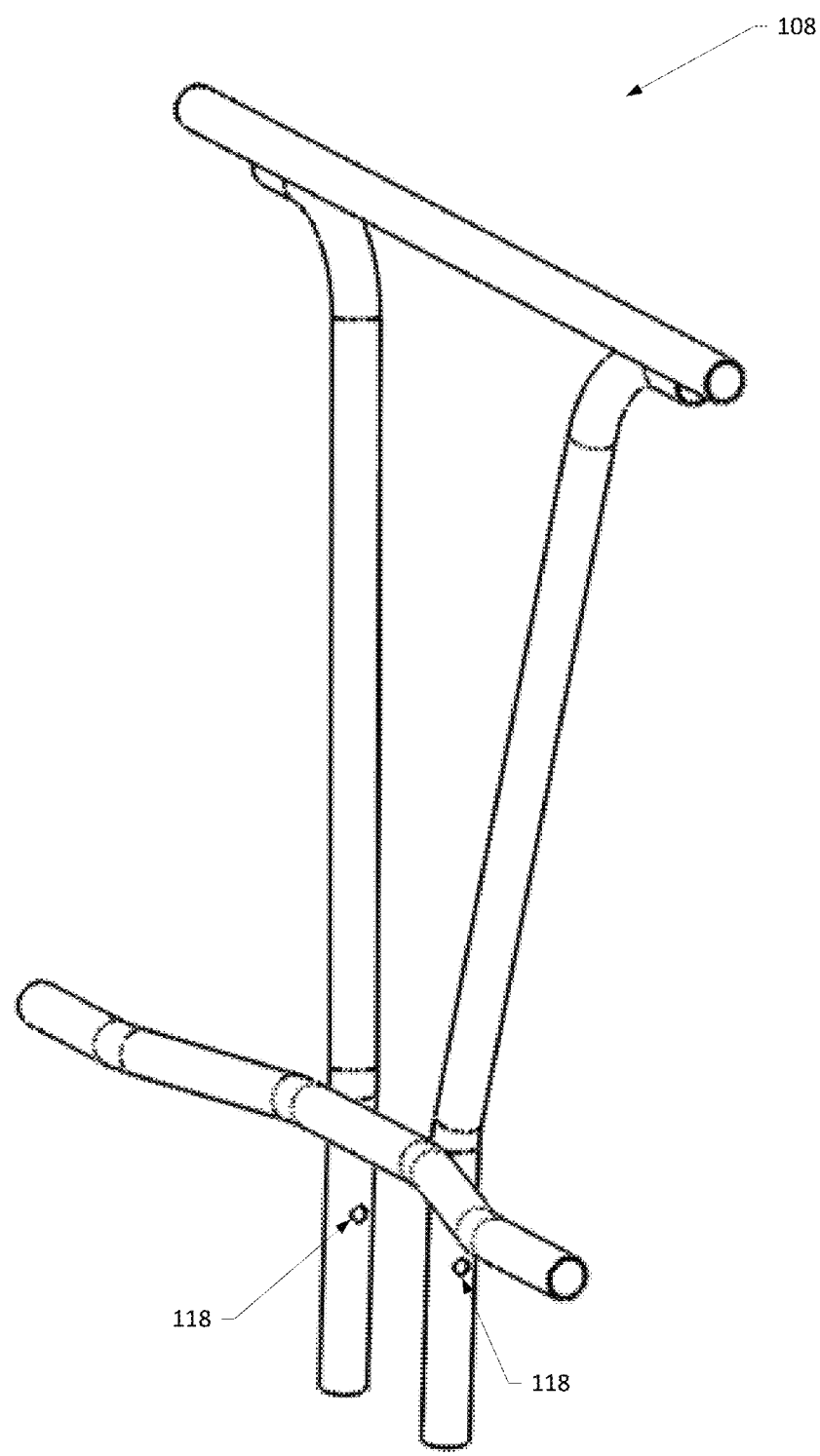
Figure 17:
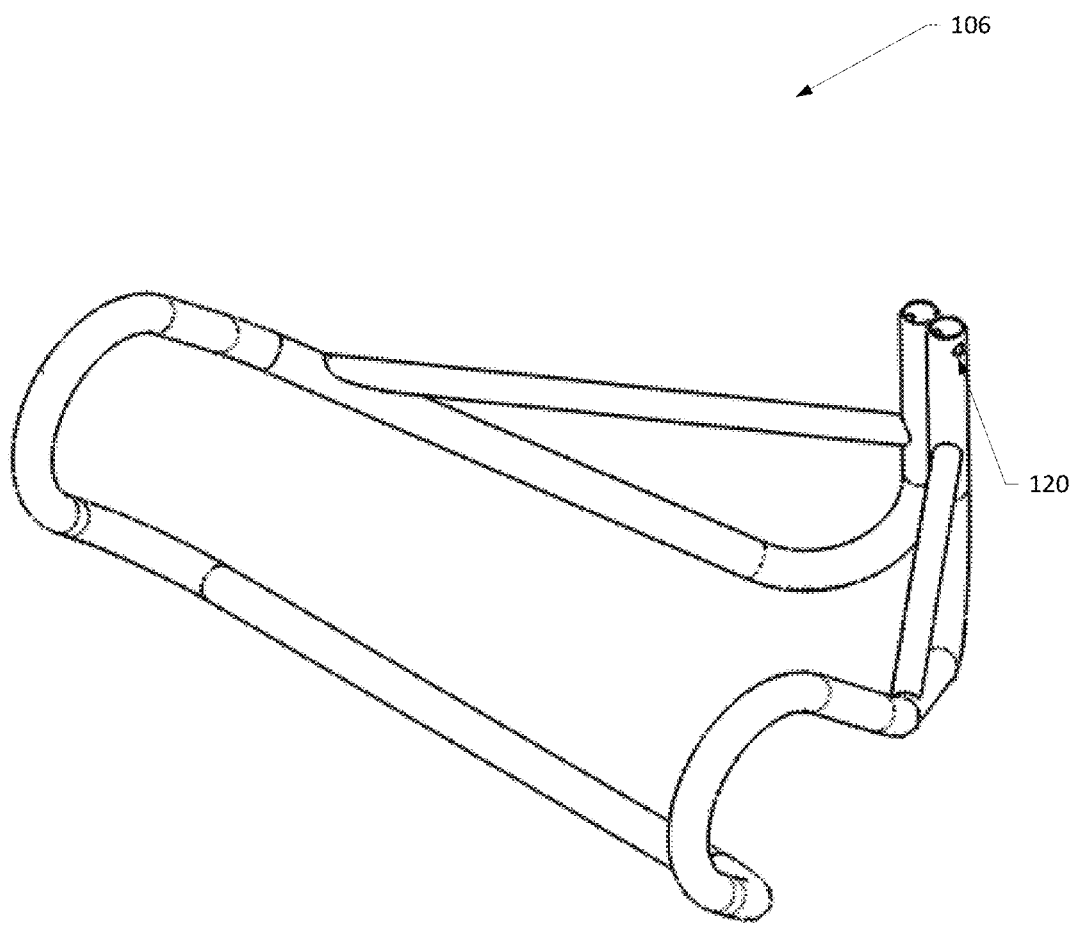
Figure 18A:
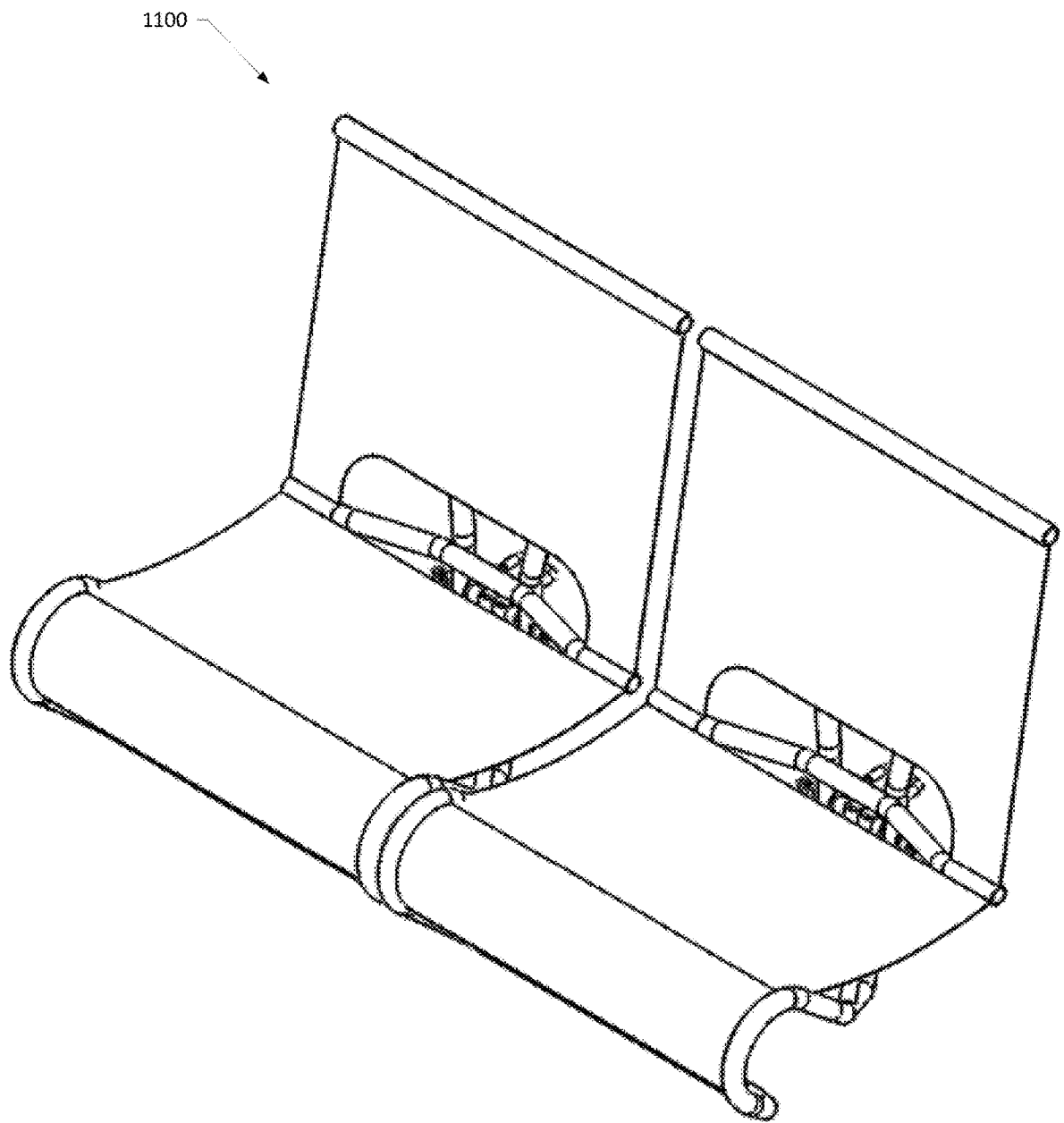
Figure 18B:
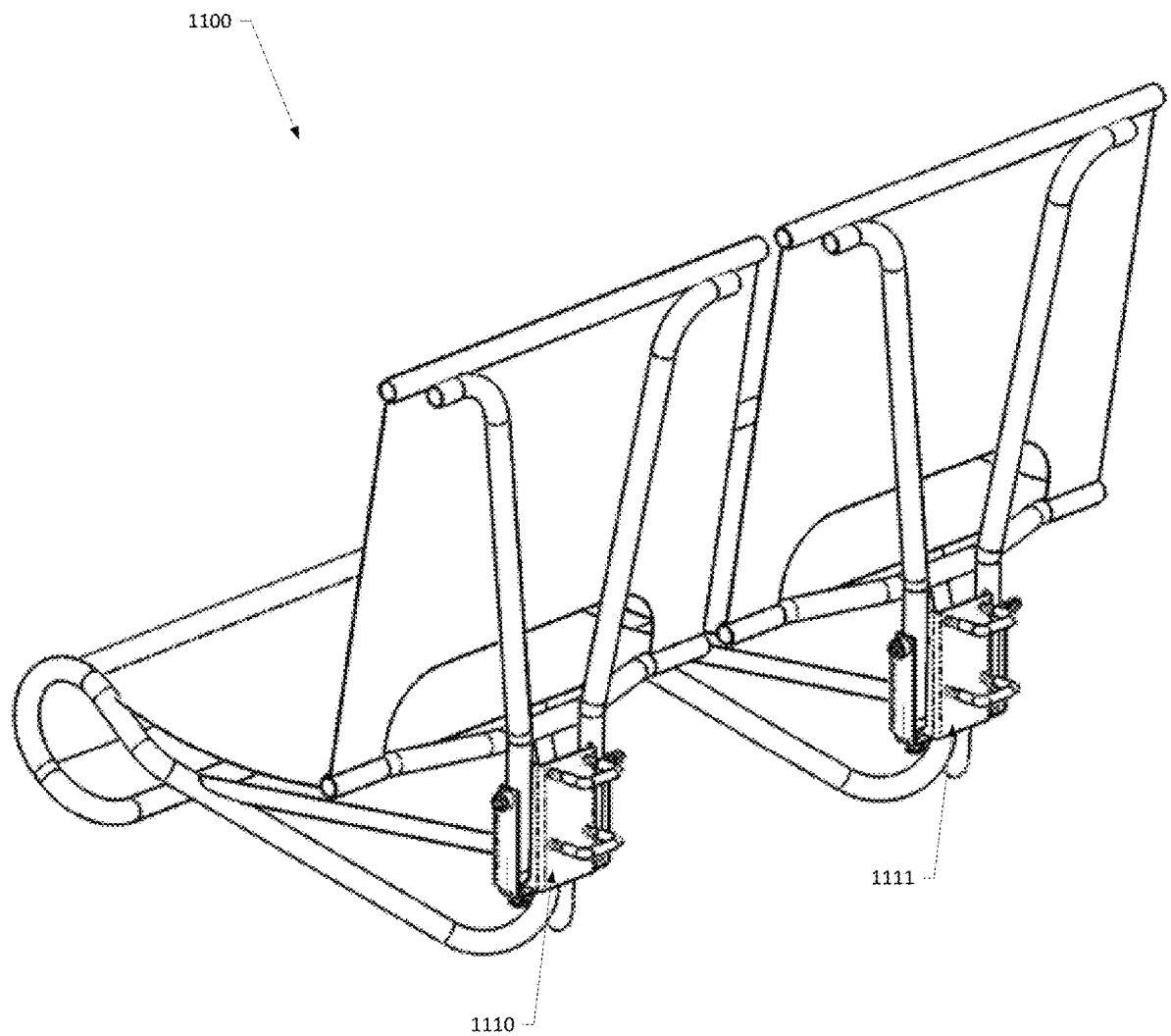
Figure 19:
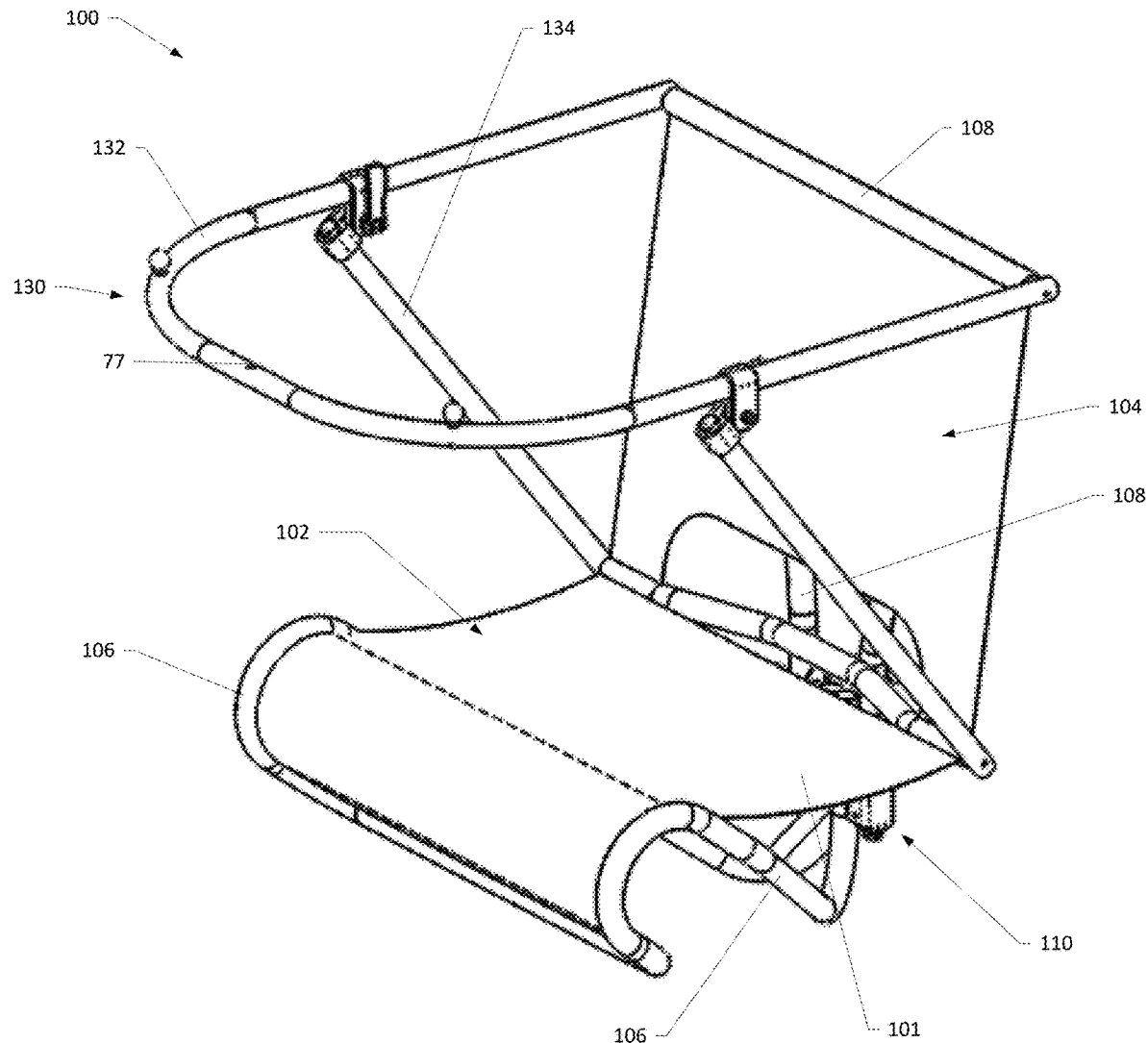
Figure 20:
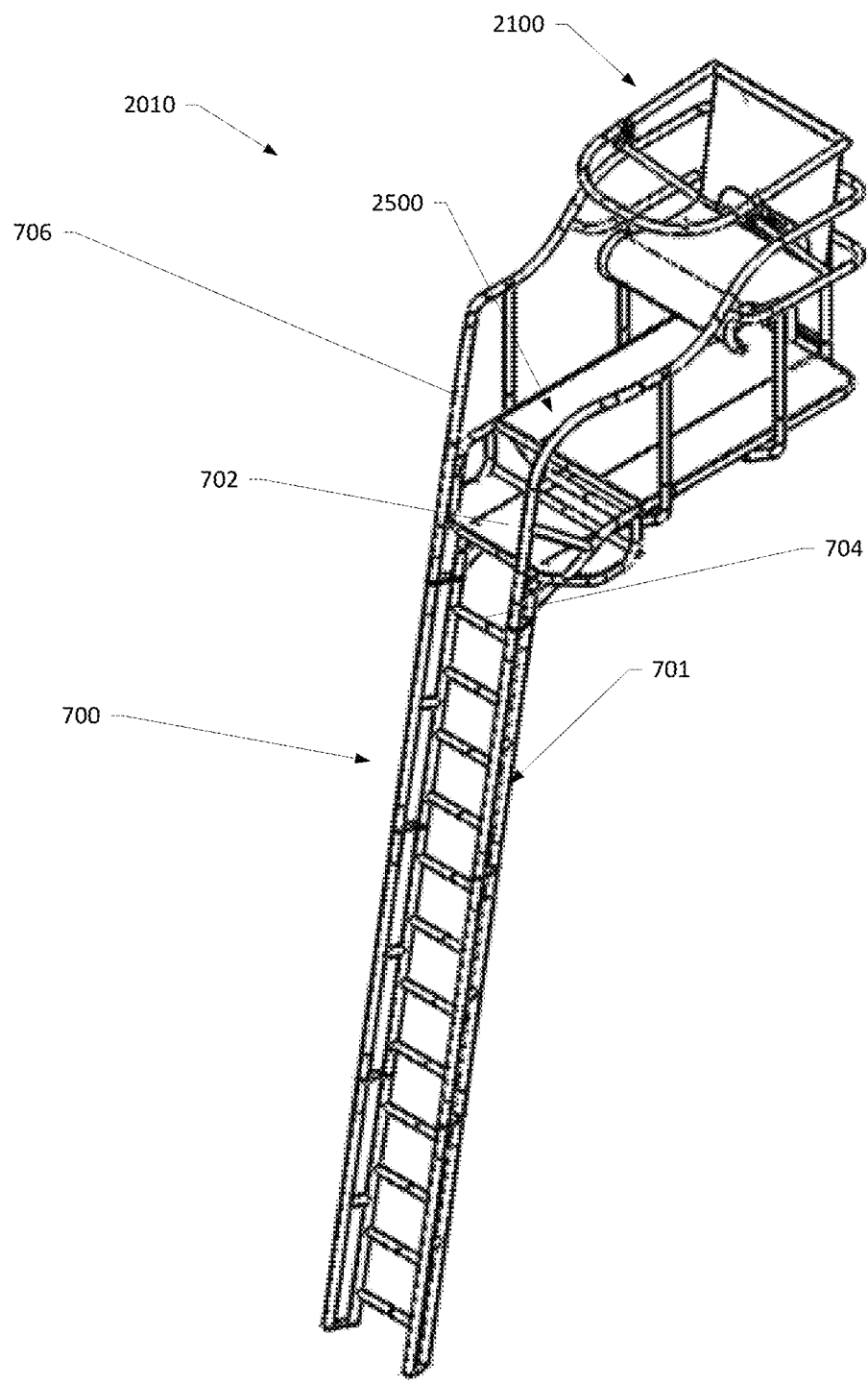
Figure 21:
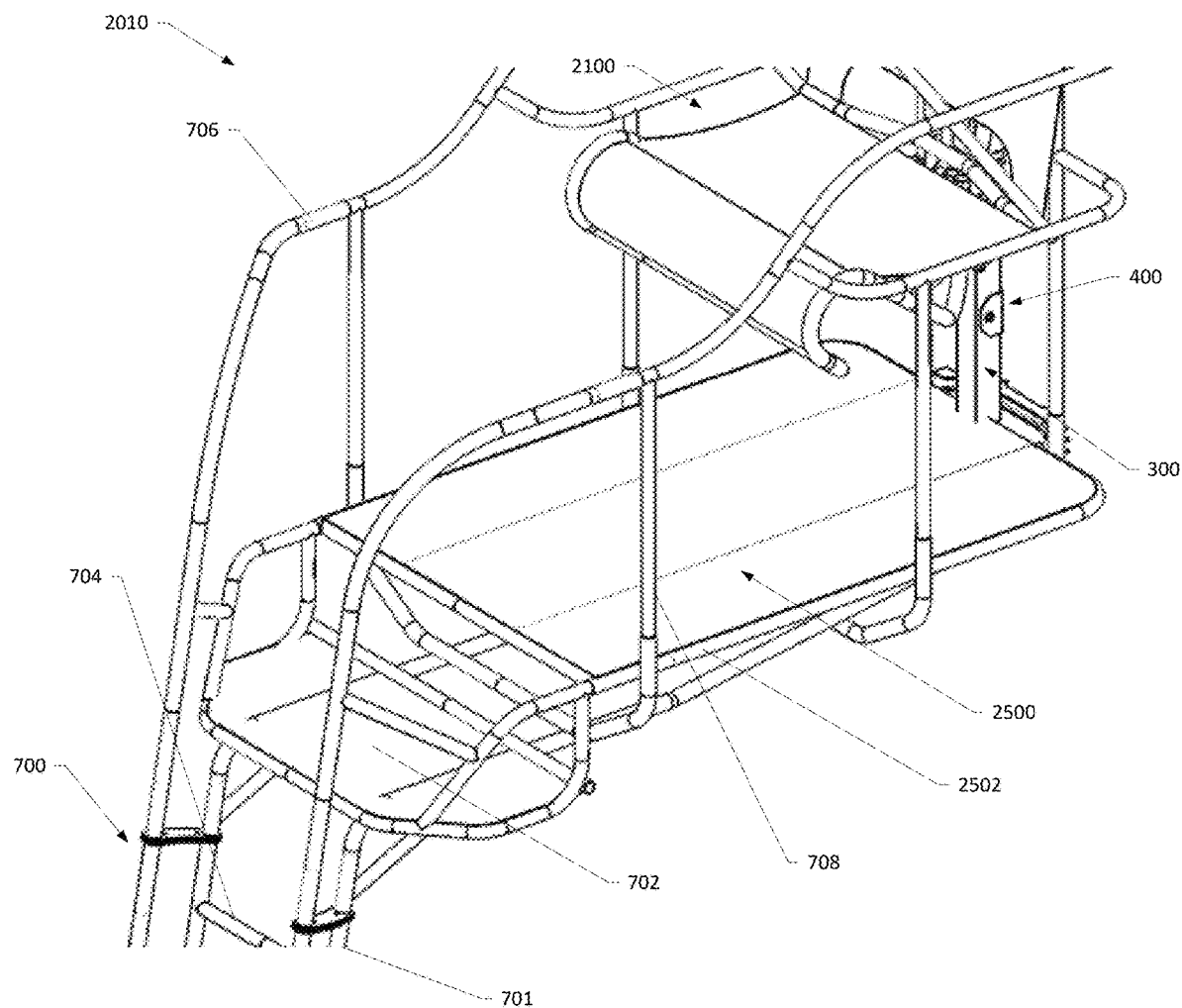
Figure 22:
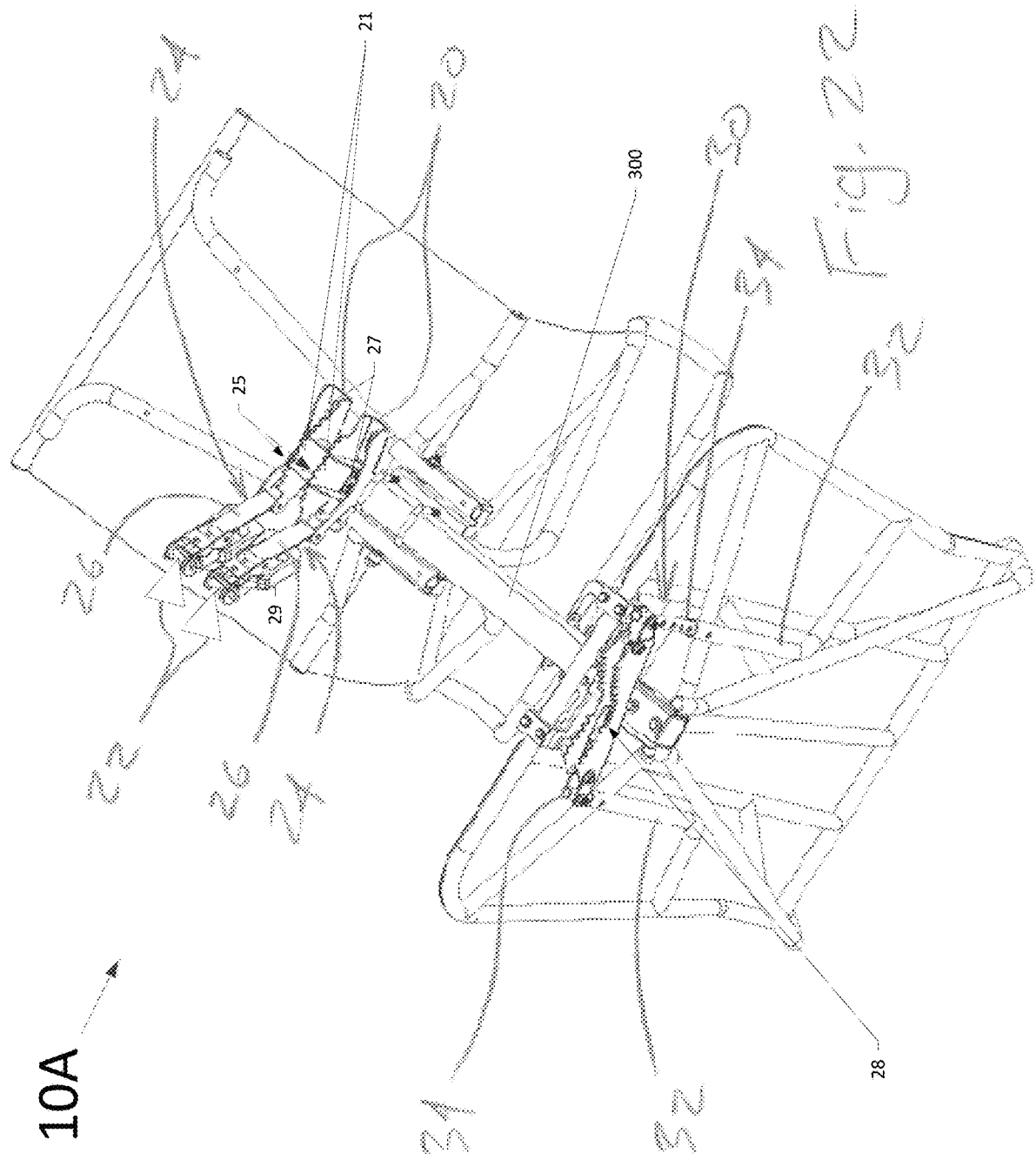
Figure 23:
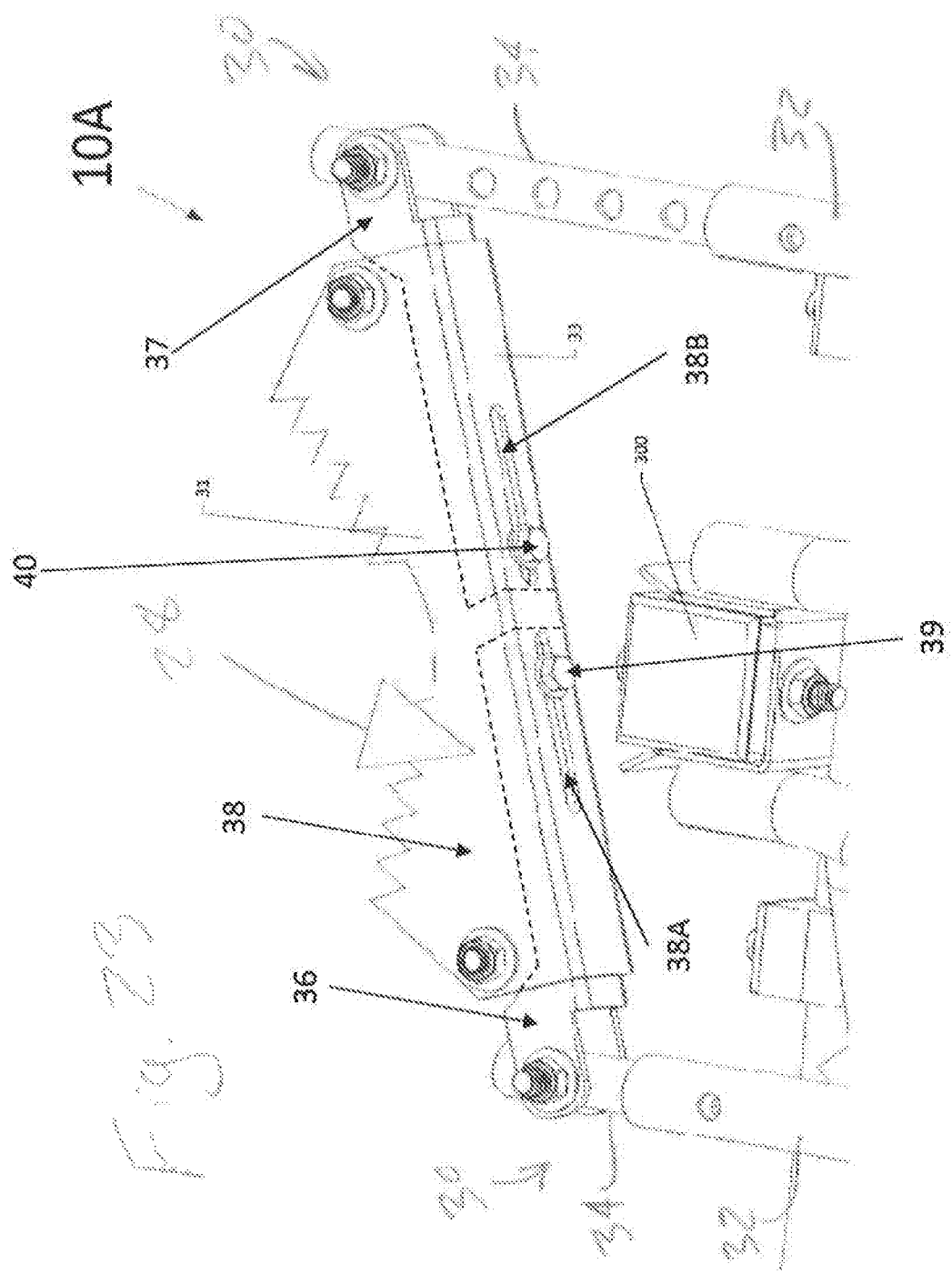
Figure 24:
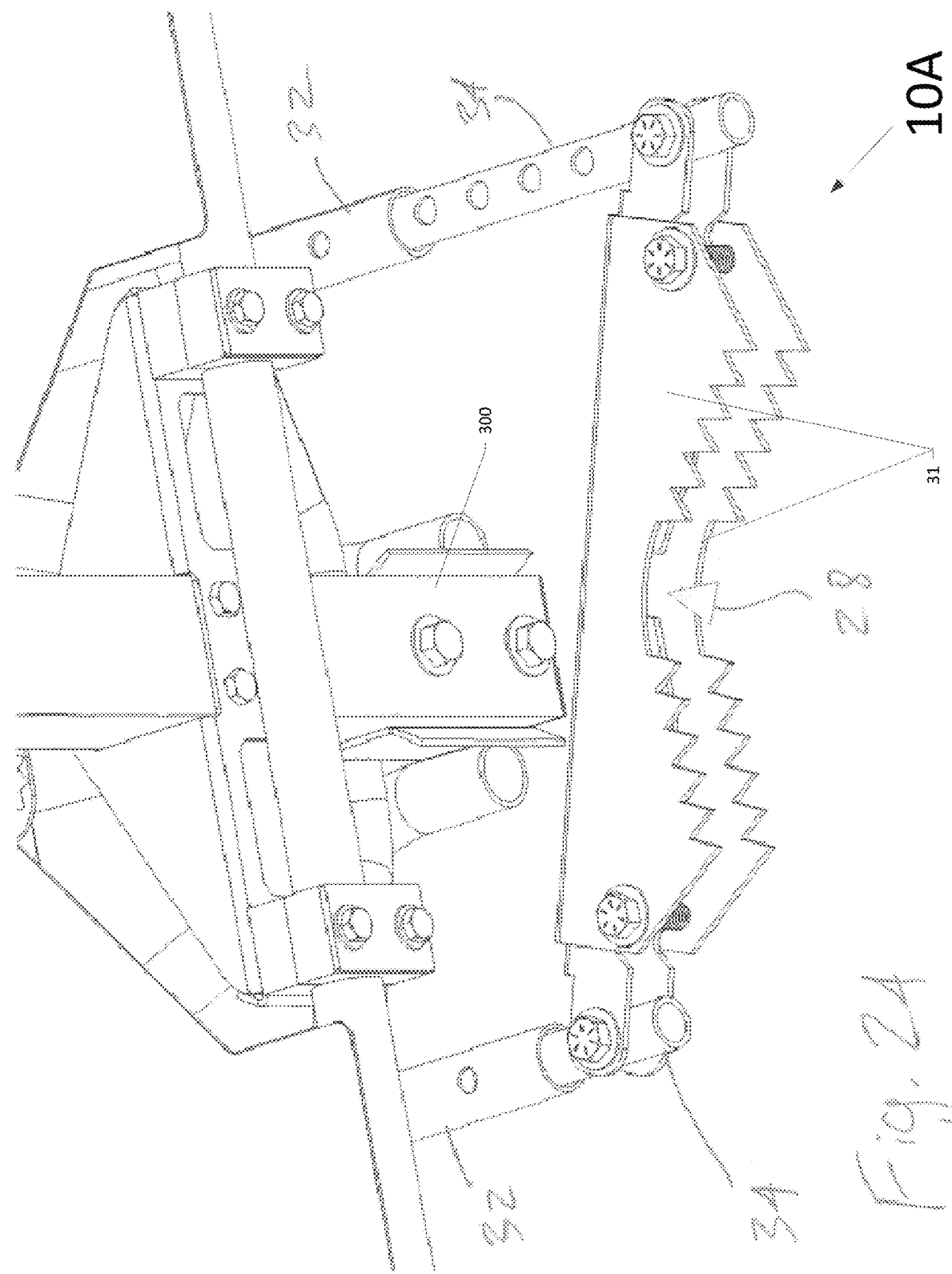
Figure 25:
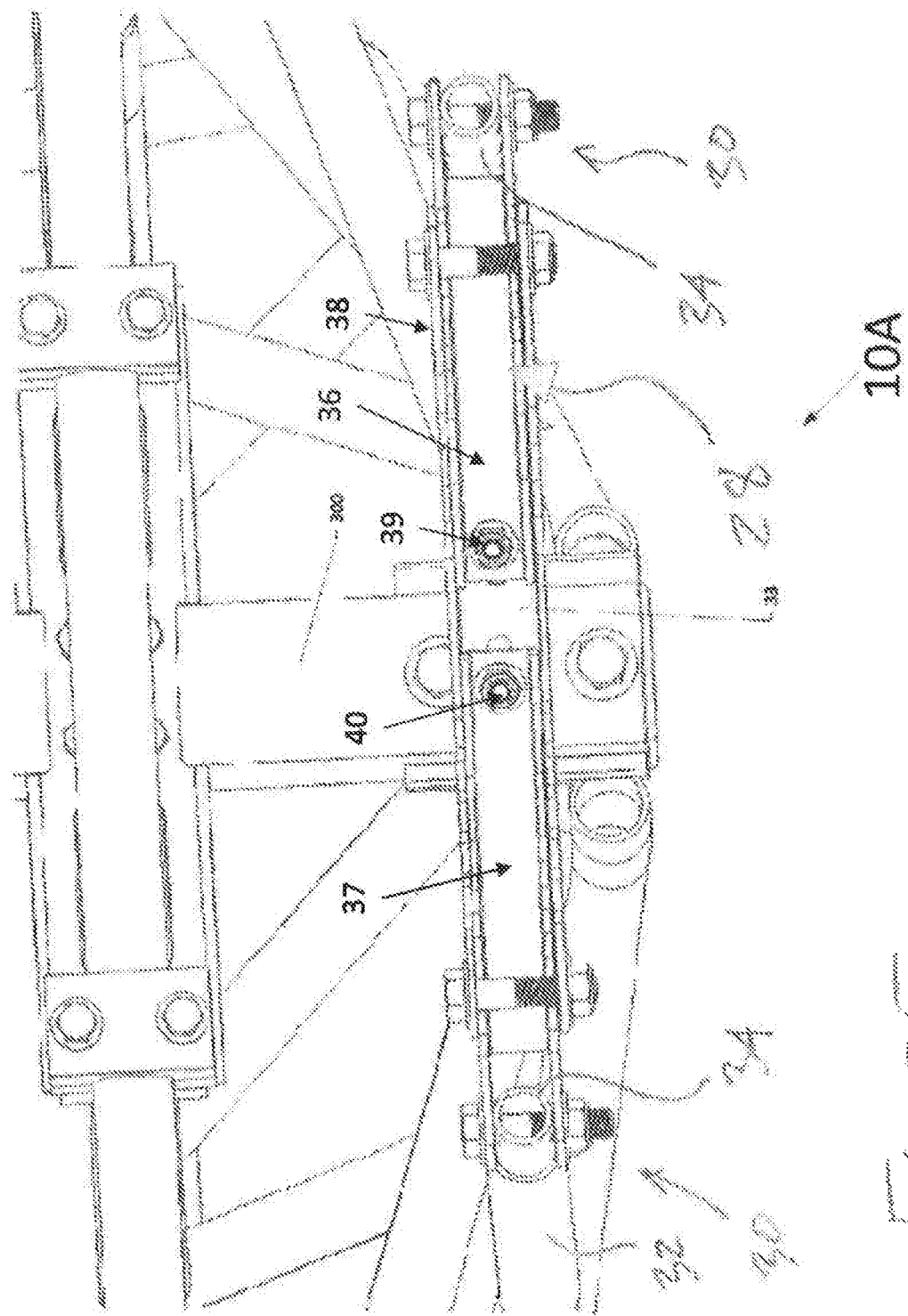
Figure 26:
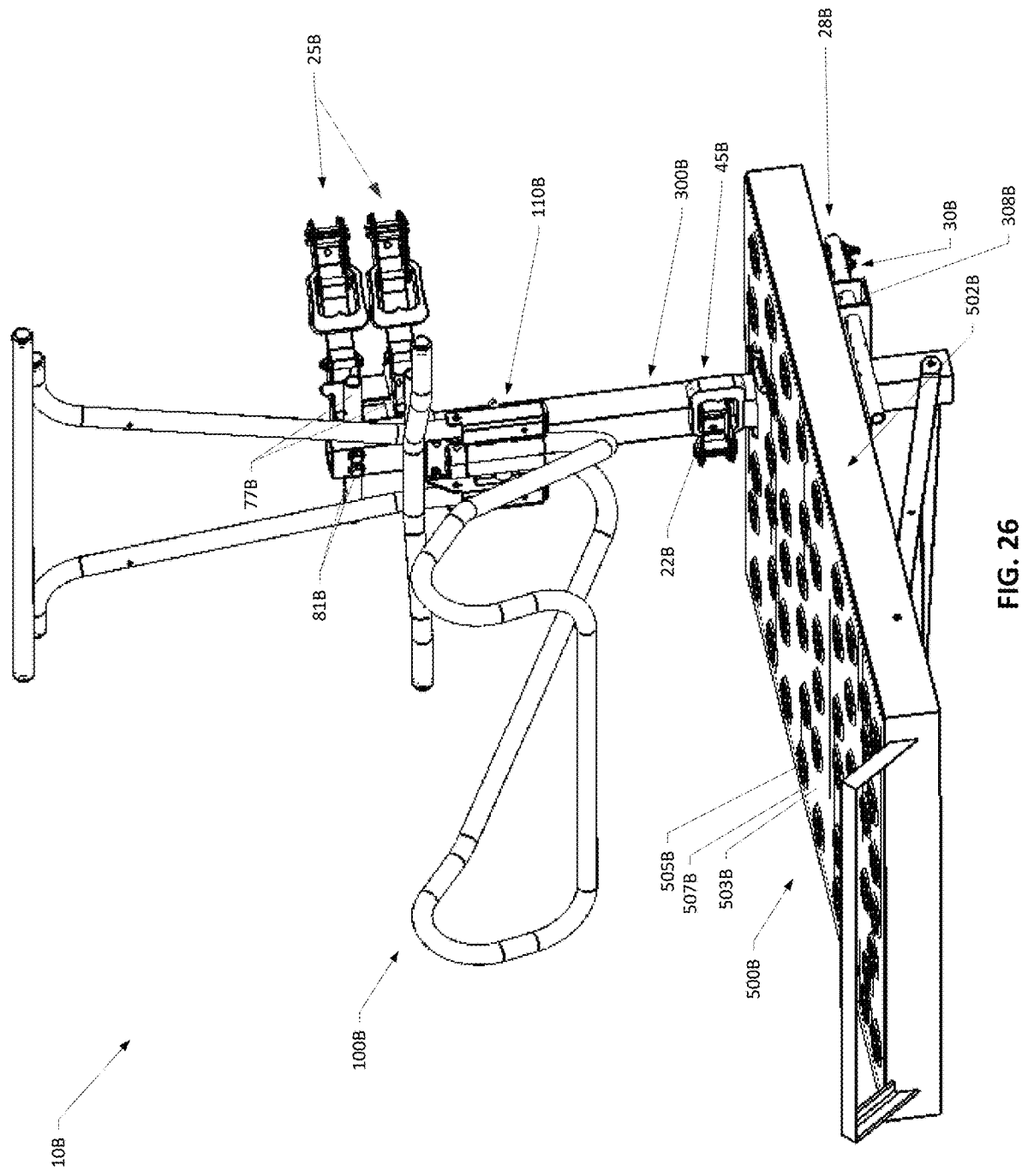
Figure 27:
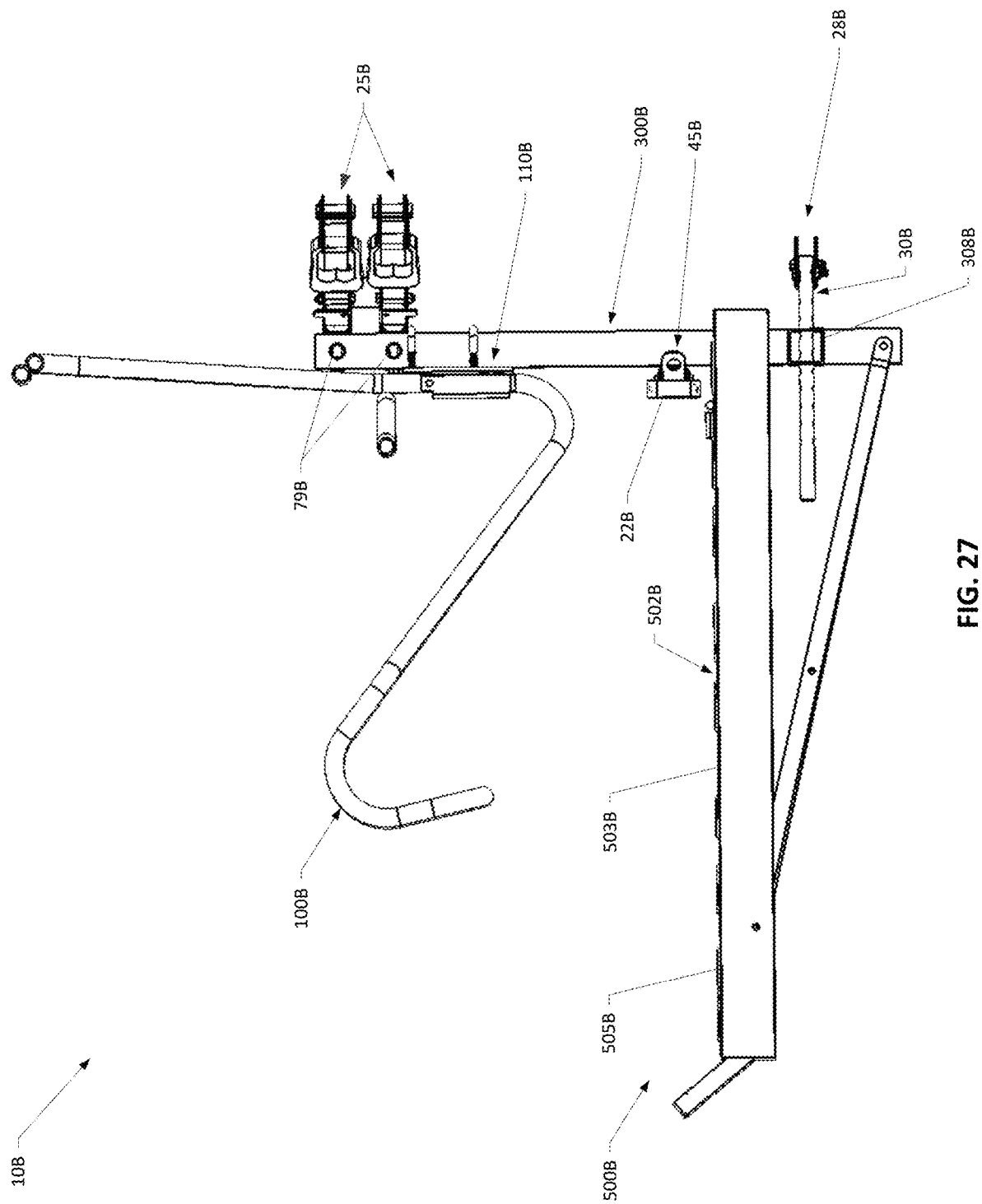
Figure 28:
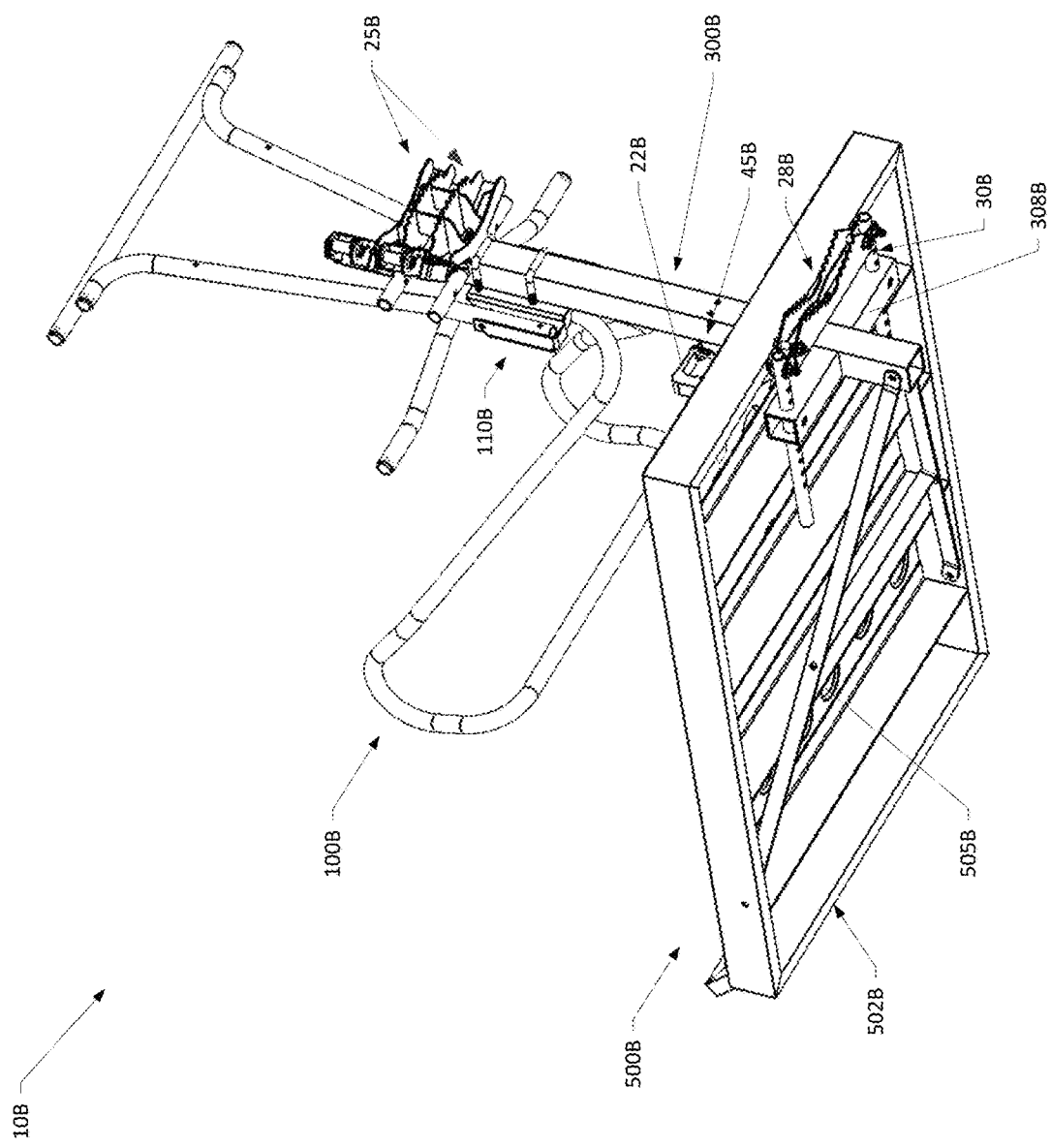
Figure 29:
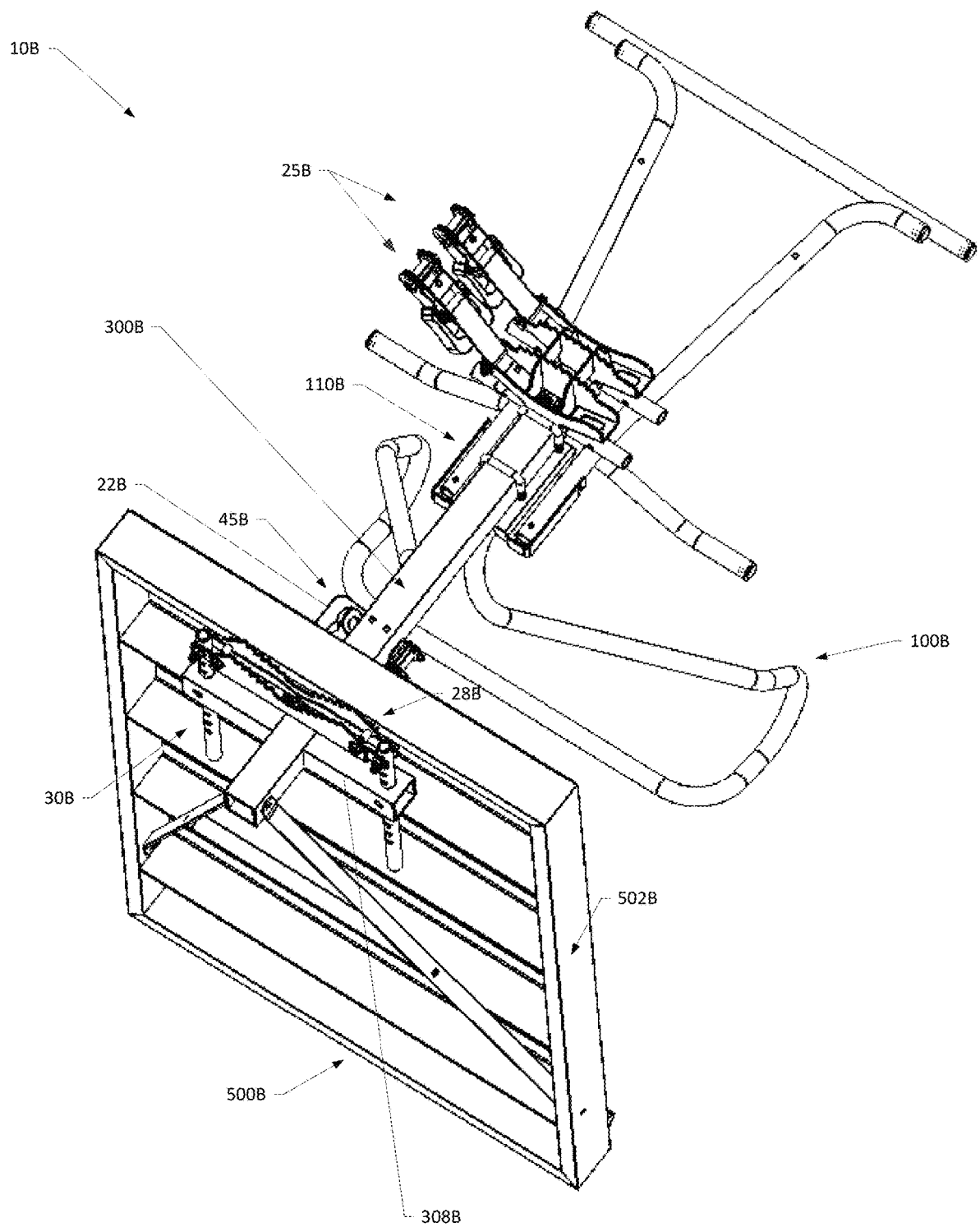
Figure 30:
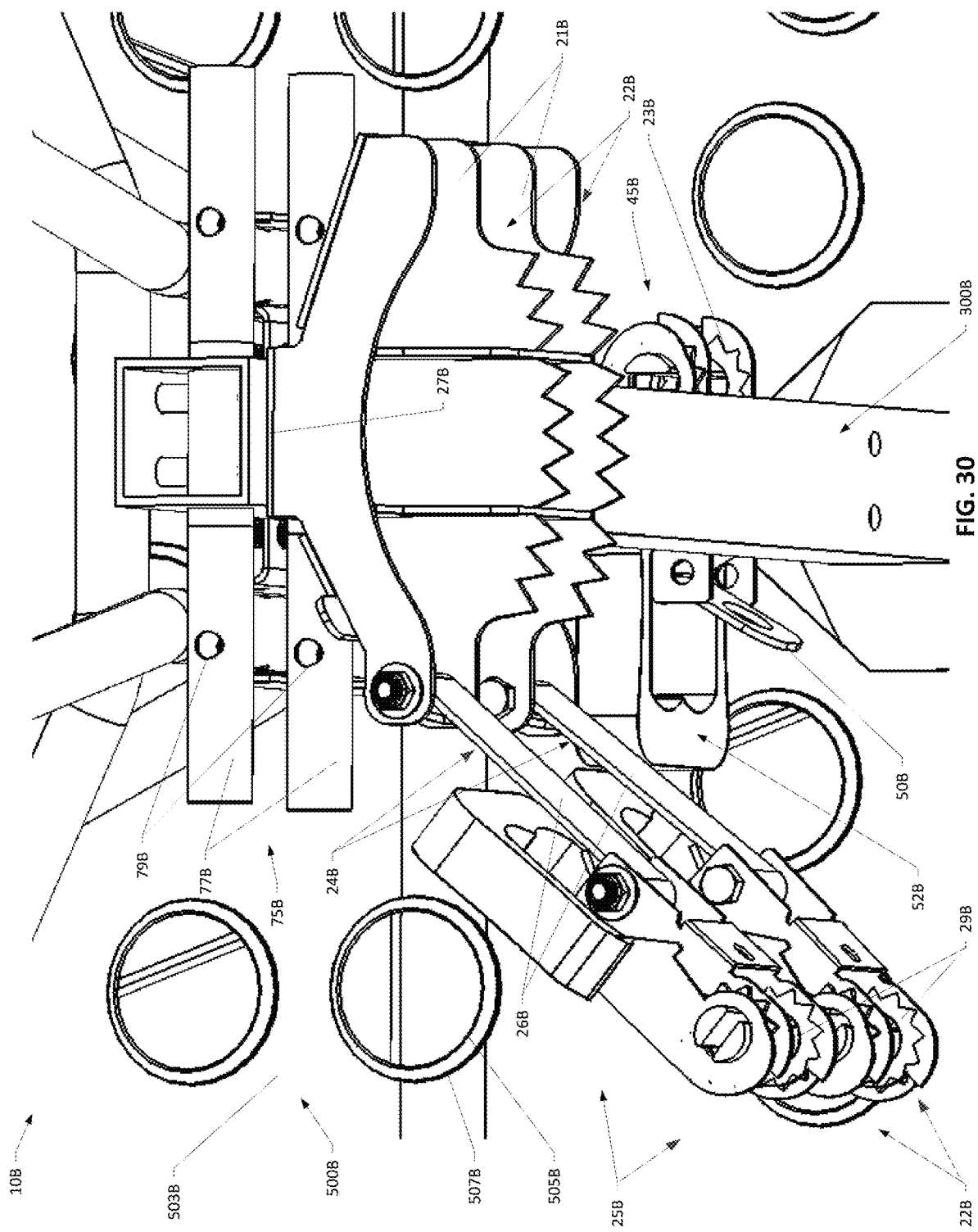
Figure 31:
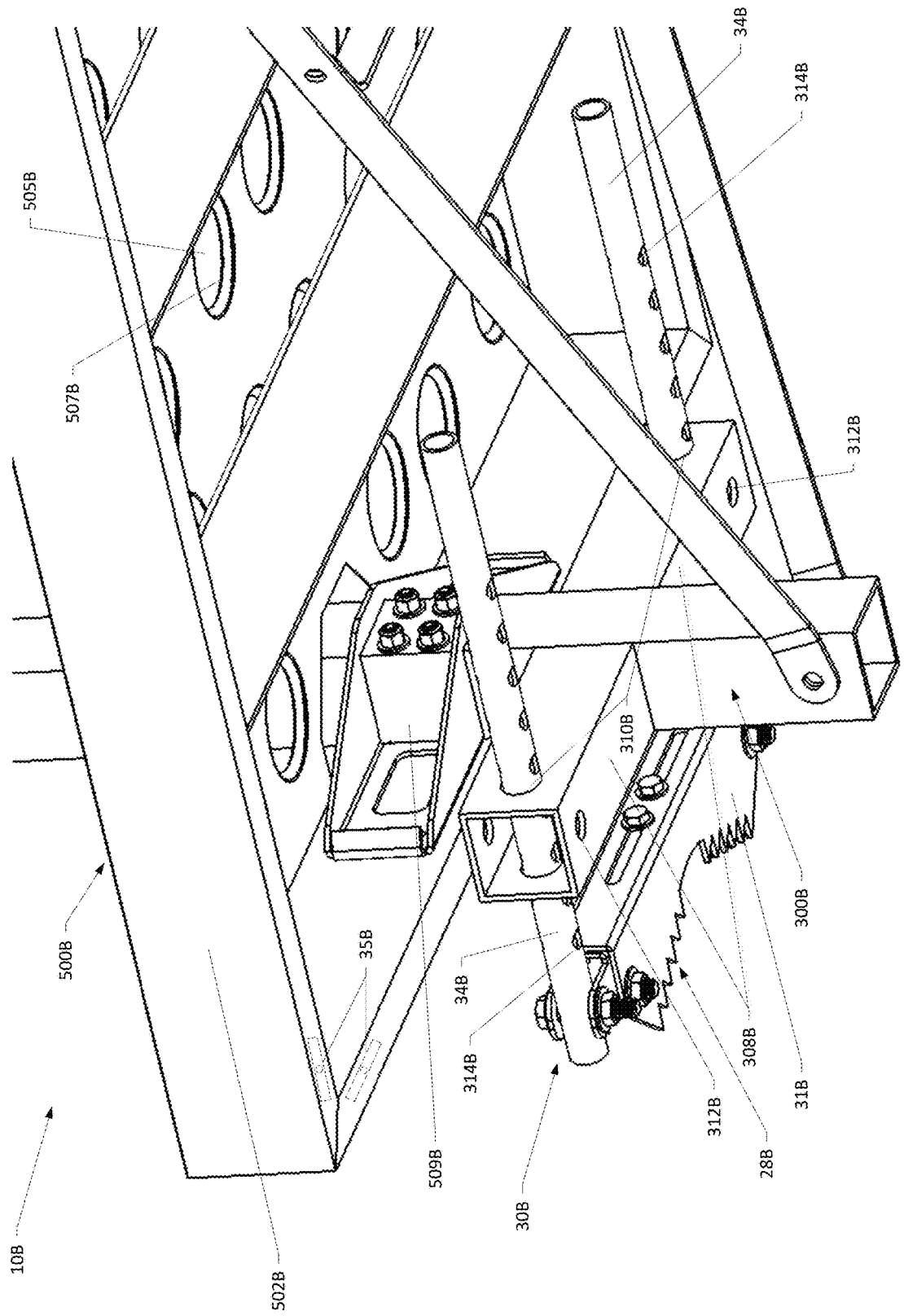
Figure 32:
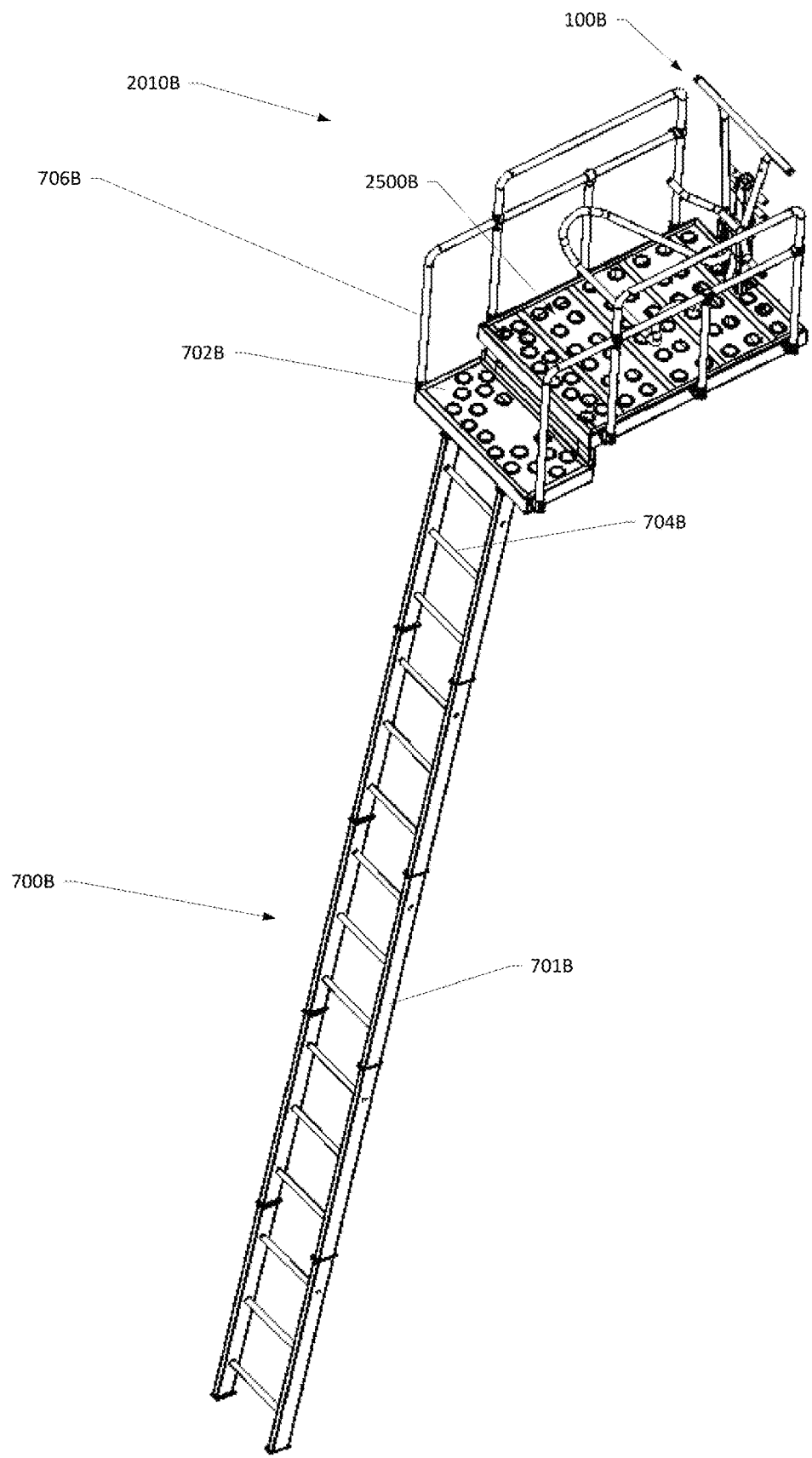
Figure 33:
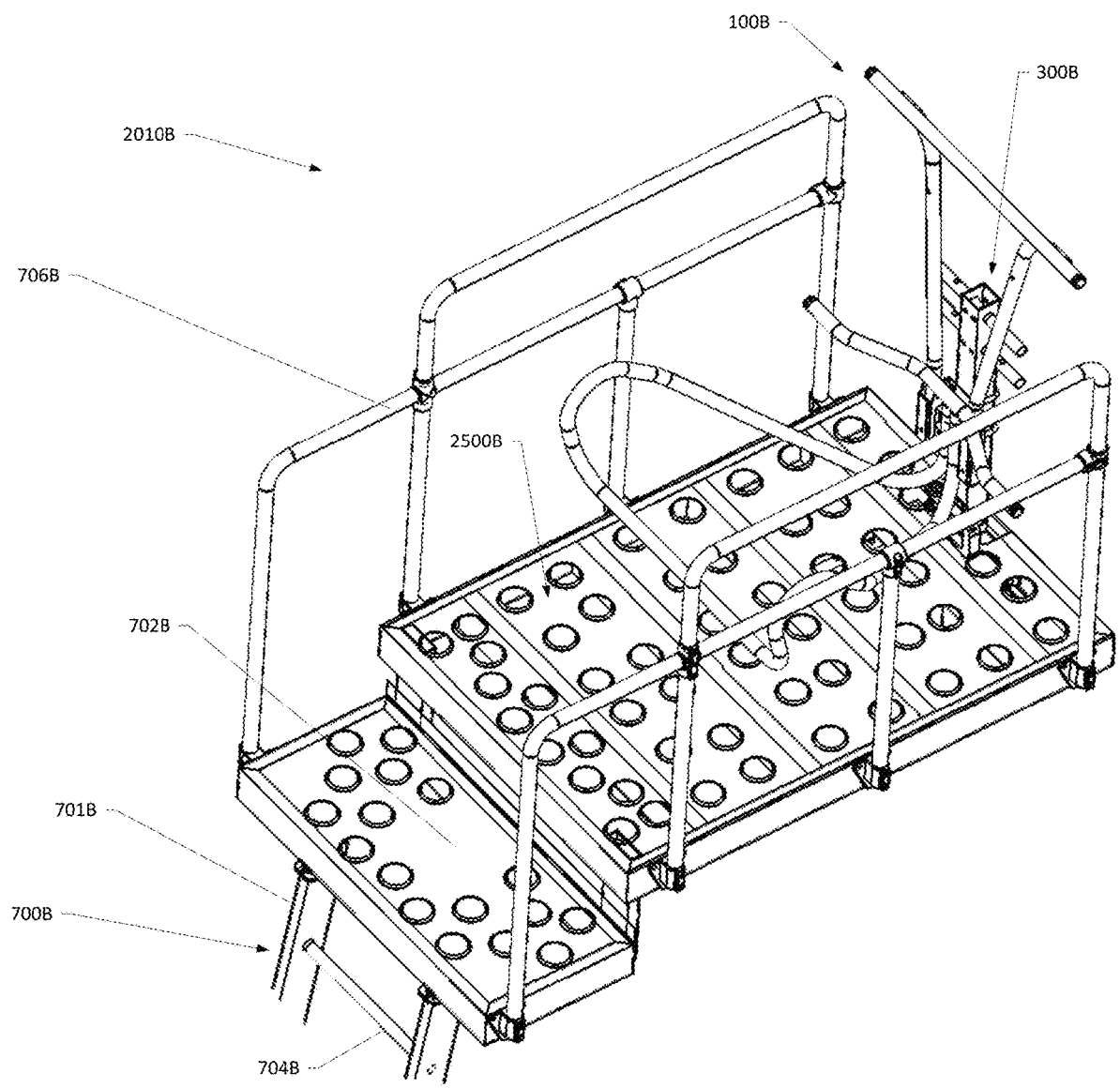
Figure 34:
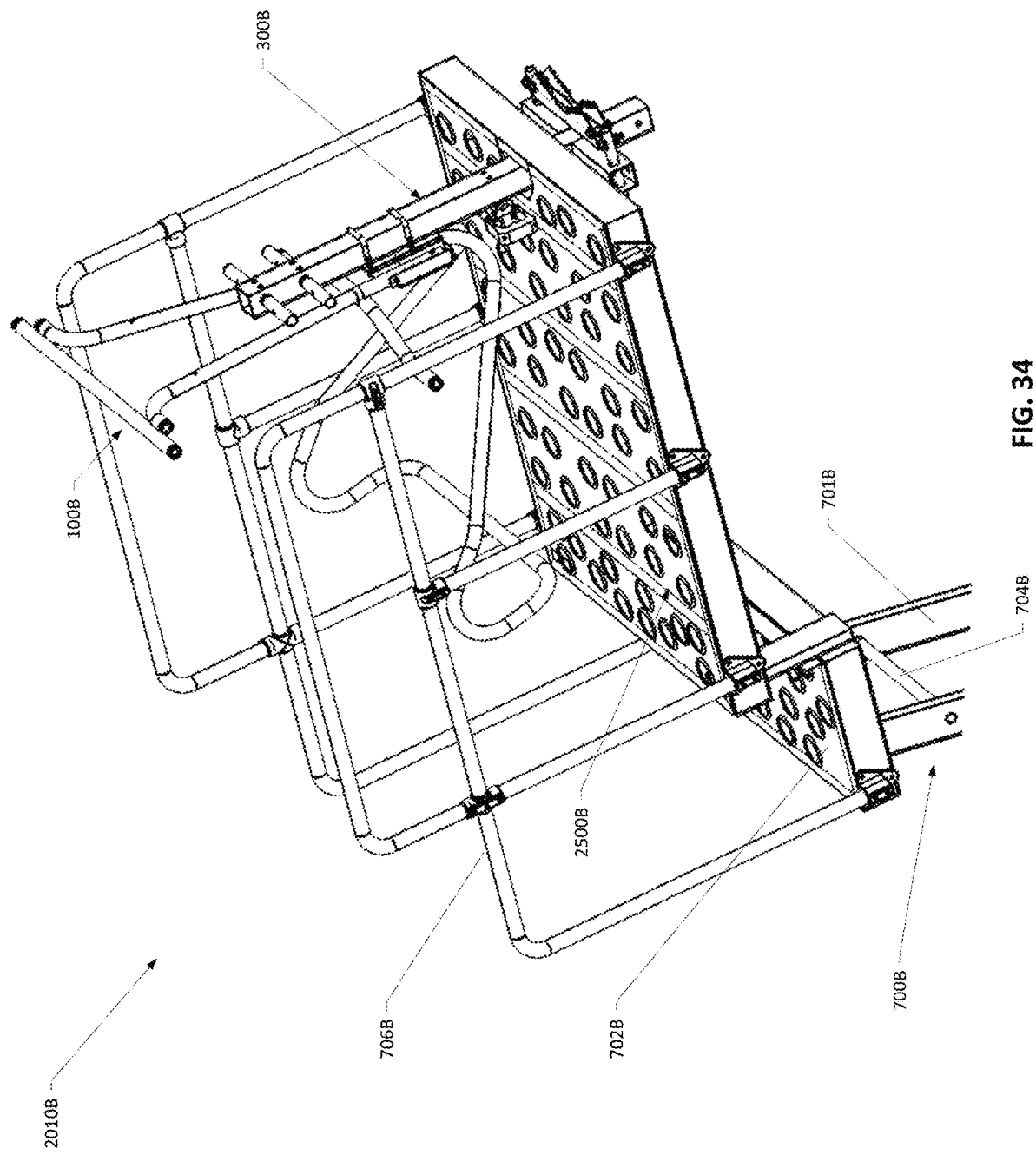
Figure 35:
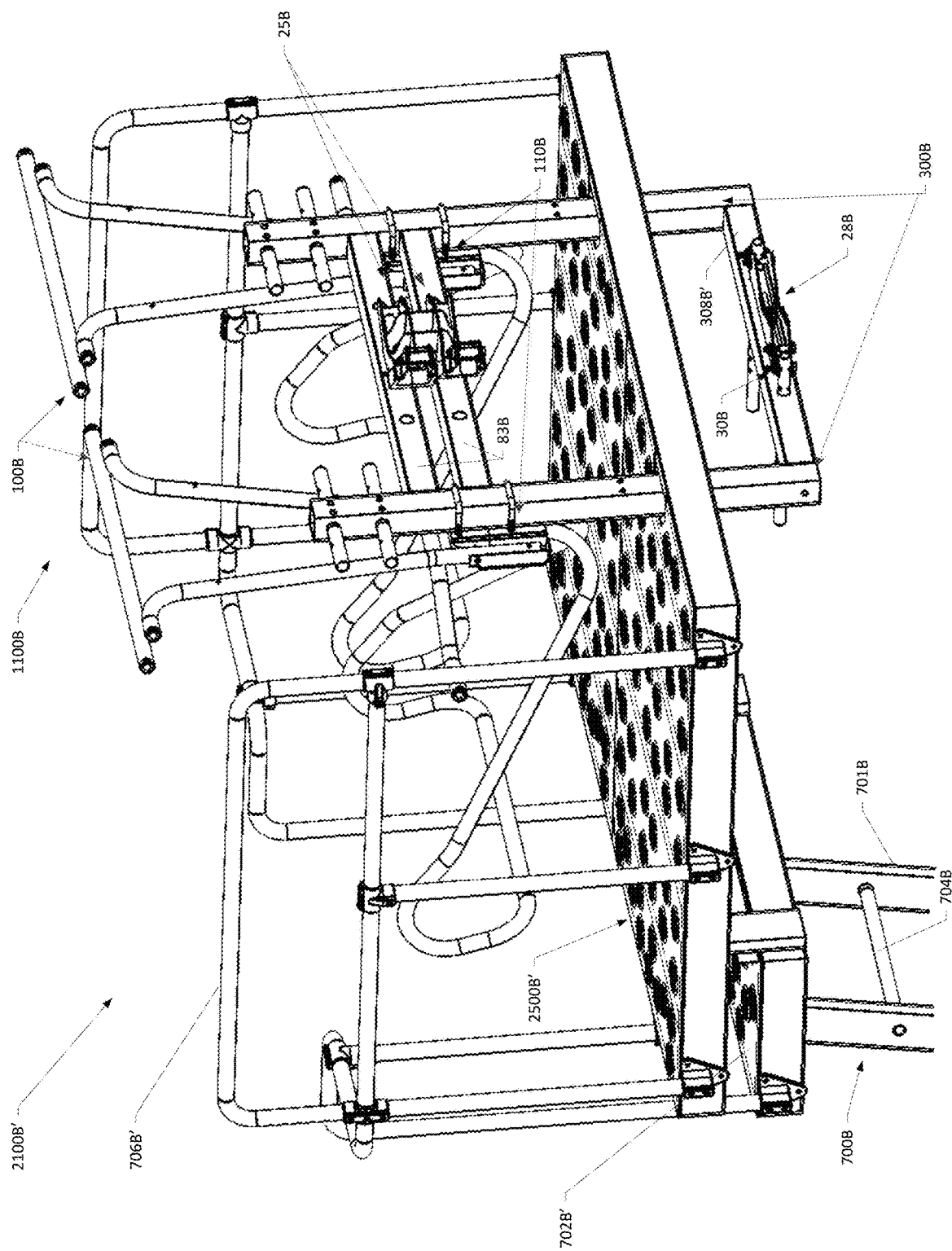
Figure 36:
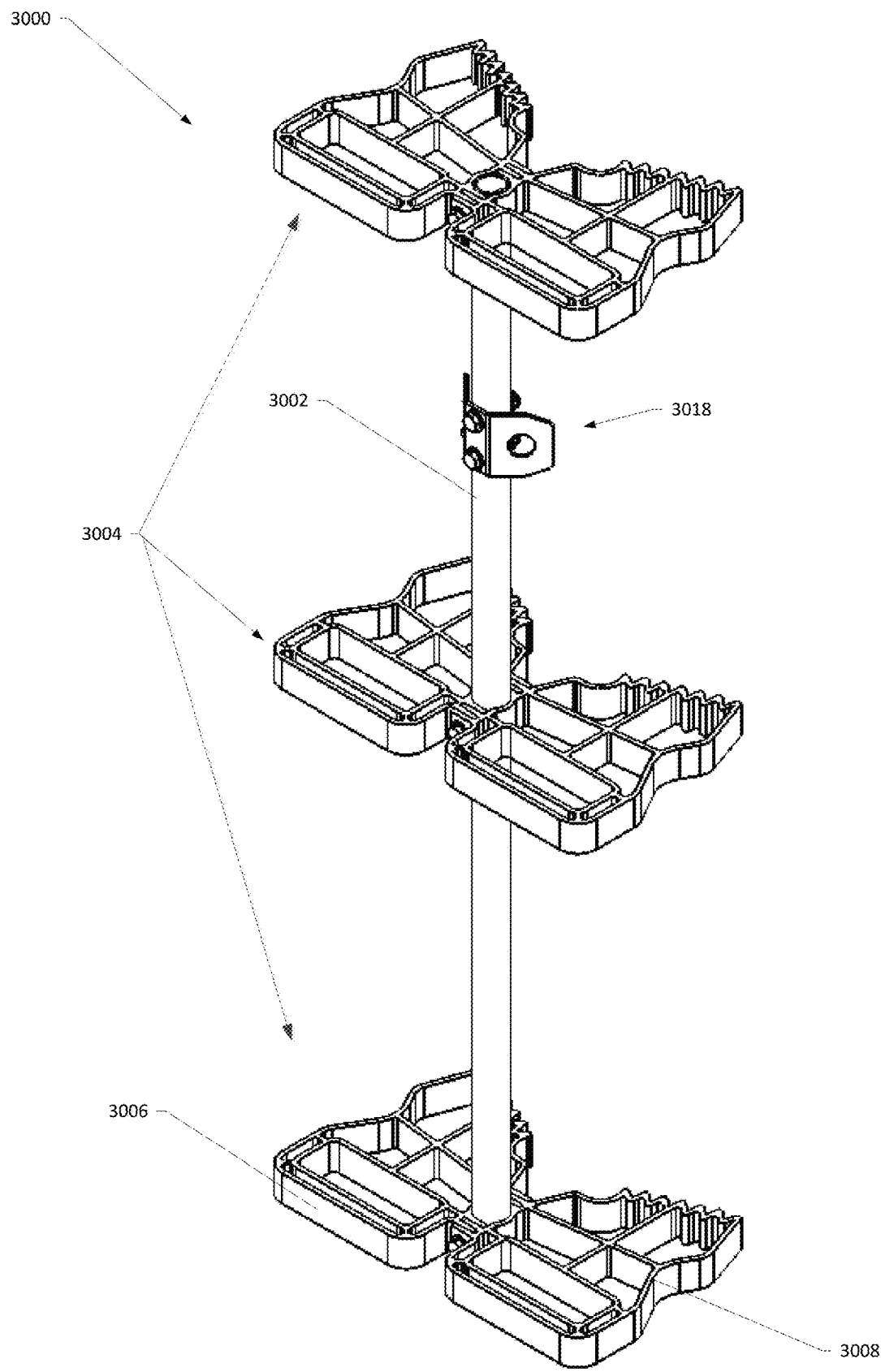
Figure 37:
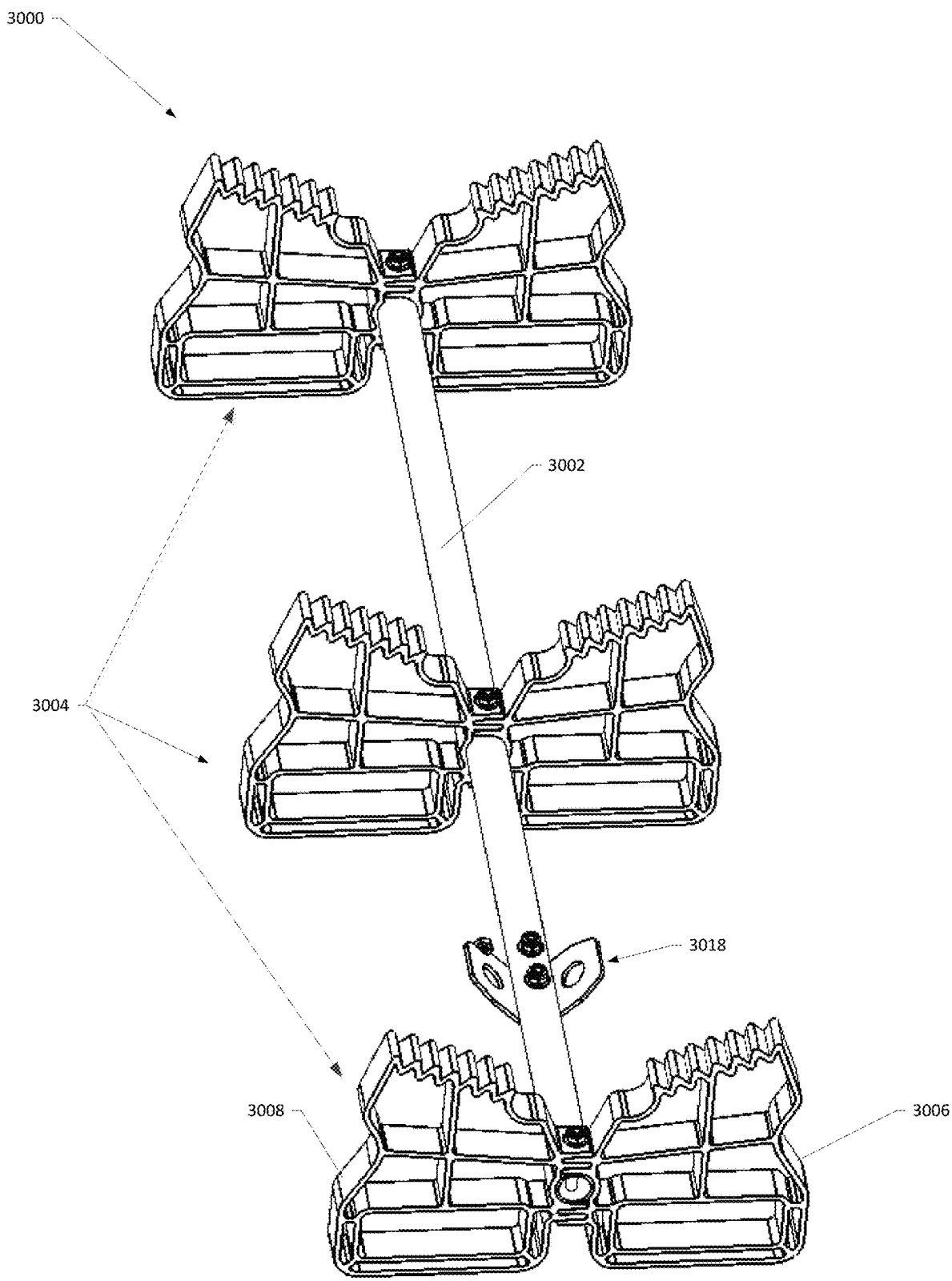
Figure 38:
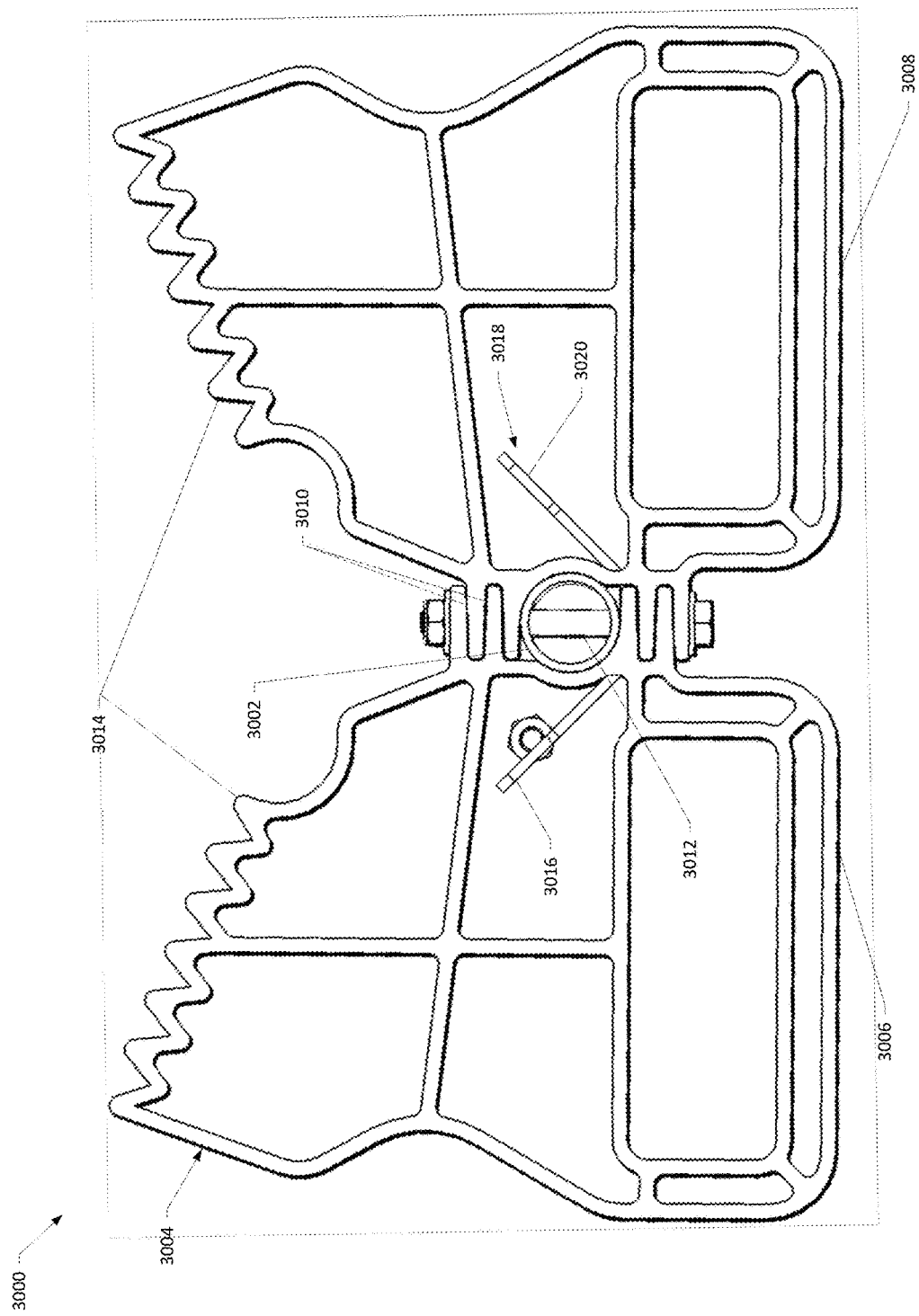
Figure 39:
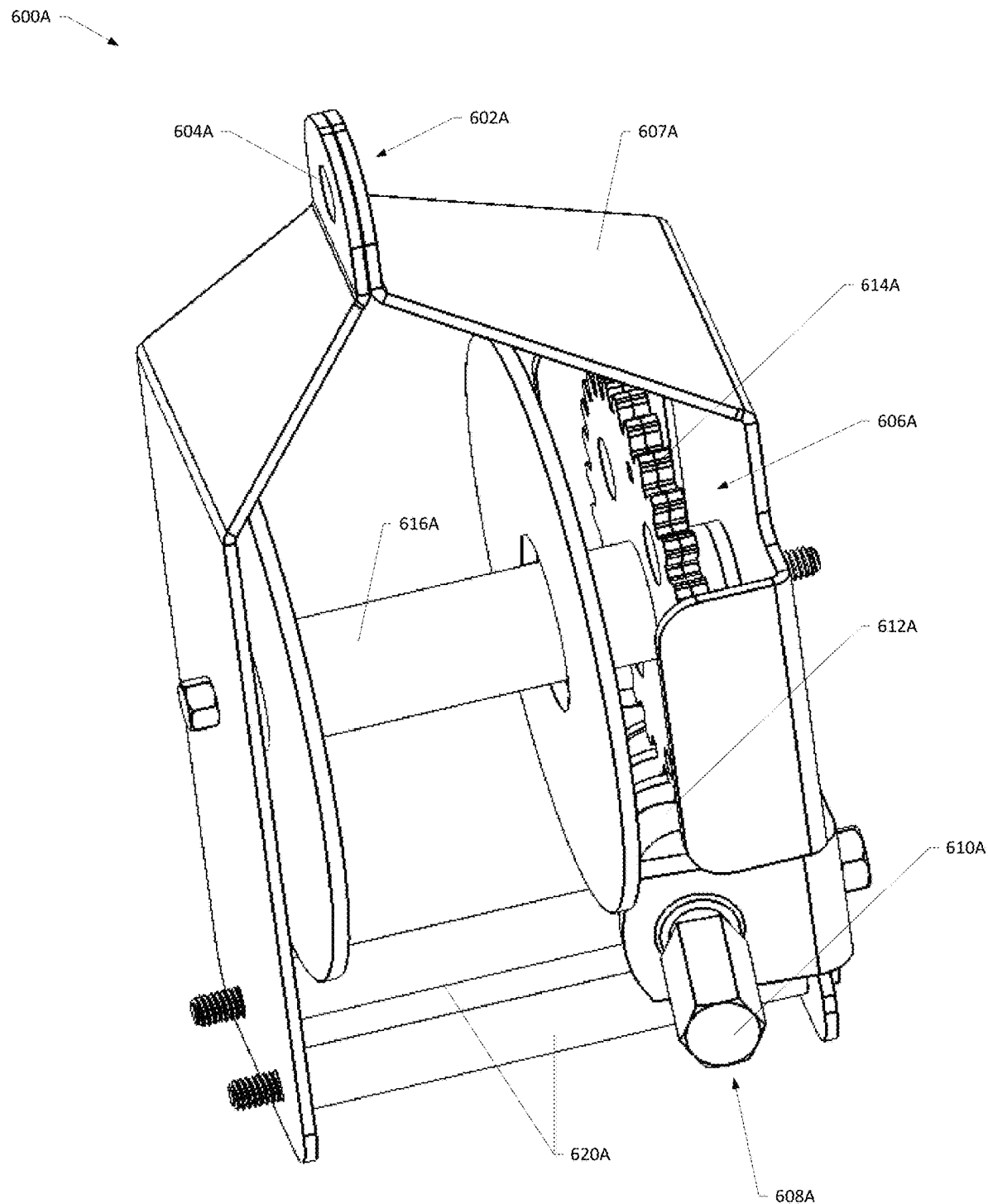
Figure 40:
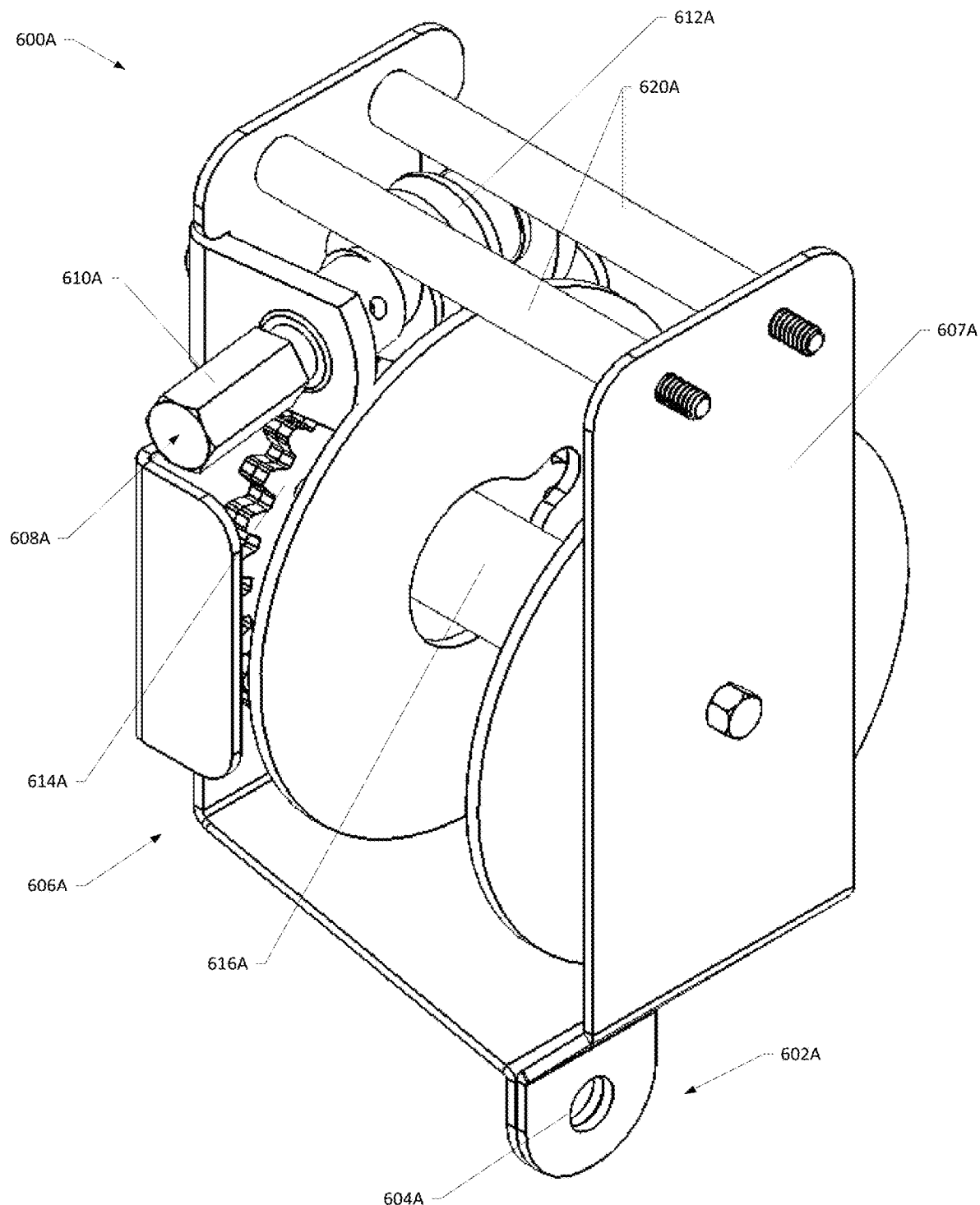
Figure 41:
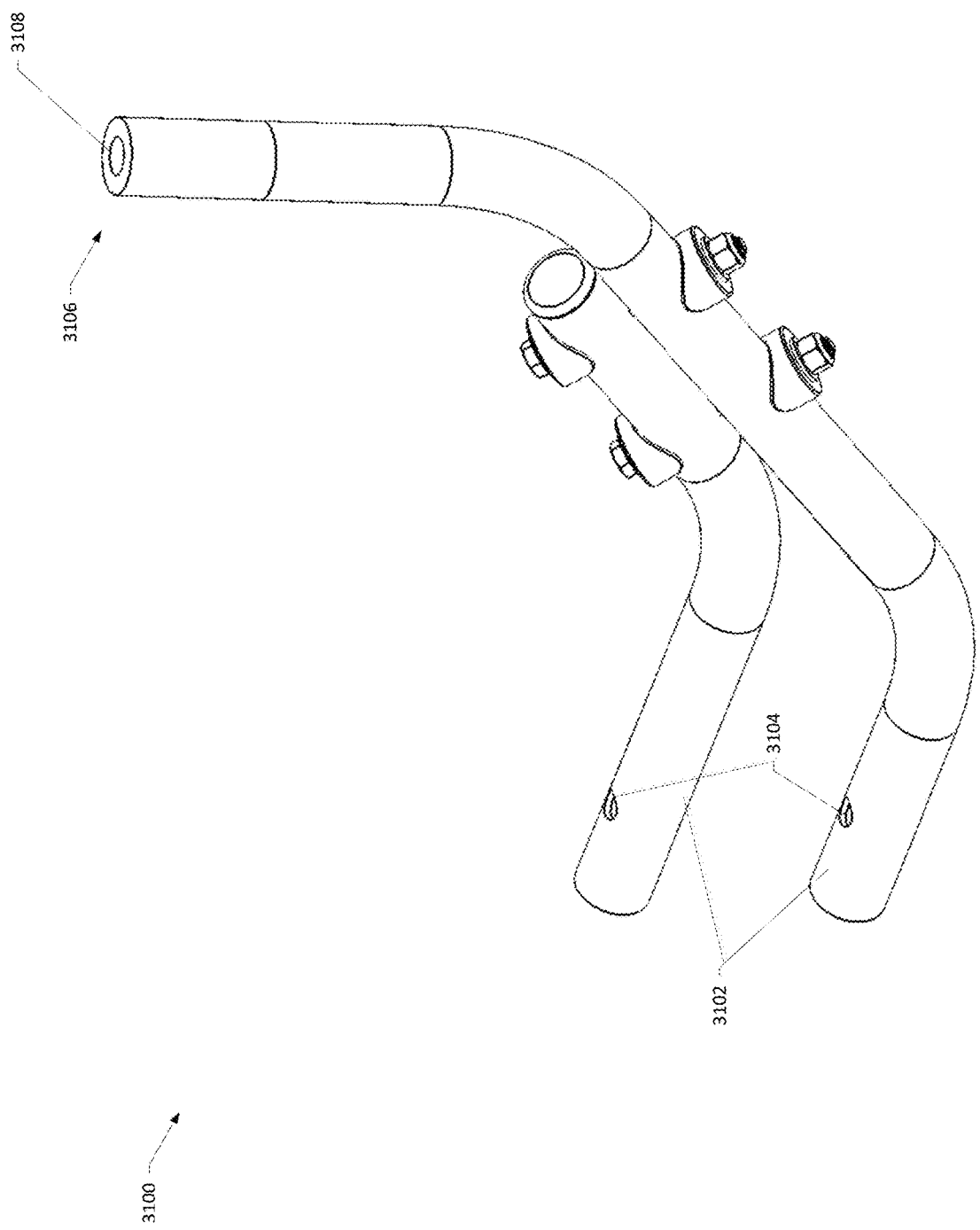
Figure 42:
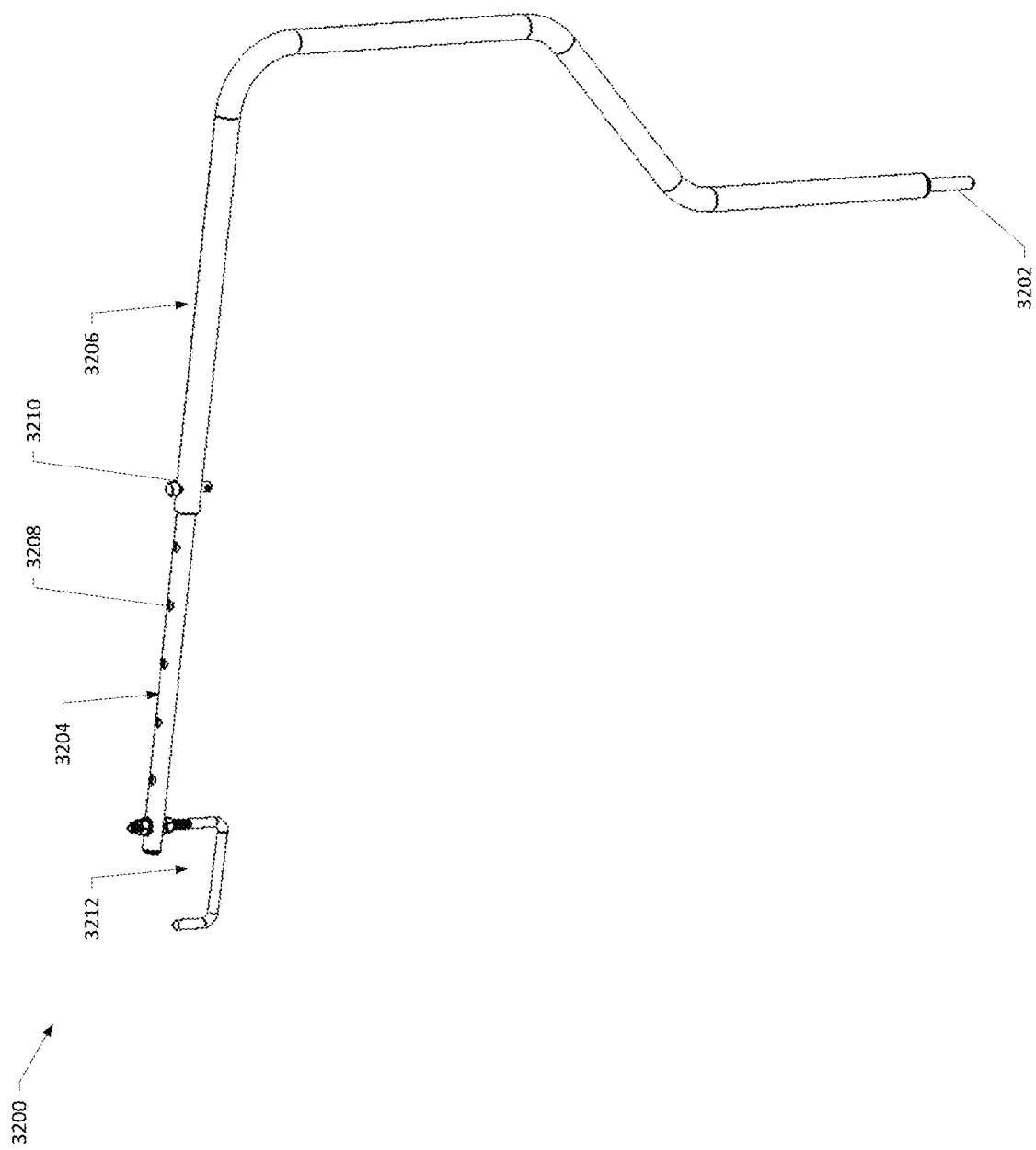
Figure 43:
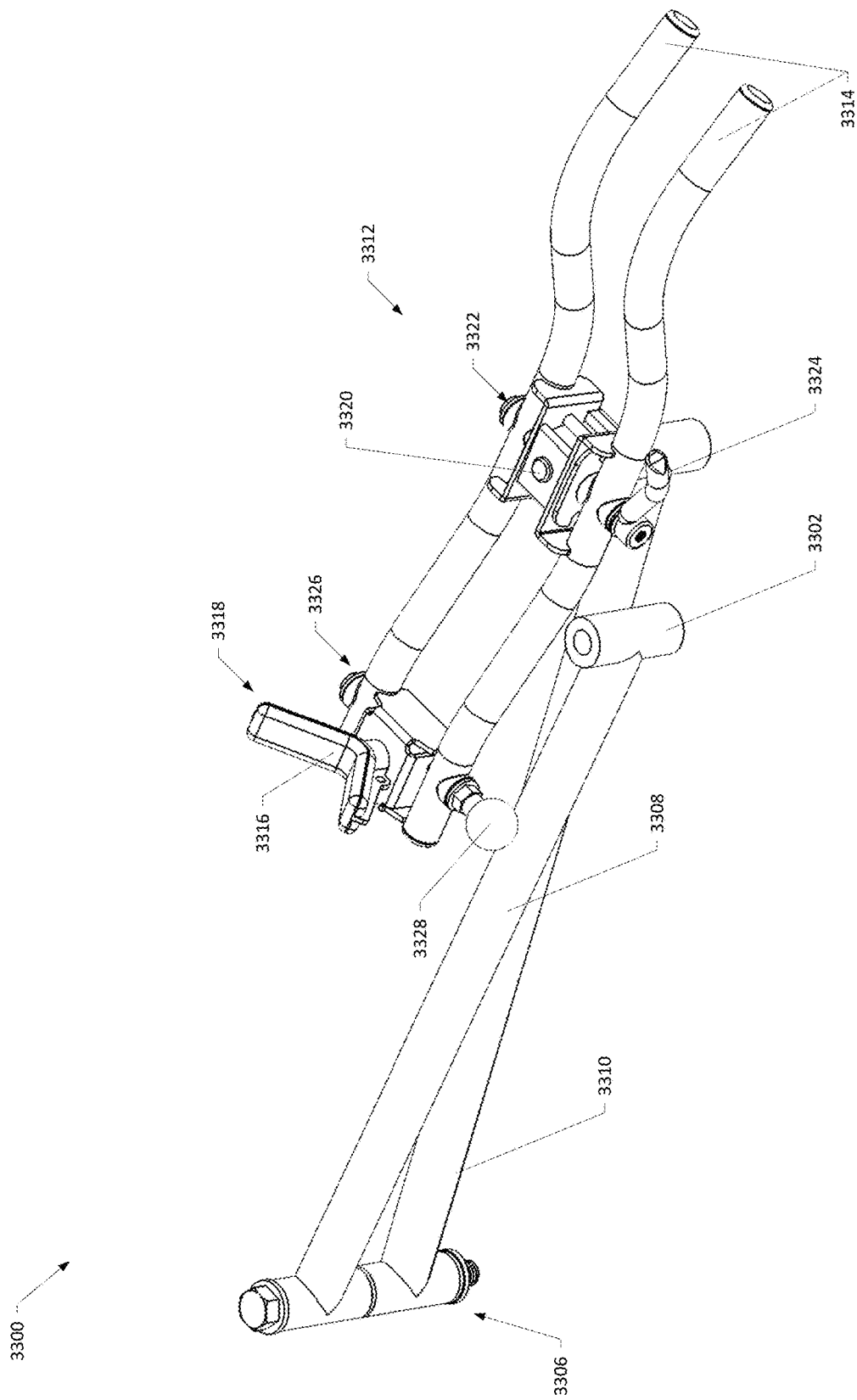
Figure 44:
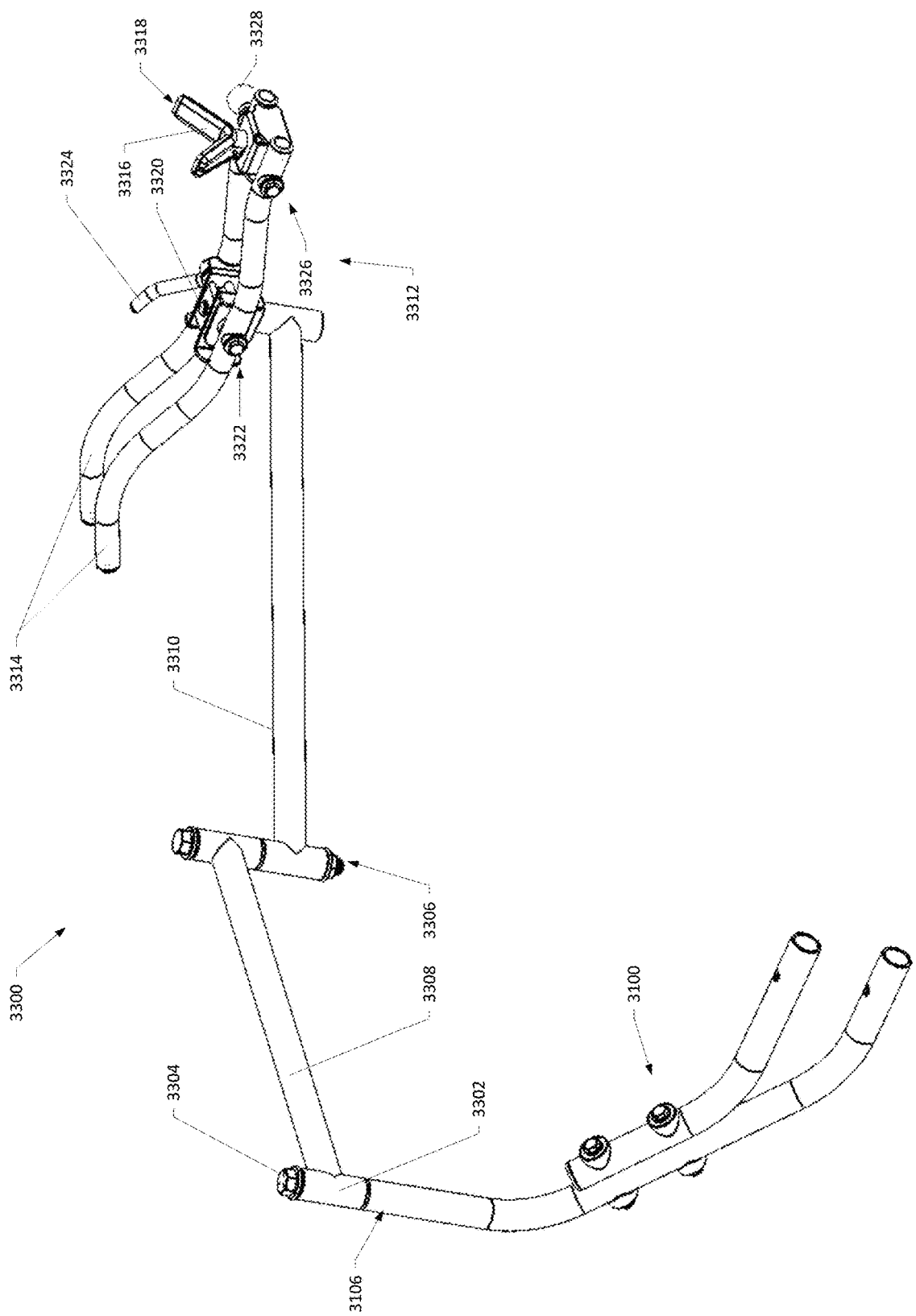

Having thus described the disclosure in the foregoing general terms, reference will now be made to the accompanying drawings, which are not necessarily drawn to scale, and wherein:

FIG. 1A illustrates a top front perspective view of various components of a tree stand system according to one aspect of the present disclosure;

FIG. 1B illustrates a side view of the article of FIG. 1A;

FIG. 1C illustrates a bottom rear perspective view of the article of FIG. 1A;

FIG. 2A illustrates a side view of the article of FIG. 1A in a stored configuration according to one aspect of the present disclosure;

FIG. 2B illustrates a top rear perspective view of the article of FIG. 1A in the stored configuration;

FIG. 3 illustrates a perspective view of a mounting apparatus, a frame post, and a locking mechanism according to one aspect of the present disclosure;

FIG. 4A illustrates a front perspective view of the mounting apparatus of FIG. 3;

FIG. 4B illustrates a front view of the mounting apparatus of FIG. 3;

FIG. 4C illustrates a side view of the mounting apparatus of FIG. 3;

FIG. 4D illustrates a rear perspective view of the mounting apparatus of FIG. 3;

FIG. 5 illustrates an exploded view of the mounting apparatus of FIG. 3 according to one aspect of the present disclosure;

FIG. 6 illustrates a perspective view of an attaching unit of the mounting apparatus of FIG. 3 according to one aspect of the present disclosure;

FIG. 7 illustrates a perspective view of the frame post and the locking mechanism of FIG. 3 according to one aspect of the present disclosure;

FIG. 8 illustrates a perspective view of the frame post of FIG. 3 according to one aspect of the present disclosure;

FIG. 9 illustrates a perspective view of the locking mechanism of FIG. 3 according to one aspect of the present disclosure;

FIG. 10A illustrates a perspective view of various components of the locking mechanism of FIG. 3 according to one aspect of the present disclosure;

FIG. 10B illustrates a side view of various components of a locking mechanism according of FIG. 3 to one aspect of the present disclosure;

FIG. 11 illustrates a perspective view of various components of the locking mechanism of FIG. 3 according to one aspect of the present disclosure;

FIG. 12A illustrates a perspective view of a hoisting apparatus according to one aspect of the present disclosure;

FIG. 12B illustrates a front view of the hoisting apparatus of FIG. 12A;

FIG. 13A illustrates top front perspective view of a seat portion of the tree stand of FIG. 1A according to one aspect of the present disclosure;

FIG. 13B illustrates a top rear perspective view of the seat portion of FIG. 13A;

FIG. 14 illustrates top front perspective view of a seat attaching bracket, a seat bottom frame, and a seat back frame of the tree stand of FIG. 1A according to one aspect of the present disclosure;

FIG. 15A illustrates a top front perspective view of the seat attaching bracket of FIG. 14 according to one aspect of the present disclosure;

FIG. 15B illustrates a top rear perspective view of the seat attaching bracket of FIG. 14;

FIG. 16 illustrates a perspective view of the seat back frame of FIG. 14 according to one aspect of the present disclosure;

FIG. 17 illustrates a perspective view of the seat bottom frame of FIG. 14 according to one aspect of the present disclosure;

FIG. 18A illustrates a top front perspective view of seat portions of a tree stand according to one aspect of the present disclosure;

FIG. 18B illustrates a top rear perspective view of the seat portions of FIG. 18A;

FIG. 19 illustrates a top front perspective view of a seat portion and a shooting rail of a tree stand according to one aspect of the present disclosure;

FIG. 20 illustrates a top front perspective view of various components of a tree stand system according to one aspect of the present disclosure;

FIG. 21 illustrates an enlarged view of various components of the system of FIG. 20;

FIG. 22 is a rear, bottom pictorial view of a tree stand, in accordance with an embodiment of this disclosure;

FIG. 23 is a bottom pictorial view of a portion of the tree stand of FIG. 22;

FIG. 24 is a rear, top pictorial view of a portion of the tree stand of FIG. 22;

FIG. 25 is a rear pictorial view of a portion of the tree stand of FIG. 22;

FIG. 26 is a front, top perspective view of a tree stand according to one aspect of the present disclosure;

FIG. 27 is a side view of the tree stand of FIG. 26;

FIG. 28 is a rear, bottom perspective view of the tree stand of FIG. 26;

FIG. 29 is an alternate rear, bottom perspective view of the tree stand of FIG. 26;

FIG. 30 is an enlarged perspective view of an upper mounting system and accessory mount of the tree stand system of FIG. 26;

FIG. 31 is an enlarged view of a lower engagement device and a lower linkage of the tree stand of FIG. 26;

FIG. 32 is a top perspective view of a tree stand system including a tree stand and a ladder according to one aspect of the present disclosure;

FIG. 33 is an enlarged front perspective view of the tree stand of FIG. 32;

FIG. 34 is an enlarged side perspective view of the tree stand of FIG. 33;

FIG. 35 is a partial rear perspective view of a tree stand system include two seat portions according to one aspect of the present disclosure;

FIG. 36 is an outer perspective view of a climbing stick according to an example embodiment of the present disclosure;

FIG. 37 is an inner perspective view of the climbing stick of FIG. 36;

FIG. 38 is an end view of the climbing stick of FIG. 36;

FIG. 39 is a front perspective view of a hoisting apparatus according to one aspect of the present disclosure;

FIG. 40 is a bottom perspective view of the hoisting apparatus of FIG. 39;

FIG. 41 is a perspective view of an accessory receiver according to one aspect of the present disclosure;

FIG. 42 is a perspective view of a bow holder accessory according to an example embodiment of the present disclosure;

FIG. 43 is a side perspective view of a hunting device accessory according to one aspect of the present disclosure; and FIG. 44 is a perspective view of the hunting device accessory of FIG. 43 engaged with the accessory receiver of FIG. 41.

DETAILED DESCRIPTION OF THE DISCLOSURE

The present disclosure will now be described more fully hereinafter with reference to exemplary aspects thereof. These exemplary aspects are described so that this disclosure will be thorough and complete, and will fully convey the scope of the disclosure to those skilled in the art. Indeed, the disclosure may be expressed in many different forms and should not be construed as limited to the aspects set forth herein; rather, these aspects are provided so that this disclosure will satisfy applicable legal requirements.

Various aspects of the present disclosure provide stands and related accessories, and systems and methods for affixing the stands to structures at elevated positions. An exemplary structure may be a naturally formed structure or a fabricated structure. In one aspect, the system may provide for the installation of a tree stand to a tree trunk that is suitable for sustaining the weight of the tree stand and occupant(s) of the tree stand.

In some aspects, as shown in FIGS. 1A-1C, a tree stand 10 may include a seat portion 100, a frame post 300, a locking mechanism 400, and a platform portion 500. The tree stand 10, or a system including the tree stand, may further include a mounting apparatus 200 (e.g., universal mounting apparatus) and a hoisting apparatus (shown in later figures). Although the tree stand 10 of FIGS. 1A-1C includes a single seat portion 100, other tree stands of this disclosure can include multiple seat portions and can be configured to provide seating for at least two occupants, as shown, for example, in FIGS. 18A and 18B.

In one aspect, FIGS. 2A and 2B illustrate the tree stand 10 stored in a first configuration. The tree stand 10 may be configured to be manipulated from the first configuration (e.g., a stored configuration) to a second configuration (e.g., an operational configuration; see, e.g., FIGS. 1A-1C), and vice versa. In particular, the seat portion 100 and the platform portion 500 may be configured to pivot and/or fold such that the overall volume occupied by the tree stand 10 in the first configuration is less than the overall volume occupied by the tree stand in the second configuration.

FIG. 3 further illustrates the mounting apparatus 200, frame post 300, and a portion of the locking mechanism 400 of the tree stand of FIG. 1. The mounting apparatus 200 may be configured to assist in leveling the tree stand 10, seat portion 100, frame post 300, and/or platform portion 500 with respect to horizontal when installing the tree stand at an elevated position on a structure (e.g., a tree trunk). For example, as shown in FIGS. 4A-4D, the mounting apparatus 200 may include a swivel portion 240 configured to rotate a receiver portion 214 about a fastener 212 (see, FIGS. 4B, 4D and 5). The swivel portion 240 may include a disc 241 (see, FIGS. 4A and 4B), which may comprise plastic or other suitable material, and which may be disposed between a mount bracket 202 and the receiver portion 214. The swivel portion 240 and/or the receiver portion 214 may include pins, drums, guides and/or other suitable physical features that are configured to assist and/or route a hoisting member 606 (see, e.g., FIG. 12A) therethrough such that the frame post 300 and locking mechanism 400 are directed into the receiver portion 214 in the desired orientation, as will be discussed in greater detail below.

According to one aspect illustrated in FIGS. 4A-4D, the mount bracket 202 of the mounting apparatus 200 may be a flange-shaped body member that includes a main bracket plate 204 that extends between and is connected to two flange portions 206. That is, and for example, the flange-shaped mount bracket 202 may include the main bracket plate 204 and corresponding flange portions 206. The flange portions 206 may extend substantially perpendicularly to the main bracket plate 204. The flange portions 206 may define at least one engagement feature 208, which may include a plurality of teeth configured to grip an exterior surface of the tree trunk, or the like. Although the at least one engagement feature 208 is illustrated as a plurality of serrations, the at least one engagement feature 208 may alternatively be any surface feature and/or material that is configured to increase the friction between the mount bracket 202 and the exterior surface of the tree trunk, or the like. The one or more engagement features 208 may extend horizontally, vertically and/or in any other suitable orientation.

As shown in FIG. 5, the main bracket plate 204 may define a bracket hole 210. The bracket hole 210 may be configured to receive a fastener 212 therethrough, which provides for operable engagement between the mount bracket 202 and the receiver portion 214. The fastener 212 may be configured to operably engage the receiver portion 214 and the main bracket plate 204 so as to provide for the above-referenced swiveling (e.g., rotation of the receiver portion about a longitudinal axis A (FIG. 4C) of the fastener). The receiver portion 214 may define a receiver portion hole 216 (FIG. 4B) configured to receive the fastener 212 therethrough, which also extends through the bracket hole 210. Once engaged with the mount bracket 202, the receiver portion 214 may, according to one aspect, be capable of rotating three hundred sixty degrees about the longitudinal axis A while still being securely connected to the main bracket plate 204 via the fastener 212. The fastener 212 may comprise a nut and bolt, or the like, that can be tightened with respect to one another to restrict relative rotation between the mount bracket 202 and the receiver portion 214 after the mounting apparatus 200 has been mounted to a tree trunk and the receiver portion is "leveled" (e.g., the lengthwise axis of the receiver portion is extending substantially vertically).

According to some aspects, the receiver portion 214 may further define a receiving channel 218 extending from proximate a distal end of the receiver portion 214 to proximate a proximal end of the receiver portion (e.g., from the top of the receiver portion to the bottom of the receiver portion). As shown in FIGS. 4B and 5, the receiver portion 214 may further define at least one receiver locking hole 220. The receiver portion 214 may define a first receiver locking hole 220 on a first surface of the receiver portion and may define a second receiver locking hole 220 disposed on an opposing second surface of the receiver portion. For example, FIG. 4D illustrates a rear perspective view of the mounting apparatus 200 where a rear, second surface of the receiver portion 214 defines a second receiver locking hole 220 that is disposed opposite of the first receiver locking hole 220 defined by the opposing front, first surface of the receiver portion (see, e.g., FIG. 4B). The receiver locking holes 220 may be configured to receive and operably engage locking teeth of the locking mechanism 400 (see, e.g., FIG. 3) that is configured to secure the frame post 300 (see, e.g., FIG. 3) to the mounting apparatus 200, as will be discussed in greater detail below.

Referring to FIGS. 4A-6, a mount attaching unit 230 may be fixedly connected to the mount bracket 202. For example, the mount attaching unit 230 may be secured to one of the flange portions 206. The mount attaching unit 230 may be configured to secure the mount bracket 202 to a structure (e.g., a tree trunk) at an elevated position. For example, an elongate first flexible tensile member (not shown) may be configured to extend at least partially around the tree trunk and engage the mount attaching unit 230. The first flexible tensile member may be in the form of a woven material such as, for example, a rope, strap, cable, webbing, and/or the like. The mount attaching unit 230 may be configured to releasably secure a second end of the first flexible tensile member to the mount attaching unit 230. The opposing, first end of the first flexible tensile member may be fixedly connected to the flange portion 206 that is opposite from the flange portion 206 carrying the mount attaching unit 230.

As shown in FIG. 6, the mount attaching unit 230 may include a manually operated winch 232 configured to engage the first flexible tensile member. For example, the winch 232 may be configured to secure, tighten, and/or fasten the first flexible tensile member to the mount attaching unit 230 such that the mount bracket 202 is secured to the tree. For example, the winch 232 may include a rotatable drum having a slot or hole for receiving the second end of the first tensile member, so that the drum may be rotated to tighten the first tensile member. When the drum is rotated, the first flexible tensile member is drawn into a coil, and accordingly, is tightened about the perimeter of the tree trunk. The winch 232 may further include a mechanism to prevent the tension in the first flexible tensile member from back driving the winch and unraveling the first flexible tensile member. For example, the winch 232 may include a gear 234 and a pawl 236 configured to lock the winch in a desired position and/or to allow rotation of the winch in one direction (e.g., a flexible tensile member tightening direction) while preventing the winch from rotating in the opposing direction (e.g., a flexible tensile member loosening direction).

According to some aspects, the mounting apparatus 200 may be lighter than an assembled tree stand known to those of ordinary skill in the art. As an example, the mounting apparatus 200 may be lighter than the combination of the seat portion 100, the frame post 300, and the locking mechanism 400. As such, a method of installing the tree stand 10 (see, e.g., FIG. 1) may include first attaching the mounting apparatus 200 to the structure (e.g., a tree trunk) before installing the seat portion 100 and/or other portions of the tree stand system, as will be discussed in greater detail below. In particular, the relatively light weight of the mounting apparatus 200 may advantageously provide for increased safety while installing the tree stand 10 as the user may orient, adjust, position, manipulate, and/or the like the mounting apparatus with relative ease due to the decreased weight.

FIG. 7 illustrates the frame post 300 and locking mechanism 400 assembled together, whereas they are respectively illustrated in isolation in FIGS. 8 and 9. The locking mechanism 400 may be configured to simultaneously lockingly engage both the frame post 300 and the receiver portion 214 of the mounting apparatus 200 (see, e.g., FIG. 5), as will be discussed in greater detail below.

As shown in FIGS. 7 and 8, the frame post 300 may define at least one frame post hole 302 configured to receive and/or operably engage at least one locking tooth 402 of the locking mechanism 400 therethrough. When the frame post 300 is operably engaged with the mounting apparatus 200, the at least one frame post hole 302 may be aligned and/or disposed proximate the at least one receiver locking hole 220 (see, e.g., FIG. 5), so that the receiver locking hole 220 is configured to receive the at least one locking tooth 402 of the locking mechanism 400 therethrough. Thereby, the at least one locking tooth 402 may extend through both the frame post hole(s) 302 and the receiver locking hole(s) 220. Additionally, the frame post 300 may be configured to provide support for positioning the seat portion 100 and/or the platform portion 500 with respect to the tree and/or other suitable structure.

Referring to FIG. 8, the frame post 300 may further define at least one frame post slot 304 that extends longitudinally along a length of the frame post 300. Referring also to FIG. 7, the at least one frame post slot 304 may be configured to receive therethrough at least a portion of a locking slide 406 of the locking mechanism 400. The at least one frame post slot 304 may include a first frame post slot and a second frame post slot disposed on a laterally-opposed surfaces of the frame post 300, for respectively receiving portions of the locking slide 406. The locking slide 406 may be configured to engage and/or disengage the at least one locking tooth 402.

As shown in FIGS. 3 and 7, the at least one locking tooth 402 of the locking mechanism is configured to extend through and/or operably engage the at least one frame post hole 302 and the at least one receiver locking hole 220. As shown in FIGS. 9, 10A and 10B, the locking mechanism 400 may include the first locking tooth 402 and a second locking tooth 404, each of which is configured to operably engage respective frame post holes 302 and respective receiver locking holes 220.

As shown in FIGS. 9 and 11, the locking slide 406 of the locking mechanism 400 may include a flange element that includes a main portion 410 and two laterally opposing flange portions 412 that extend substantially perpendicular to the main portion. Additionally, the locking slide 406 may include a slide retention member 414 that extends from the first flange portion 412 to the laterally opposed second flange portion 412. The slide retention member 414 may be configured to extend through and be retained within each of the frame post slots 304 (see, FIG. 8) defined by the frame post 300. Therefore, longitudinal movement of the locking slide 406 may be restricted to the length of the frame post slots 304.

As shown in FIGS. 10A and 10B, the locking mechanism 400 may further include a rod member 416, a first biasing element 418, and a second biasing element 420, wherein the biasing elements may be springs. Referring also to FIG. 9, the slide retention member 414 may be connected to the rod member 416 so that the rod member extends longitudinally from the slide retention member to the first biasing element 418.

As shown in FIGS. 10A and 10B, the first and second biasing elements 418, 420 may be configured to operably engage each of the first and second locking teeth 402, 404. In one aspect, as shown in FIG. 10B in particular, the first and second biasing elements 418, 420 may be configured to bias opposing surfaces of the first and second locking teeth 402, 404 such that when the first and second biasing elements are substantially undisturbed by external forces, the first and second biasing elements cooperate and bias the first and second locking teeth into a locked position in engagement with the frame post holes 302 and the receiver locking holes 220.

According to some aspects, the first and second locking teeth 402, 404 are configured to pivot and rotate inwardly towards a longitudinal frame post channel 306 (see, FIG. 8) defined by the frame post 300, such that when a predetermined force is applied to an outer surface of the first and second locking teeth, the first and second locking teeth retreat within the frame post channel. Additionally, the first and second locking teeth 402, 404 may be configured to pivot and rotate inwardly towards the frame post channel 306 in response to the force being applied to the locking teeth 402, 404 by the first biasing element 418 sufficiently exceeding the force being applied to the locking teeth 402, 404 by the second biasing element 420. As such, the first and second locking teeth 402, 404 may be configured to move between a locked position shown in FIG. 3, wherein the frame post 300 is secured to the receiver portion 214 (see, FIG. 5) of the mounting apparatus 200, to an unlocked position, wherein the frame post is configured to be removable from the receiver portion.

Generally reiterating from above with reference to FIG. 9, a distal end of the rod member 416 may be operably engaged with (e.g., connected to) the slide retention member 414. Generally reiterating from above with reference to FIGS. 10A and 10B, a proximal end of the rod member 416 may be operably engaged with the first biasing element 418. Because the first biasing element 418, the rod member 416, the slide retention member 414 and the locking slide 406 (see, e.g., FIG. 9) are all mechanically and/or operably linked to one another, actuating the locking slide 406 can cause an actuation of the first biasing element 418. According to one aspect, manually displacing the locking slide 406 into an upper position towards the first and second locking teeth 402, 404 will cause the rod member to lift an upper frame 421 of the locking mechanism 400 to which the first and second locking teeth are attached. Thereby, the locking teeth may release from engagement with the frame post holes 302 and the receiver locking holes 220.

In this regard, as illustrated in FIGS. 10A and 10B, the first and second locking teeth 402, 404 may each include an engagement slot 424. The engagement slots 424 may be configured to engage frame post 300 at the frame post holes 302 and the receiver portion 214 of the mounting apparatus 200 at the receiver locking holes 220. However, when the locking slide 406 is displaced into the upper position, the first biasing element 418 applies a force towards the first and second locking teeth 402, 404 such that the engagement slots 424 lift up from and release from the frame post 300 and the receiver portion 214. Further, when the locking slide 406 is displaced into the upper position, the force applied by the first biasing element 418 to the first and second locking teeth 402, 404 causes the first and second locking teeth to pivot inwardly within the frame post channel 306 defined by the frame post 300. As such, the first and second engagement slots 424 defined by the first and second locking teeth 402, 404, respectively, will disengage and move inwardly within the frame post channel 306 defined by the frame post 300 such that the frame post will be configured to be removable from the receiver unit 214 of the mounting apparatus 200. The locking slide 406 is normally biased by the biasing elements 418, 420 into a lower position away from the locking teeth 402, 404, so that the biasing elements 418, 420 bias the locking teeth 402, 404 toward their outward positions wherein they are engaged with the frame post 300 and the receiver portion 214 of the mounting apparatus 200.

The upper frame 421 of the locking mechanism 400 may include an attachment feature that can be an eyelet 422 disposed proximate a proximal end of the locking mechanism. The locking teeth 402, 404 may be pivotably mounted to the upper frame 421 between first and second portions thereof. The upper end of the second biasing element 420 may be fixedly mounted to the upper frame 421 of the locking mechanism 400. The upper frame 421 of the locking mechanism 400 may be received in the frame post 300 in the configuration shown in FIG. 7.

The eyelet 422 may be configured to receive a tensile member such as, for example, a rope, strap, cable, webbing, and/or the like therethrough. The tensile member may be secured, attached, and/or otherwise affixed to the eyelet 422 such that the locking mechanism 400 and the frame post 300 may be together hoisted into a desired elevated position. For example and referring also to FIGS. 12A and 12B, a hoisting member 606 of a hoisting apparatus 600 may be the tensile member that is secured to the upper frame 421 of the locking mechanism 400 by way of the eyelet 422, or the like, as will be discussed in greater detail below. In one example, the hoisting member 606 extends through the receiving channel 218 (FIG. 4A) and an associated guide channel of the mounting apparatus 200, the mounting apparatus is positioned between the tree stand 10 and the hoisting apparatus 600, and the hoisting apparatus 600 is operable to raise, lift, and/or hoist the tree stand (e.g., the frame post 300, locking mechanism 400, seat portion 100, and platform portion 500) to a desired elevated position as selected by the placement and/or installation of the mounting apparatus at the desired position, as will be discussed in greater detail below.

As shown in FIGS. 12A and 12B, the hoisting apparatus 600 may include a hoisting bracket 602 and associated features for securing the hoisting apparatus at an elevated position on a tree trunk, or the like. For example, the hoisting bracket 602 may include, or have mounted thereto, one or more engagement features (serrated features) similar to the engagement features 208 (FIG. 4A) discussed above. Also, the hoisting apparatus 600 may have connected thereto a hoist attaching unit that is similar to the above-discussed mount attaching unit 230 (FIGS. 4A-6), wherein the hoist attaching unit can be cooperative with a flexible tensile member for mounting the hoisting apparatus to the same tree trunk as, and above, the mounting apparatus 200.

The hoisting apparatus 600 may further include a hoisting mechanism 604 configured to hoist and/or lift the tree stand 10 with the hoisting member 606. The hoisting member 606 may include a woven material such as, for example, a rope, strap, cable, webbing and/or the like, configured to operably engage, lift and/or support the tree stand 10 (e.g., the frame post 300, locking mechanism 400, seat portion 100, and/or the platform portion 500). The hoisting member 606 may be operably engaged and/or affixed to a portion of the hoisting mechanism 604. For example, the hoisting member 606 may be affixed to a rotatable drum 608 of the hoisting mechanism 604. Therefore, rotation of the rotatable drum 608 may cause at least a portion of the hoisting member 606 to be wound onto itself and/or an outer surface of the rotatable drum, such as for causing the hoisting member 606 to lift the frame post 300 and, thus, the tree stand 10, or the like.

The hoisting mechanism 604 may include any one or a combination of pulleys, gears, wheels, reels, and/or the like configured to lift and/or lower the frame post 300 with the hoisting member 606. For example, as shown in FIGS. 12A and 12B, the hoisting mechanism 604 may include at least one gear 610. In one embodiment the hoisting mechanism 604 may include a plurality of gears 610. Further, the at least one gear 610 may be operably engaged with the rotatable drum 608. In particular, rotation of any one of the gears 610 may cause the rotatable drum 608 to rotate in a corresponding fashion. The hoisting apparatus 600 may include an actuation member (not shown) configured to operably engage the at least one gear 610. For example, the plurality of gears 610 may be configured and/or arranged to advantageously provide a mechanical advantage for the lifting of the frame post 300 and associated features. The hoisting mechanism 604 may comprise a winch that includes the at least one gear 610 and drum 608 and is configured for selectively pulling in/winding up, and letting out/winding out the hoisting member 606. For example, the winch may include a manually operable handle or crank and/or a motor for causing the drum 608 to rotate. In one example, the winch may be externally powered by a rechargeable drill, and may have a gear ratio of about thirty to one, or the winch may be powered in any other suitable manner and have any other suitable gear ratio.

As discussed above with reference to FIGS. 1A-1C, the tree stand 10 may include the seat portion 100 and platform portion 500 mounted to the frame post 300. As shown in FIGS. 13A and 13B, the seat portion 100 may include a seat bottom portion 102 and a seat back portion 104. The seat portion 100 may further include a seat cover 101 such as, for example, a woven fabric material and/or the like configured to engage a seat bottom frame 106 and/or a seat back frame 108. For example, the seat cover 101 may include loops, channels, and/or other features configured to receive at least a portion of the seat bottom frame 106 and/or the seat back frame 108 therethrough.

As shown in FIG. 14, the seat portion 100 may include a seat bracket 110 configured to engage the seat bottom frame 106 and/or the seat back frame 108. Additionally, the seat bracket 110 may include at least one seat post fastener 112 such as, for example, a U-bolt and/or the like. As shown in FIGS. 15A and 15B, the seat bracket 110 may include two seat post fasteners 112. The seat post fastener 112 may be configured to operably engage the frame post 300 (see, e.g., FIG. 7). Referring also to FIGS. 1B, 1C, 2A and 2B, the seat post fasteners 112 may extend from the seat bracket 110 and may be configured to receive the frame post 300 therebetween. The seat post fasteners 112 may be configured to provide for the vertical adjustment of the seat portion 100 relative to the frame post 300.

Returning to FIG. 15A, the seat post fasteners 112 may each be configured to operably engage the seat bracket 110. At least a portion of each seat post fastener 112 may extend through the seat bracket 110 and may be secured to the seat bracket with a nut 114. In one aspect, each seat post fastener 112 may be secured to the seat bracket 110 with two nuts 114 that each engage separate threaded portions of the seat post fastener that extend through the seat bracket. Advancing the nuts 114 along the threaded portions of the seat post fastener 112 may cause the seat post fastener to travel inwardly towards the seat bracket 110. More particularly, advancing the nut 114 along the threaded portions of the seat post fastener 112 may cause the opening defined between the seat post fastener and the seat bracket 110 to decrease in size such that when the frame post 300 extends though the opening, the seat post fastener engages and/or grips the frame post so as to secure the seat bracket to the frame post at a particular position.

Referring to FIGS. 15A and 15B, the seat bracket 110 may further include at least one anchoring pin 116 that extends from a first lateral end of the seat bracket to an opposing lateral end. The seat bottom frame 106 and/or the seat back frame 108 may be configured to operably engage the anchoring pin 116. For example, as shown in FIGS. 13B and 14, the anchoring pin 116 may extend through each of the seat bottom frame 106 and the seat back frame 108. As shown in FIG. 15B, the seat bracket 110 may define a pair of longitudinal seat back frame channels 118 that extend longitudinally and may be configured to receive at least a portion of the seat back frame 108 therein. The anchoring pin 116 may extend laterally across and through each of the seat back frame channels 118.

As noted above, the anchoring pin 116 may engage and/or extend through the seat back frame 108. For example, as shown in FIG. 16, the seat back frame 108 may define at least one seat back anchoring hole 118 configured to receive the anchoring pin 116 therethrough. The anchoring pin 116 may engage and/or extend through the seat bottom frame 106. As shown in FIG. 17, the seat bottom frame 106 may define at least one seat bottom anchoring hole 120 configured to receive the anchoring pin 116 therethrough. Therefore, the anchoring pin 116 may secure and/or retain the seat bottom frame 106 and/or the seat back frame 108 to the seat bracket 110 when the seat bottom anchoring hole(s) 120, the seat back anchoring hole(s) 118, and/or any holes defined by the seat bracket configured to receive the anchoring pin 116 therethrough are aligned with one another and the anchoring pin is inserted therethrough.

The seat bottom frame 106 may be configured to engage the anchoring pin 116 such that the seat bottom frame rotates about the anchoring pin. For example, as shown in FIGS. 2A and 2B, the seat bottom frame 106 may be rotated towards the seat back frame 108 as the anchoring pin 116 serves as a pivot point. Additionally, according to some aspects, a portion of the seat bottom frame 106 defining the seat bottom anchoring hole(s) 120 may extend vertically and may be disposed proximate the seat bracket 110 such that the seat bracket may limit the rotation of the seat bottom frame 106. For example, the seat bottom anchoring hole(s) 120 may be disposed proximate an end of a portion of the seat bottom frame 106, as shown in FIG. 17, such that when the seat bottom frame is engaged with the anchoring pin 116 and/or the seat bracket 110, the seat bottom frame may be rotated upwards towards the seat back frame 108, as previously mentioned. The seat bracket 110 may be configured to limit the rotation of the seat bottom frame 106 away from the seat back frame 108 when the seat bottom frame is disposed in a use position. For example, the seat bracket 110 may limit the motion of the seat bottom frame 106 by defining a seat bottom frame channel 122 (FIG. 15A) configured to retain at least a portion of the seat bottom frame and/or support the seat bottom frame when the seat bottom frame is disposed in the use position shown in FIG. 1B. Therefore, the tree stand 10 may advantageously provide for a seat 100 that does may not include support straps and/or other supporting mechanisms that are attached to both the seat bottom frame and the seat back frame as known in the art. Such supporting mechanisms may undesirably hinder a user's access to and from the tree stand seat. The seat bottom frame channel 122 may be accessible from the front of the seat bracket 110, while the seat back frame channels 118 may be accessible from the rear of the seat bracket, as shown in FIGS. 15A and 15B. Accordingly, as shown in FIG. 15A, the seat bottom frame 106 may be able to rotate about line X-X along the direction of arrow A, while the seat back frame 108 may be able to rotate about line X-X along the direction of arrow B. In particular, the seat bracket 110 may be configured to limit the rotation of the seat bottom frame 106 along the direction of arrow B when the seat bottom frame is disposed in a use position, and the seat bracket may be further configured to limit the rotation of the seat back frame 108 along the direction of arrow A when the seat back frame is disposed in a use position, as shown in FIG. 14. Additionally, the seat back frame 108 may be secured in the use position with a thumbscrew 124 and/or the like, as shown in FIGS. 15A and 15B. In this regard, the thumb screw 124 may extend into the bottom of the seat back frame 108 to prevent rotation thereof. The seat bracket 110 may further include a plurality of bumpers disposed proximate where the anchoring pin 116 engages the seat bottom frame 106 and/or the seat back frame 108. The bumper(s) may be configured to mitigate noise as the seat bottom frame and the seat back frame engage the anchoring pin. The bumper(s) may comprise a plastic material.

Referring to FIGS. 18A and 18B, a tree stand may include a seating portion 1100 configured to seat two people. The tree stand system may include individual frame posts 300 (see, e.g., FIG. 8) that are each configured to engage one of a first seat bracket 1110 and a second seat bracket 1111 of the seating portion 1100. Additionally, each of the individual frame posts 300 may be inserted into respective receiver portions 214 of one or more mounting apparatuses 200, as described above, for example, with respect to FIGS. 4A-4C.

According to another aspect, the seating portion 1100 configured to seat two people may include a single seat bracket (not shown) disposed proximately between the two seating portions. The single seat bracket may be configured to operably engage a single frame post 300 (see, e.g., FIG. 8) that may be inserted into a single receiver portion 214 of a mounting apparatus 200 (see, e.g., FIG. 5). According to another aspect of the present disclosure, a seating portion 1100 configured to seat two people, as shown in FIGS. 18A and 18B, may include a first seat bracket 1110 and a second seat bracket 1111 that are configured to operably engage at least one frame, or the like, that is mounted to a single frame post 300 that may be received by a single receiver portion 214 of a mounting apparatus 200 approximately centered with respect to the two seats.

Referring to FIG. 19, the seating portion 100 (and also the seating portion 1100 of FIGS. 18A and 18B) may further include a safety and/or support rail apparatus 130 (e.g., a shooting rail) configured to support a weapon (e.g., a rifle), camera and/or other suitable device. In one aspect, the support rail apparatus 130 may be configured to operably engage the seat back frame 108. For example, as shown in FIG. 19, the support rail apparatus 130 may include a U-shaped rail member 132 configured to at least partially extend around a user seated in the seating portion 100, and at least one support member 134 configured to provide support to the rail member. The support rail apparatus 130 may include various geometric features configured to operably engage and/or receive various mounting systems for accessories such as, for example, cameras, tables, and/or any other suitable accessory. By way of example, at least one mounting hole 77 may be configured to engage an accessory.

Another aspect of the present disclosure is the provision of a tree stand system 2010 that includes a ladder 700 configured to provide access to the seating portion 2100 from the ground when the seating portion 2100 is disposed proximate the desired elevated position, as shown in FIGS. 20 and 21. In particular, the tree stand system 2010 may include a forward step 702 (e.g., secondary platform) disposed proximately between the platform portion 2500 (e.g., main platform) and the uppermost rung 704 (e.g., crossbar) of the ladder 700. The ladder typically includes a series of the rungs 704 spanning between side rails of the ladder, and the side rails may form or be part of a frame 701 of the ladder. The forward step 702 may be configured to advantageously provide for increased safety and ease of use (e.g., a wide and stable intermediate step) when a user transitions (e.g., steps) from the ladder 700 to the platform portion 2500.

The ladder frame 701 may be operatively connected to and extend from the platform portion 2500 and/or the frame post 300 (see, e.g., FIG. 8). In one aspect, the ladder frame 701 may operably engage the platform portion 2500 and/or the frame post 300 so as to provide additional structural support to the tree stand system 2010. The ladder frame 701 may further include at least one handrail 706 that is configured to provide additional safety by providing the user with a plurality of hand grip locations as the user traverses the ladder 700, transitions from the ladder 700 to the platform portion 2500, adjusts his positioning relative to the tree stand system 2010 and/or the like. The handrail 706 may extend upwardly and at least partially around the seating portion 2100, and the seating portion may include one or more seats, or the like.

Referring to FIGS. 1C and 21, in the tree stand 10 and the tree stand system 2010, the platform portions 500, 2500 may include a platform frame 502 mounted to and extending forwardly from the frame post 300 (see, e.g., FIG. 8), and the platform frame may support both a lower engagement device 800 and a lower attaching unit 802. For example, the lower engagement device 800 may include a generally U-shaped bar 806 having opposite ends attached to the platform frame 502 so that the U-shaped bar extends partially around and rearwardly of the frame post 300. The lower engagement device 800 may further include, or have mounted thereto, one or more engagement features 808 (serrated features) similar to the engagement features 208 (FIG. 4A) discussed above. The engagement features 808 of the lower engagement device 800 may comprise plates (e.g., serrated plates), wherein the serrations extend outwardly from convex edges of the plates for engaging a tree trunk, or the like. The lower attaching unit 802 may be proximate the lower engagement device and be similar to the above-discussed mount attaching unit 230 (FIGS. 4A-6), wherein the lower attaching unit can be cooperative with a flexible tensile member for mounting the lower end section of the frame post 300 to the tree trunk, or the like.

The convex edges of the lower engagement device 800 are configured to extend toward the structure (e.g. a tree trunk) to allow the tree stand to roll against the structure.

Thereby, the user may select a horizontal angle (e.g., North, East, South, or West) that the tree stand faces. In other words, the convex edges may cooperate with the structure, which may typically define a substantially round cross-section, in the same manner that two gears cooperate, so as to allow for relative movement therebetween. However, as may be understood, the tree or other structure is typically fixed in place such that only the tree stand rotates.

Once a desired horizontal angle is selected, the at least one engagement feature 208 (see, e.g., FIG. 4D) may be engaged with the structure. The at least one engagement features 208 may be defined at one or more receiving edges of the flanges 206. The receiving edges may secure the tree stand at the horizontal angle selected with the convex edges of the lower engagement device 808. In this regard, the one or more receiving edges may be configured to at least partially surround the structure to secure the tree stand at the horizontal angle selected. Thus, as illustrated, the two flanges 206, which may be vertically extending and separated from one another to allow the structure, which may be rounded, to be received therebetween. However, as may be understood, in other embodiments the engagement device may be concave or V-shaped in order to allow the structure to be received therein and secure the tree stand at the horizontal angle selected. Thereby, although the lower engagement device 800 may be configured to allow the tree stand 10 to roll against the structure such that the tree stand points in a desired horizontal direction, the mounting apparatus 200 may be configured to engage the structure to prevent further rotational movement once a desired direction of the tree stand is selected and the mounting apparatus is engaged with the structure. Thereby, the tree stand 10 may be securely retained in a desired position.

In the example of the tree stand system 2010 shown in FIG. 21, the upper end of the ladder frame 701 is connected to the platform frame 2502, and the portion of the handrail 706 extending above and away from the ladder 700 is supported by upright members 708 connected to the platform frame.

Some aspects of the present disclosure provide for a method of installing a tree stand and/or tree stand system. In one aspect, a user may identify a suitable structure (e.g., a tree trunk) for installing the tree stand system. The tree stand system may include a plurality of climbing or ladder sticks configured to be affixed to the tree using traditional means and methods. In some embodiments, each of the climbing sticks may be tethered to one another such that after a first ladder stick has been installed at a desired location on the tree, a user may retrieve and install a subsequent ladder stick to the tree at a location disposed higher than the previously installed ladder stick. According to one aspect, at least one of the climbing sticks may also be tethered to the mounting apparatus 200 and/or hoisting apparatus 600. In another aspect, the mounting apparatus 200 and/or hoisting apparatus 600 may be tethered to one another and/or at least one of the climbing sticks. Therefore, after affixing the plurality of climbing sticks to the tree at the desired locations, the user may easily retrieve the mounting apparatus 200 and/or hoisting apparatus 600 without having to descend to the base of the tree.

According to one aspect, after ascending the structure (e.g., tree trunk) to the desired position using the plurality of climbing sticks or other suitable device(s), the user may install the mounting apparatus 200 at a desired location on the tree trunk. The mounting apparatus 200 may be significantly lighter and smaller than the tree stand (e.g., the frame post 300, the seat portion 100, and/or the platform portion 500), so that the tree stand system advantageously provides for easier and safer installation by providing the user with a mounting apparatus that is easier to carry, manipulate, and/or position.

A method of installing the tree stand system may include installing the hoisting apparatus 600 at a location higher than the previously-installed mounting apparatus 200. According to another aspect, the user may first install the hoisting apparatus 600 and subsequently install the mounting apparatus 200 at a location below the hoisting apparatus. In one aspect, when the mounting apparatus 200 and the hoisting apparatus 600 are installed and/or affixed to the tree at their respective desired locations, the mounting apparatus and the hoisting apparatus may be spaced apart from one another by approximately 2 to 3 feet.

In one aspect, after the hoisting apparatus 600 and the mounting apparatus 200 are installed at their respective desired locations, the free end of the hoisting member 606 may be routed through the receiver portion 214 and any associated guide structure of the mounting apparatus 200 and lowered to the ground. The user may then descend to the ground using the previously installed climbing sticks. Upon returning to the ground, the user may take the hoisting member 600 and operably connect the hoisting member to the tree stand 10 or tree stand system 2010, (e.g., by way of the eyelet 422, or the like). After the hoisting member 606 is securely attached to the eyelet 422, or the like, the user may then operate the hoisting mechanism 604 (e.g., winch) of the hoisting apparatus 600 to raise the assembled frame post 300 (e.g., the frame post is typically connected to at least the seat portion(s), platform portion(s), and locking mechanism 400), so that the frame post 300 and structures carried by the frame post are guided to the mounting apparatus 200. In particular, the frame post 300 is guided to the receiver portion 214 of the mounting apparatus 200. As the frame post 300 enters the receiver portion 214, an internal surface of the receiver portion 214 compresses the locking teeth 402, 404 inwardly until the frame post is positioned such that the locking teeth respectively extend through the receiver locking holes 220 and the frame post holes 302, thereby securing the frame post 300 and attached structures to the mounting apparatus 200 at the desired elevated location. The user may then further secure the frame post 300 to the mounting apparatus 200 by engaging both the frame post and the mounting apparatus with a safety pin 250 (FIG. 4A) that is configured to traverse through both the receiver portion and the frame post.

In accordance with an example of a method for removing the frame post 300 from the mounting apparatus 200, the safety pin 250 (FIG. 4A) may be withdrawn, tension in the hoisting member 606 may be substantially reduced, such as by operating the hoisting mechanism 604 in reverse, and the locking slide 406 may be manually moved upwardly toward the mounting apparatus, so that the locking teeth 402, 404 at least temporarily transition from their locking positions to their unlocked positions.

In variations of all of the above-discussed embodiments, the mounting apparatus 200 may be omitted and the frame post 300 may be in the form of a frame post 300 from which features for being associated with the mounting apparatus 200 may be omitted. For example, for the above-discussed tree stand 10 (e.g., FIG. 1A), the post 300 may not include or have associated therewith the above-discussed frame post hole 302, frame post slot 304, frame post channel 306, locking mechanism 400, locking teeth 402, 404, locking slide 406, flange portions 410, 412, slide retention member 414, rod 416, biasing elements 418, 420, upper frame 421 and eyelet 422.

An embodiment of the tree stand 10A shown in FIGS. 22-25 may be like the above-discussed tree stand 10, except for variations noted and variations that will be understood by those of ordinary skill in the art. In the tree stand 10A, the frame post 300 may not include or have associated therewith one or more of, such as all of, the above-discussed features 302, 304, 306, 400, 402, 404, 406, 410, 412, 414, 416, 418, 420, 421, 422.

The embodiment of the tree stand 10A shown in FIG. 22 includes one or more upper mounting systems 25 configured to at least partially mount the tree stand to an associated tree trunk. Each upper mounting system 25 may include an upper engagement device 20 fixedly mounted to an upper portion of the frame post 300. Each upper engagement device 20 may include at least one flange 21 extending outwardly from a bracket plate 27 fixedly mounted to the frame post 300. The flanges 21, such as adjacent flanges, of the upper engagement devices 20 may include a convexly, outwardly protruding edge with a series of teeth configured to grip an exterior surface of a tree trunk.

The convex edges of the upper engagement device 20 are configured to extend toward the structure (e.g. a tree trunk) to allow the tree stand to roll against the structure. Thereby, the user may select a horizontal angle that the tree stand faces. In other words, the convex edges may cooperate with the structure, which may typically define a substantially round cross-section, in the same manner that two gears cooperate, so as to allow for relative movement therebetween. However, as may be understood, the tree or other structure is typically fixed in place such that only the tree stand rotates.

Each upper mounting system 25 may further include a tie down mechanism 22 having a flexible tensile member connected to the bracket plate 27, and a mechanical ratchet 29 connected to the bracket plate. The flexible tensile member may be in the form of a woven material such as, for example, a rope, strap, cable, webbing, and/or the like. A first end of the flexible tensile member can be connected to the bracket plate 27, and the tensile member can be extended at least partially around the tree trunk. The second end of the tensile member can then be connected to the spindle of the mechanical ratchet 29, and the mechanical ratchet may be manually operated by repeatedly pivoting a lever so that the mechanical ratchet tightens the tensile member around the tree trunk and the teeth of the upper engagement devices 20 securely engage the tree trunk.

For each upper mounting system 25, there can be at least one connection between the frame post 300 of the tree stand 10A and the mechanical ratchet 29 of the tie down mechanism 22. For example, for each upper mounting system 25, an upper linkage 24 can connect the mechanical ratchet 29 to the bracket plate 27. By way of further example, for each upper mounting system 25, the upper linkage 24 can include a bar 26 or other suitable structure having opposite ends that are respectively pivotably connected between flanges 21 of the upper engagement devices 20 and the mechanical ratchets 29 of the tie down mechanism 22. For example, the bar 26 may be a substantially rigid link, rod or other suitable connector member that is in the form of a strip of metal or other suitable material. The bar 26 may be connected to the upper engagement device 20 by a lug or pivot pin having opposite ends respectively connected to end portions of the flanges 21 of the upper engagement device. While the teeth of the upper engagement devices 20 are engaged against or suitably proximate the exterior surface of a tree trunk, the free end of the tensile member of each tie down mechanism 22 may be extended at least partially around the tree trunk and then be drawn tightly into the tie down mechanism, for mounting the upper portion of the frame post 300 and, thus, the tree stand 10A, to the tree trunk.

The embodiment of the tree stand 10A shown in FIGS. 22-25 further includes at least one lower engagement device 28 that is connected to the frame of the tree stand in an articulated manner, such as by a lower linkage 30. The lower engagement device 28 may include two flanges 31 extending outwardly from opposite edges of a bracket plate 33. The flanges 31 of the lower engagement device 28 may include concavely, inwardly protruding edges with a series of teeth configured to grip an exterior surface of a tree trunk.

Once a desired horizontal angle is selected using the convex upper mounting system 25, the lower engagement device 28 may be engaged with the structure. The flanges 31 of the lower engagement device 28 define concave receiving edges configured to receive the structure therein. However, as may be understood, in other embodiments the engagement device may be V-shaped or define multiple separated edges that extend vertically in order to allow the structure to be received therein and secure the tree stand at the horizontal angle selected. Thereby, although the upper mounting system 25 may be configured to allow the tree stand 10A to roll against the structure such that the tree stand points in a desired horizontal direction, the lower engagement device 28 may be configured to engage the structure to prevent further rotational movement once a desired direction of the tree stand is selected and the mounting apparatus is engaged with the structure. Thereby, the tree stand 10A may be securely retained in a desired position.

The frame of the tree stand 10A includes first and second frame members 32 that are substantially parallel to one another and each extend outwardly relative to a forward portion of the frame of the tree stand. The lower linkage 30 of the tree stand 10A includes first and second extensible rods 34 that are respectively operatively associated with (e.g., extend into) the tubular first and second frame members 32 so that the first rod can be moved along and secured relative to the first frame member independently of the second rod, and the second rod can be moved along and secured relative to the second frame member independently of the first rod, so that first and second first frame members and first and second rods are cooperatively configured to provide translatable connections of the lower linkage. The rods 34 can be respectively secured to the frame members 32 with pins (e.g., pins selectively extending through holes in the frame members and rods) or other suitable releasable fastening devices or locks, so that the lower linkage 30 can be releasably secured in a variety of configurations. The lower engagement device 28 can be connected to one or both of the first and second rods 34 to allow the engagement device to be moved inwardly and outwardly relative to the frame to adjust engagement between the outer side of the engagement device and a tree trunk. Thereby, the lower engagement device 28 may be moved toward or away from the structure.

The lower linkage 30 of the tree stand 10A pivotably connects the lower engagement device 28 to one or both of the first and second rods 34. For example, outer ends of the first and second rods 34 may be pivotably connected to opposite end portions or extensions of the flanges of the lower engagement device 28 by lugs, pivot pins and/or other suitable features. Accordingly, the lower engagement device 28 can be pivoted relative to the frame to adjust an angle of the lower engagement device with respect to the structure and to adjust engagement between the outer side of the lower engagement device and a tree trunk when the tree stand 10A is mounted to the tree trunk. Thereby, when both rods 34 are extended or retracted, the pitch of the tree stand 10A is adjusted. When one of the rods 34 is adjusted related to the other of the rods (e.g. when one of the rods is extended or retracted as compared to the other rod), the roll of the tree stand 10A is adjusted.

With the first and second frame members 32 being substantially parallel to one another, and the first and second extensible rods 34 extending into the tubular first and second frame members 32, the first rod can be moved alone and secured relative to the first frame member independently of the second rod, and the second rod can be moved alone and secured relative to the second frame member independently of the first rod. The first and second rods 34 are thus independently extensible in parallel with each other. In light of the first and second rods 34 being independently extensible in parallel with each other, in instances where the engagement device 28 is connected to the distal ends of both of the first and second rods 34, the engagement device 28 is pivotably connected to both of the first and second rods 34 at the distal ends thereof. That is, the engagement device 28 is pivotably connected between the distal ends of the first and second rods 34, wherein the first and second rods 34 are independently extensible in parallel with each other, as shown, for example, in FIGS. 22-25 and 31.

In further instances where the first and second rods 34 are unequally extended/retracted with respect to the first and second frame members 32, the distance between the distal ends of the first and second rods 34 will be greater than the distance between the parallel first and second rods 34 or between the parallel first and second frame members 32. That is, the first and second rods 34 unequally extended/retracted with respect to the first and second frame members 32 will define a right triangle, with one leg of the right triangle being the distance between the parallel first and second rods 34 or between the parallel first and second frame members 32, and the other leg of the right triangle being the difference in extension distance between the distal ends of the first and second rods 34 (i.e., the difference between the extension length of the first rod 34 with respect to the first frame member 32, and the extension length of the second rod 34 with respect to the second frame member 32). In such instances, the hypotenuse of the right triangle will be defined by the engagement device 28, and the length thereof will inherently be determined by the Pythagorean Theorem. As such, in the disclosed arrangement with the first and second rods 34 being independently extensible in parallel with each other, the length of the engagement device 28 is required to vary from a minimum of the distance between the parallel first and second rods 34 or between the parallel first and second frame members 32 (e.g., when the first and second rods 34 are extended for the same distance), to a maximum attained when one of the first and second rods 34 is fully extended and the other of the first and second rods 34 is not extended. Accordingly, in articular aspects the engagement device 28 is extensible between the distal ends of the first and second rods 34.

More particularly, as shown in more detail in FIG. 23, the engagement device 28 includes a main body 38 and opposing first and second end brackets 36, 37 (see. e.g., FIG. 25). Each of the first and second end brackets 36, 37 is pivotably connected to the distal end of a respective one of the first and second extensible rods 34. As shown, the main body 38 defines two slot 38A, 38B each extending along the main body 38. A fastener (e.g., a bolt) 39, 40 extends through each slot 38A, 38B on the front side of the main body 38 and through one of the first and second end brackets 36, 37 on the back side. Each fastener 39, 40 can be retained through the respective slot 38A. 388 and bracket 36, 37, for example, by a nut engaging the respective bolt on the back side of the main body 38/bracket 36, 37. Since the first and second end brackets 36, 37 are separate elements (not joined on the back side—see, e.g., FIG. 25), the fastener 39, 40 being movable in the respective slot 38A. 38B allows the respective bracket 36, 37 to translate along the main body 38 for the length of the respective slot 38A 38B until the fastener 39, 40 contacts either end of the slot 38A 38B. This arrangement is thus one example of the engagement member 28 being extensible.

In one example of a method of mounting the tree stand 10A to a tree, one or more of the mounting systems may be used to mount an upper portion of the tree stand to an upper portion of the tree trunk so that the tree stand is at least partially supported by the tree trunk; and then the orientation of the tree stand may be adjusted relative to the tree trunk while the upper portion of the tree stand is mounted to the upper portion of the tree trunk. The adjusting of the orientation of the tree stand 10A may include repositioning the lower engagement device 28 relative to the frame of the tree stand, and an outer side of the lower engagement device being engaged against a lower portion of the tree trunk. The repositioning of the lower engagement device 28 relative to the frame of the tree stand may include reconfiguring the lower linkage 30 from a first configuration to a second configuration, and securing the lower linkage in the second configuration. In one example, the repositioning of the lower engagement device 28 relative to the frame of the tree can cause the frame post 300 to extend vertically or substantially vertically, even when the tree trunk does not extend vertically or includes one or more bends proximate the tree stand 10A. As another example, a user of the tree stand 10A can reposition the lower engagement device 28 to achieve a variety of different orientations, such as an inclined orientation of the frame post 300, such as when the inclined orientation may allow the user to sit more comfortably in the tree stand, or the like.

In other embodiments of this disclosure, one or more of the upper mounting systems may be part of other articles configured to be mounted to tree trunks, such as ladders, climbing sticks or other suitable articles.

As may be understood, the particular configuration of the tree stand may vary within the scope of the present disclosure. In this regard, FIGS. 26-31 illustrate a tree stand 10B according to an additional example embodiment of the present disclosure. The tree stand 10B may be substantially similar to the tree stands described above (see, e.g., FIGS. 1A and 22) in a number of respects, and hence each of the features thereof will not be described in detail for brevity purposes.

As illustrated, the tree stand 10B may include a seat portion 100B, a frame post 300B, and a platform portion 500B. The seat portion 100B may include a seat bracket 110B that retains the seat portion in engagement with the frame post 300B. Note that a seat cover of the seat portion 100B is not illustrated. However, the tree stand 10B may include a seat cover which may be substantially similar to the seat cover 101 described above (see, e.g., FIG. 1A).

The platform portion 500B may differ from the embodiments described above in that the platform frame 502B may comprise plates, which may be planar or bent to define a desired cross-section, and/or substantially rectangular bars, as opposed to tubes defining a round cross-section. Further, the plates and/or bars may be substantially straight, as opposed to curved. Thereby, component costs of the platform frame 502B may be reduced as compared to usage of round, curved tubing.

Further, as illustrated in FIG. 26, the plates defining a top surface 503B of the platform portion 500B may include a plurality of apertures 505B each respectively surrounded by a raised collar 507B. The apertures 505B may reduce a weight of the platform portion 500B. Additionally, the apertures 505B and the raised collars 507B may provide the top surface 503B with enhanced traction to prevent slippage. However, as may be understood, in other embodiments the top surface of the platform portion may be provided with other textures or patterns in order to provide traction.

As illustrated in FIG. 31, the frame post 300B may extend through the platform portion 500B. A bracket 509B may engage the platform frame 502B and the frame post 300B to prevent movement therebetween after the frame post is inserted through the platform portion 500B.

As illustrated in FIG. 26, the tree stand 10B may further include a lower engagement device 28B and one or more upper mounting systems 25B. The lower engagement device 28B and the upper mounting systems 25B may be configured to engage a structure such as a tree trunk. The upper mounting systems 25B may be substantially similar to the upper mounting systems 25 described above with respect to FIG. 22.

In this regard, as illustrated in FIG. 30, each upper mounting system 25B may include an upper engagement device 20B fixedly mounted to an upper portion of the frame post 300B. Each upper engagement device 20B may include at least one flange 21B extending outwardly from a bracket plate 27B fixedly mounted to the frame post 300B. The flanges 21B, such as adjacent flanges, of the upper engagement devices 20B may include a convexly, outwardly protruding edge with a series of teeth configured to grip an exterior surface of a tree trunk. This convex, protruding shape of the edges of the upper engagement device 20B may allow the horizontal angle of the tree stand to be easily adjusted such that the tree stand may face a desired direction. In this regard the convex shape may engage a tree trunk in a manner that is similar to the manner by which two gears engage one another, thereby facilitating positioning of the tree stand in a desired direction prior to securing the tree stand to the structure.

Each upper mounting system 25B may further include a tie down mechanism 22B having a flexible tensile member connected to the bracket plate 27B, and a mechanical ratchet 29B connected to the bracket plate. The flexible tensile member may be in the form of a woven material such as, for example, a rope, strap, cable, webbing, and/or the like. A first end of the flexible tensile member can be connected to the bracket plate 27B, and the tensile member can be extended at least partially around the tree trunk. The second end of the tensile member can then be connected to the spindle of the mechanical ratchet 29B, and the mechanical ratchet may be manually operated by repeatedly pivoting a lever so that the mechanical ratchet tightens the tensile member around the tree trunk and the teeth of the upper engagement devices 20 securely engage the tree trunk.

For each upper mounting system 25B, there can be at least one connection between the frame post 300B of the tree stand 10B and the mechanical ratchet 29B of the tie down mechanism 22B. For example, for each upper mounting system 25B, an upper linkage 24B can connect the mechanical ratchet 29B to the bracket plate 27B. By way of further example, for each upper mounting system 25B, the upper linkage 24B can include a bar 26B or other suitable structure having opposite ends that are respectively pivotably connected between flanges 21B of the upper engagement devices 20B and the mechanical ratchets 29B of the tie down mechanism 22B. For example, the bar 26B may be a substantially rigid link, rod or other suitable connector member that is in the form of a strip of metal or other suitable material. The bar 26B may be connected to the upper engagement device 20B by a lug or pivot pin having opposite ends respectively connected to end portions of the flanges 21B of the upper engagement device. While the teeth of the upper engagement devices 20B are engaged against or suitably proximate the exterior surface of a tree trunk, the free end of the tensile member of each tie down mechanism 22B may be extended at least partially around the tree trunk and then be drawn tightly into the tie down mechanism, for mounting the upper portion of the frame post 300B and, thus, the tree stand 10B, to the tree trunk.

Once a desired horizontal angle is selected using the convex upper mounting system 25B, the lower engagement device 28B may be engaged with the structure. As illustrated in FIG. 31, flanges 31B of the lower engagement device 28B define concave receiving edges configured to receive the structure therein. However, as may be understood, in other embodiments the engagement device may be V-shaped or define multiple separated edges that extend vertically in order to allow the structure to be received therein and secure the tree stand at the horizontal angle selected. Thereby, although the upper mounting system 25B may be configured to allow the tree stand 10B to roll against the structure such that the tree stand points in a desired horizontal direction, the lower engagement device 28B may be configured to engage the structure to prevent further rotational movement once a desired direction of the tree stand is selected and the mounting apparatus is engaged with the structure. Thereby, the tree stand 10A may be securely retained in a desired position. In this regard, regardless of the particular configuration thereof, one of an upper engagement device and a lower engagement device may allow horizontal rolling movement against the structure, whereas the other of the upper and lower engagement devices may substantially prevent such movement once a desired position is selected.

Additionally, the lower engagement device 28B may be similar to the lower engagement device 28 described above (see, e.g., FIG. 23). In this regard, as illustrated in FIG. 31, the position of the lower engagement device 28B may be adjusted via a lower linkage 30B including first and second rods 34B as described above. However, the rods 34B may not engage the platform frame 502B in the manner described above with respect to FIG. 23. Rather, the frame post 300B may include one or more horizontal extensions 308B, which may define a hollow, substantially rectangular cross-section. As described above, usage of straight, substantially rectangular components, as opposed to curved tubular components, may reduce component costs.

The horizontal extensions 308B my each include one or more lateral throughholes 310B. Thereby, each of the horizontal extensions 308B may receive one of the rods 34B through the respective throughhole 310B. Further, the horizontal extensions 308B may each include one or more vertical throughholes 312B and the rods may each include a plurality of corresponding vertical throughholes 314B. Thereby, a respective bolt, pin, or other similar fastener may be inserted through each of throughholes 312B defined in the horizontal extensions 308B and through a respective one of the rods 34B at a desired one of the corresponding vertical throughholes 314B that positions the lower engagement device 28B as desired with respect to the structure to which the tree stand 10B is attached. Alternatively, the fastener may be inserted at a desired throughhole 314B in each rod 34B which may then be pressed against a rear surface of the horizontal extension 308B when the lower engagement device 28B engages the structure. Thereby, the vertical throughholes 312B in the horizontal extensions 308B may only be employed to retain the rods 34B in place during lifting of the tree stand into position.

Extending both of the rods 34B may angle the tree stand upwardly, whereas retracting both of the rods may angle the tree stand downwardly. Extending one of the rods 34B more than the other rod may assist in accommodating the contours of the structure (e.g., a tree), or provide a desired horizontal angle such that the tree stand points in a desired direction. In some embodiments one or more bubble levels 35B may allow a user to set the tree stand substantially perfectly vertical and flat with respect to horizontal. In one embodiment, as illustrated, the bubble levels 35B may be placed on surfaces configured to be horizontal and oriented perpendicular to one another. Thereby, the left/right tilt (e.g., "roll") and fore/aft tilt (e.g., "pitch") may be set such that the tree stand 10B, and in particular the platform portion 500B, may be substantially horizontal.

As illustrated in FIGS. 26-30, the tree stand 10B may additionally include a lower mounting system 45B. The lower mounting system 45B may be engaged with the frame post 300B below the upper mounting systems 25B. In one embodiment, as illustrated, the lower mounting system 45B may be positioned above the platform portion 500B, so as to facilitate access thereto. The lower mounting system 45B may include a tie down mechanism 52B having a bracket plate 50B, a flexible tensile member connected to the bracket plate, and a mechanical ratchet 23B.

The flexible tensile member may be in the form of a woven material such as, for example, a rope, strap, cable, webbing, and/or the like. A first end of the tensile member can be connected to the bracket plate 50B, and the tensile member can be extended at least partially around a structure (e.g., a tree trunk). The second end of the flexible tensile member can then be connected to the spindle of the mechanical ratchet 23B, and the mechanical ratchet may be manually operated by repeatedly pivoting a lever so that the mechanical ratchet tightens the tensile member around the tree trunk. Thereby, the teeth of the lower engagement device 28B (see, e.g., FIG. 31) may securely engage the tree trunk as the lower mounting system 45B draws the frame post 300B toward the tree trunk.

As described hereinafter, in some embodiments the tree stands of the present disclosure may be configured to operate in conjunction with one or more accessories, which may be attached thereto. In this regard, in some embodiments the tree stands may include features configured to engage accessories.

For example, FIG. 30 illustrates an accessory mount 75B according to an example embodiment of the present disclosure. As illustrated, the accessory mount 75B may include one or more mounting bars 77B. One or more mounting holes 79B may be defined in the one or more mounting bars 77B. The mounting bars 77B may extend substantially horizontally when the tree stand 10B is mounted to a structure such as a tree. As described below, an accessory may engage one or more of the mounting bars 77B and a pin or other fastener may be received through the accessory and one or more of the mounting holes 79B in the mounting bars. Thereby, an accessory may be engaged with one or more of the mounting bars 77B in order to retain the accessory in engagement with the tree stand 10B. In some embodiments the accessory mount 75B may include first and second mounting bars 77B, which may extend substantially parallel to one another. The mounting holes 79B in an upper one of the mounting bars 79B may align with the mounting holes in a lower one of the mounting bars. Thereby, in some embodiments a single pin or other single fastener may extend through two of the mounting bars 77B via the mounting holes 79B defined therein.

In some embodiments the mounting bars 77B may extend through the frame post 300B. Further, as illustrated in FIG. 27, in some embodiments the mounting bars 77B may align with the upper mounting system(s) 25B. Thereby, the fasteners employed to engage the mounting system(s) 25B with the frame post 300B may also engage the mounting bars 77B with the frame post. For example, as illustrated in FIG. 26, one or more bolts 81B may extend through each of the mounting bars 77B and into the one or more mounting systems 25B. Thereby, the bolts 81B may retain the mounting holes 79B (see, FIG. 30) in the desired vertical orientation at which the mounting holes are aligned.

As may be understood, some or all of the features of the tree stand 10B described above may be included in a tree stand system. In this regard, FIGS. 32-34 illustrate a tree stand system 2010B that may include features of the tree stand 10B of FIGS. 26-31. For example, the tree stand system 2010B may include the seating portion 100B and the frame post 300B (see, FIGS. 33 and 34) and some or all of the corresponding components described above engaged therewith. Note that a seat cover of the seat portion 100B is not illustrated. However, the tree stand system 2010B may include a seat cover which may be substantially similar to the seat cover 101 described above (see, e.g., FIG. 1A).

The platform portion 2500B may substantially similar to the platform portion 500B (see, e.g., FIG. 26), except the platform portion may be configured to support a handrail 706B. Further, a forward step 702B may be engaged with the platform portion 2500B. A ladder 700B may extend downwardly from the forward step 702B.

The ladder 700B may include a ladder frame 701B, which may include substantially parallel bars that define a rectangular cross-section extending upwardly toward the forward step 702B, and a plurality of rungs 704B extending therebetween. The ladder 700B may comprise a plurality of ladder segments that may be combined to define a desired length corresponding to height of the forward step 702B relative to the ground. The handrail 706B may terminate at the forward step 702B rather than extend down the ladder 706B. In this regard, the relatively larger, rectangular configuration of the ladder frame 701B may be suitable for hand engagement.

As may be understood, the tree stand system may be modified in accordance with other embodiments of the present disclosure. For example, FIG. 35 illustrates a tree stand system 2100B' according to an additional example embodiment of the present disclosure including a double seating portion 1100B configured to seat two people. Further, the tree stand system 2010B' may include a ladder 700B including a ladder frame 701B and a plurality of rungs 704B, a handrail 706B', a forward step 702B', a platform portion 2500B', and a plurality of frame posts 300B.

The platform portion 2500B' may be substantially similar to the platform portion 2500B described above (see, e.g., FIG. 34), except the platform portion may be configured to support and engage the double seating portion 1100B. Further, the handrail 706B' and the forward step 702B' may be substantially similar to the handrail 706B and the forward step 702B described above (see, e.g., FIG. 34) except these elements may be adapted in size to accommodate the dimensions of the platform portion 2500B', which may be relatively wider than the platform portion 2500B described above in order to accommodate the double seating portion 1100B.

In this regard, the double seating portion 1100B may include two single seating portions 100B, which may be positioned beside one another, facing the same direction. Note that a seat cover of each seat portion 100B is not illustrated. However, each seat portion 100B may include a seat cover which may be substantially similar to the seat cover 101 described above (see, e.g., FIG. 1A). Each seating portion 100B may be engaged with a respective frame post 300B. A respective seating bracket 110B may retain each single seating portion 100B in engagement with the corresponding frame post 300B.

Each frame post 300B may extend through the platform portion 2500B'. In this regard, the platform portion 2500B' may include two openings configured to receive the frame posts 300B therethrough. The frame posts 300B may be equally spaced along the width of the platform portion 2500B' at a distance sufficient to accommodate each of the seating portions 100B. In view of the frame posts 300B being displaced from a center of the width of the platform portion 2500B', the tree stand system 2100B' may include features configured to allow for central placement of the lower engagement device 28B, the lower linkage 30B, and the one or more upper mounting systems 25B with respect to the width of the platform portion in order to allow the lower engagement device and the upper mounting system to engage a structure (e.g., a tree trunk) in a stable manner.

In this regard, as illustrated, one or more cross-members 83B may extend between and engage the frame posts 300B above the platform portion 2500B'. The one or more upper mounting systems 25B may be engaged with the one or more cross-member 83B at a position centrally disposed between the frame posts 300B. Further, a horizontal extension 308B' may extend between the frame posts 300B below the platform portion 2500B'. In this regard, whereas the horizontal extensions 308B described above (see, e.g., FIG. 31) extend outwardly from a frame post 300B, the horizontal extension 308B' of the present embodiment extends between the two frame posts. Thereby, the lower engagement device 28B and the lower linkage 30 may be engaged with the horizontal extension 308B' at a position centrally disposed between the frame posts 300B in order to centrally support the tree stand system 2100B'.

As noted above, the tree stand systems of the present disclosure may include a plurality of climbing sticks, which may also be referred to as ladder sticks. An example embodiment of a climbing stick 3000 is illustrated in FIGS. 36-38. As illustrated, the tree stick 3000 may include a frame, which may comprise a central frame 3002, and a plurality of steps 3004 engaged therewith. In the illustrated embodiment three steps 3004 are engaged with the central frame 3002. The steps 3004 may comprise a width from about ten inches to about fourteen inches and a depth from about six inches to about ten inches in order to provide a large surface area suitable for climbing and stepping thereon.

In one embodiment each step 3004 may be integral. In another embodiment, as illustrated, each step 3004 may comprise a first section 3006 and a second section 3008, in order to reduce the size of the components of the climbing stick for reduced manufacturing costs and ease of disassembled transport thereof. In some embodiments the first section 3006 and the second section 3008 may be identical in order to reduce costs associated with the climbing stick 3000.

In this regard, as illustrated in FIG. 38, the sections 3006, 3008 may each include a plurality of inner protrusions 3010 configured to form an interlocking relationship with one the inner protrusions of the opposing section and to receive the central frame 3002 therebetween. A bolt 3012 or other fastener may extend through the sections 3006, 3008 at the inner protrusions 3010 and the central frame 3002 to retain the sections of the steps 3004 in engagement with the central frame.

The sections 3006, 3008, may each further include a plurality of outer protrusions 3014. In this regard, in use the outer protrusions 3014 of each section 3006, 3008 may be placed into engagement with the structure (e.g., tree) on which the tree stand is to be installed. Further a flexible tensile member may be connected to a first end 3016 of a bracket 3018, wrapped around the structure, and secured to a second end 3020 of the bracket. The flexible tensile member may be in the form of a woven material such as, for example, a rope, strap, cable, webbing, and/or the like. The climbing stick 3000 may be oriented such that the bracket 3018 is proximate the top thereof to provide improved stability. Upon tightening the flexible tensile member, the climbing stick 300 may be secured to the structure and the outer protrusions 3014 may dig into the structure so as to substantially prevent movement thereof when a user climbs thereon. Additional climbing sticks may be installed on the structure in a spaced vertical relationship to allow the user to ascend the tree.

Once the user reaches a desired height, a hoisting apparatus may be employed to lift the tree stand into place at an elevated height on the structure (e.g., tree). One example embodiment of a hoisting apparatus 600 is described above and illustrated in FIGS. 12A and 12B. FIGS. 39 and 40 illustrate a hoisting apparatus 600A according to an additional example embodiment of the present disclosure. The hoisting apparatus 600A may be configured to lift a tree stand as described above with respect to the hoisting apparatus 600 of FIGS. 12A and 12B. Accordingly, operation of the hoisting apparatus will not be described in detail for brevity purposes.

Briefly, however, the hoisting apparatus 600A includes an upper mount 602A. The upper mount 602A may include an eyelet 604A configured to directly or indirectly engage a flexible tensile member that extends around the structure (e.g., a tree) when the hoisting apparatus 600A is positioned at a desired height therealong. The flexible tensile member may be in the form of a woven material such as, for example, a rope, strap, cable, webbing, and/or the like.

Further, the hoisting apparatus 600A may include a hoisting mechanism 606A. The hoisting mechanism 606A may be at least partially received within a frame 607A, which may define the upper mount 602A. The hoisting mechanism 606A may include a motion input member 608A including an external engagement member 610A fixedly coupled to a driving screw 612A. The external engagement member 610A may be configured for engagement with a hand crank, an electric drill, or the like. In some embodiments the external engagement member 610a and all or substantially all of the fasteners employed in the tree stands disclosed herein may define the same size and shape such that a single tool may be employed to rotate each to assemble and install the tree stand.

When the motion input member 608A is rotated, the screw member 612A may rotate, thereby driving a gear 614A. The gear 614A may be fixedly coupled to a rotatable drum 616A. The rotatable drum 616A may be configured to engage a first end of an additional flexible tensile member. The flexible tensile member may be in the form of a woven material such as, for example, a rope, strap, cable, webbing, and/or the like. The flexible tensile member may extend between a pair of guides 620A to a second end. The second end of the flexible tensile member may be affixed to a tree stand. For example, a harness may include a plurality of hooks that engage the tree stand to allow for stabile lifting thereof. Thereby, the tree stand may be hoisted up the structure (e.g., a tree) to the desired height as the flexible tensile member is wound about the rotatable drum 616A.

As noted above, the tree stand systems of the present disclosure may include one or more accessories. In one embodiment the accessory mount 75B (see, e.g., FIG. 30) may be configured to engage the accessories. For example, FIG. 41 illustrates an accessory receiver 3100 according to an example embodiment of the present disclosure. The accessory receiver 3100 may include one or more coupling members 3102. The coupling members 3102 may be configured to slide over, or into the mounting bars 77B of the accessory mount 75B (see, FIG. 30). Further, the coupling members 3102 may each include one or more corresponding mounting holes 3104 configured to align with the mounting holes 79B of the mounting bars 77B of the accessory mount 75B when the accessory receiver 3100 is engaged with the accessory mount. Accordingly, at least one pin or other fastener may be inserted through the mounting holes 3104 of the coupling members 3102 and the mounting holes 79B of the mounting bars 77B to retain the accessory receiver in engagement with the accessory mount 75B.

The accessory receiver 3100 may extend to a receiving end 3106. The receiving end of the accessory receiver 3100 may include a receiving aperture 3108. The receiving aperture 3108 may be configured to receive an accessory.

For example, FIG. 42 illustrates a bow holder accessory 3200 configured to hold a hunting bow. As illustrated, the bow holder accessory 3200 may include a mounting pin 3202. The mounting pin 3202 may be configured to engage the receiving aperture 3108 of the accessory receiver 3100 (see, FIG. 41). As may be understood, in other embodiments the accessory receiver may include the mounting pin and the bow holder accessory may include the mounting receiving aperture or other corresponding engagement mechanisms may be employed. In a preferred embodiment the engagement mechanism may allow for relative rotation between the accessory receiver and the accessory to provide for improved access to the accessory and any item engaged therewith. In this regard, the bow holder accessory and each other accessory provided herein may extend to a position in front of the seat portion.

Further, the bow holder accessory 3200 may include an extensible section 3204 and a corresponding receiving section 3206. The extensible section 3204 may be adjusted in position with respect to the receiving section 3206 until the bow holder accessory 3200 defines a desired length. The extensible section 3204 may define a plurality of apertures 3208 and a pin 3210 or other fastener may be inserted through the receiving section 3206 and the aperture corresponding to the desired length of the extensible section.

The bow holder accessory 3200 may further include a hook 3212. The hook may be configured to engage any suitable portion of a hunting bow or other device. Thereby, the hunting bow or other device may be positioned for rapid and easy access. For example, a bow may be quickly accessed in the event of a sighting of game with minimal user movement.

As may be understood various other or additional accessories may be included in the tree stand systems of the present disclosure. For example, FIGS. 43 and 44 illustrate a hunting device accessory 3300 according to an example embodiment of the present disclosure. As illustrated, the hunting device accessory 3300 may include a mounting end 3302. As illustrated in FIG. 44, the mounting end 3302 of the hunting device accessory 3300 may be configured to engage the receiving end 3106 of the accessory receiver 3100. Further, a fastener 3304 such as a pin or bolt may secure the mounting end 3302 of the hunting device accessory 3300 to the receiving end 3106 of the accessory receiver 3100. Thereby, the hunting device accessory 3300 may be engaged with a tree stand and included in a hunting stand system as described elsewhere herein.

The hunting device accessory 3300 may be configured to pivot or otherwise move with respect to the accessory receiver 3100 at the interface therebetween. Further, the hunting device accessory 3300 may include a joint 3306 between first and second links 3308, 3310 thereof that allows for pivoting movement or other movement therebetween. The hunting device accessory 3300 may include a hunting device holder 3312. The hunting device holder 3312 may be configured to hold a rifle, crossbow, or other hunting device. In this regard, the hunting device holder 3312 may include two opposing bars 3314. The opposing bars 3314 may be configured to receive the stock of the hunting device therebetween. For example, the stock of the hunting device may be received between the bars 3314 such that the butt thereof extends slightly past and between the ends of the bars. Conversely, the forestock or other portion of the hunting device closer to a front or shooting end of the hunting device may be supported in a groove 3316 defined by a front support member 3318. Thereby, the hunting device may be fully supported by the bars 3314 and the front support member 3318.

The hunting device accessory 3300 may be configured to allow for movement of the hunting device holder 3312. In this regard, the hunting device holder 3312 may be connected to the second link 3310 via a fastener 3320 such as a pin or bolt that allows rotation therebetween. Further, a bar joint 3322 may allow for rotational adjustment of the hunting device holder 3312 in a direction perpendicular to the adjustment allowed by the joint between the hunting device holder 3312 and the second link 3310. In some embodiments the bar joint 3322 may include a locking mechanism 3324 that allows on the fly locking and unlocking of the bar joint.

Additionally, the front support member 3318 may include a support joint 3326. The support joint 3326 may allow for rotational adjustment in a direction perpendicular to the adjustment allowed by the joint between the hunting device holder 3312 and the second link 3310. Alternatively, the support joint 3326 may be fixed in place. In this regard, upon assembly, the front support member 3318 may be properly aligned with the remainder of the hunting device holder 3312.

The hunting device may be supported by the hunting device holder 3300 in a desired position. In some embodiments a user may shoot or otherwise operate the hunting the device while the hunting device is engaged with, and retained in, the hunting device holder 3312. In this regard, the user may position the hunting device at an optimal position for use thereof with minimal movement required.

Alternatively, if desired, a user may remove the hunting device from the hunting device holder 3312 prior to shooting or otherwise operating the hunting device.

As illustrated in FIGS. 43 and 44, in some embodiments the hunting device holder 3312 may include a mount 3328 (e.g., a ball mount) configured to engage a camera or video camera. Thereby, when the hunting device is shot or otherwise operated while engaged with the hunting device holder 3312, and the camera or video camera is initially properly aligned with the hunting device via the mount 3328, images or video may be easily captured of the target.

As described above, embodiments of the tree stands of the present disclosure may include a lower linkage that may provide for adjustment of the lower engagement device (e.g., adjustment of the extension and/or angle thereof to adjust pitch and roll of the tree stand). As should be understood, in other embodiments the upper engagement device may additionally or alternatively include an upper linkage that provides for adjustment of the extension and/or angle thereof in the same manner described herein with respect to the lower linkage and the lower engagement device.

As may be understood, the tree stand systems of the present disclosure may provide numerous benefits as compared to traditional tree stands. For example, the seat portion may be relatively wider (e.g., defining a width from about twenty inches to about thirty inches), thereby providing improved comfort. Further, the platform portion may provide a user with stability and enhanced safety. Note that although the tree stands of the present disclosure may be relatively bigger than traditional tree stands, lightweight but strong materials such as aluminum or titanium may be employed, except where otherwise indicated herein), to provide the tree stand with a relatively light weight.

Many modifications and other aspects of the disclosure will come to mind to one skilled in the art to which this disclosure pertains having the benefit of the teachings presented in the foregoing descriptions and the associated drawings. Therefore, it is to be understood that the disclosure is not to be limited to the specific aspects disclosed herein and that modifications and other aspects are intended to be included within the scope of the appended claims. Although specific terms are employed herein, they are used in a generic and descriptive sense only and not for purposes of limitation.

That which is claimed:

1. A tree stand system, comprising:
   a tree stand, comprising:
      a frame post;
      a platform portion engaged with the frame post;
      a seat portion engaged with the frame post; and
      an upper engagement device and a lower engagement device each configured to engage a structure,
      wherein a first engagement device of the upper and lower engagement d devices defines a convex edge configured to extend toward the structure to allow the tree stand to roll against the structure to select a horizontal angle that the tree stand faces,
      wherein a second engagement device of the upper and lower engagement devices, the second engagement device being different from the first engagement device, is engaged with a linkage configured to move the second engagement device toward or away from the structure and to adjust a horizontal angle of the second engagement device with respect to the structure,
      wherein the linkage comprises first and second rods each being extensible in parallel with each other and with respect to the frame post, the platform portion, or the seat portion, wherein the first and second rods have distal ends pivotably engaged with opposed ends of the second engagement device, and wherein each of the first and second rods is independently adjustable in length between the second engagement device and the frame post, the platform portion, or the seat portion, and
      wherein the second engagement device is extensible between the distal ends of the first and second extensible rods to facilitate unequal parallel extensions of the first and second rods.

2. The tree stand system of claim 1, wherein the second engagement device defines one or more receiving edges configured to at least partially surround the structure and secure the tree stand at the horizontal angle selected.

3. The tree stand system of claim 2, wherein the convex edge and the one or more receiving edges each define a plurality of teeth.

4. The tree stand system of claim 1, wherein the tree stand further comprises an upper tie down mechanism configured to extend around the structure, the upper engagement device and the upper tie down mechanism each being engaged with the frame post at a same height therealong.

5. The tree stand system of claim 4, wherein the tree stand further comprises a lower tie down mechanism engaged with the frame post between the upper tie down mechanism and the platform portion.

6. The tree stand system of claim 1, wherein the upper engagement device is positioned above the platform portion and the lower engagement device is positioned below the platform portion.

7. The tree stand system of claim 1, wherein at least one of the upper engagement device and the lower engagement device is engaged with the frame post.

8. The tree stand system of claim 1, wherein the tree stand further comprises an accessory mount engaged with the frame post behind the seat portion.

9. The tree stand system of claim 8, wherein the accessory mount comprises first and second mounting bars extending substantially parallel to one another.

10. The tree stand system of claim 8, further comprising an accessory configured to engage the accessory mount and extend to a position in front of the seat portion,
    wherein the accessory is selected from a group consisting of a hunting device accessory and a bow holder accessory.

11. The tree stand system of claim 1, wherein the tree stand further comprises a second frame post engaged with the platform portion and a second seat portion engaged with the second frame post.

12. The tree stand system of claim 11, wherein the tree stand further comprises a cross-member extending between the frame post and the second frame post,
    wherein the upper engagement device is engaged with the cross-member.

13. The tree stand system of claim 1, further comprising a ladder and a forward step, the forward step being disposed between the platform portion and the ladder.

14. The tree stand system of claim 1, further comprising a hoisting apparatus configured to engage the structure and lift the tree stand to a desired height therealong.

15. The tree stand system of claim 14, wherein the hoisting apparatus comprises a motion input member configured to rotate and coil a flexible tensile member to lift the tree stand.

16. The tree stand system of claim 1, further comprising one or more climbing sticks, the climbing sticks comprising a central frame and a plurality of steps engaged therewith,
wherein each of the steps comprises a first section and a second section, the first section and the second section being substantially identical and oppositely disposed about the central frame.

17. The tree stand system of claim 16, wherein the first section and the second section each define a plurality of inner protrusions that cooperatively surround the central frame.

18. A tree stand system, comprising:
a tree stand, comprising:
a frame post;
a platform portion engaged with the frame post;
a seat portion engaged with the frame post; and
an upper engagement device and a lower engagement device each configured to engage a structure, the upper engagement device or the lower engagement device being engaged with a linkage configured to move the upper or lower engagement device toward or away from the structure and to adjust a horizontal angle of the upper or lower engagement device with respect to the structure, the linkage comprising first and second rods each being extensible in parallel with each other and with respect to the frame post, the platform portion, or the seat portion, wherein the first and second rods have distal ends pivotably engaged with opposed ends of the upper or lower engagement device wherein each of the first and second rods is independently adjustable in length between the upper or lower engagement device and the frame post, the platform portion, or the seat portion, and wherein the upper or lower engagement device is extensible between the distal ends of the first and second extensible rods to facilitate unequal parallel extensions of the first and second rods.

\* \* \* \* \*